United States Patent
Ito et al.

(10) Patent No.: US 6,944,396 B2
(45) Date of Patent: Sep. 13, 2005

(54) LENS BARREL AND IMAGE TAKING APPARATUS

(75) Inventors: Yoshihiro Ito, Asaka (JP); Hiroshi Endo, Asaka (JP); Takehiko Senba, Asaka (JP); Akio Omiya, Saitama (JP)

(73) Assignees: Fuji Photo Film Co., Ltd., Kanagawa (JP); Fujinon Corporation, Saitama (JP)

( * ) Notice: Subject to any disclaimer, the term of this patent is extended or adjusted under 35 U.S.C. 154(b) by 0 days.

(21) Appl. No.: 10/844,578

(22) Filed: May 13, 2004

(65) Prior Publication Data

US 2005/0002665 A1 Jan. 6, 2005

(30) Foreign Application Priority Data

| May 15, 2003 | (JP) | ................................. | 2003-137128 |
| May 28, 2003 | (JP) | ................................. | 2003-150814 |
| Jun. 30, 2003 | (JP) | ................................. | 2003-187629 |
| Mar. 5, 2004 | (JP) | ................................. | 2004-062687 |
| Mar. 8, 2004 | (JP) | ................................. | 2004-063582 |
| May 10, 2004 | (JP) | ................................. | 2004-140182 |

(51) Int. Cl.[7] ........................... G03B 5/00; G03B 17/04
(52) U.S. Cl. ............................. 396/75; 396/79; 396/349
(58) Field of Search ................. 396/73–75, 79, 396/349

(56) References Cited

U.S. PATENT DOCUMENTS

| 5,260,733 | A | * | 11/1993 | Kawano | ........................ 396/75 |
| 6,031,998 | A | * | 2/2000 | Shono | ........................... 396/75 |
| 2004/0042777 | A1 | * | 3/2004 | Nomura | ........................ 396/73 |
| 2004/0189852 | A1 | * | 9/2004 | Omiya et al. | ................ 348/335 |
| 2004/0228626 | A1 | * | 11/2004 | Endo et al. | .................. 396/349 |
| 2005/0036777 | A1 | * | 2/2005 | Nomura et al. | ................ 369/73 |

FOREIGN PATENT DOCUMENTS

JP  5-34769 A  2/1993

* cited by examiner

Primary Examiner—W. B. Perkey
(74) Attorney, Agent, or Firm—Sughrue Mion, PLLC

(57) ABSTRACT

An image taking apparatus of the present invention includes: a shooting lens which comprises a plurality of lens groups and which has a variable focal length and adjusts a focus; and a lens barrel which accommodates the shooting lens and which can advance and retract. The lens barrel comprises a lens advancing/retracting mechanism which retracts at least one of the lens groups from a shooting optical axis when the lens barrel is retracted, and which advances the lens group retracted when the lens barrel is retracted to the shooting optical axis when the lens barrel advances. The shooting lens forms a fixed focus shooting optical system by the remaining lens group among the plurality of lens groups excluding the lens group which is retracted from the shooting optical axis.

27 Claims, 39 Drawing Sheets

LENS BARREL AND IMAGE TAKING APPARATUS

BACKGROUND OF THE INVENTION

1. Field of the Invention

The present invention relates to a lens barrel which includes lens groups and accommodates a shooting lens whose focal length can be changed and which adjusts focus, which can advance and retract, and which allows the shooting lens to adjust focal length and focus. The invention also relates to an image taking apparatus which has such a lens barrel and which captures a subject light passing through the lens barrel, thereby taking an exposure.

2. Description of the Related Art

In recent years, in addition to cameras which take an exposure on a conventional silver-salt film, digital cameras have rapidly become widespread. Such a digital camera includes a solid state imaging element such as a CCD image pickup element or a CMOS image pickup element, and which forms a subject image on the solid state imaging element and produce an image signal.

In this digital camera also, it is strongly required to enhance the shooting performance and carrying-easiness. There is a digital camera having a lens barrel incorporating, therein, a shooting lens having lens groups. In this digital camera, the focal length can be changed so that it is possible to take an exposure with a desired angle of view. Further, in order to enhance the carrying-easiness, the shooting lens is retracted into a camera body such that a distance between the lens groups constituting the shooting lens becomes less than a minimum distance required for shooting when the camera is not used, and shooting lens advances from the camera body so that the distance between the lens groups becomes longer than a distance required for shooting when the camera is used (see Japanese Patent Application Laid-open 1993-34769.)

In the digital camera wherein the distance between the incorporated lens groups becomes shorter than the minimum necessary distance required for shooting when the lens barrel is retracted, a technique called blackout is employed when the lens barrel is retracted. This technique prevents non-formed image from being displayed on a liquid crystal panel provided on a back surface of the camera.

This means that the digital camera having such a lens barrel is brought into a shooting-disenable state where subject light cannot be formed on the solid state imaging element when the lens barrel is retracted irrespective whether the blackout technique is carried out or not. For example, even when it suddenly becomes necessary make an exposure while carrying a digital camera, it is necessary to wait until the distance between the incorporated lens groups becomes the minimum necessary distance required for shooting from the retracted position, and there is an adverse possibility to miss the perfect moment for a good picture.

A so-called silver-salt camera using a roll film has the same problem.

SUMMARY OF THE INVENTION

In view of the above circumstances, it is an object of the present invention to provide an image taking apparatus capable of retracting a lens barrel to reduce the image taking apparatus in thickness and capable of immediately taking an exposure when carried by a user.

To achieve the above object, the present invention provides a lens barrel which accommodates a shooting lens having a plurality of lens groups including at least a variable-power lens group and a focus-adjusting lens group, which can change a barrel length between an accommodated state having a relatively short barrel length and a shooting state having a relatively long barrel length, the lens barrel including: a lens retracting mechanism which retracts at least one of the lens groups from a shooting optical axis when the lens barrel is retracted to be in the accommodated state; and a lens advancing mechanism which advances the lens group retracted when the lens barrel is retracted to the shooting optical axis when the lens barrel advances to be in the shooting state. Here, the shooting lens forms a shooting optical system by the remaining lens group among the plurality of lens groups excluding the lens group retracted from the shooting optical axis when the lens barrel is in the accommodated state.

In the above lens barrel, typically, the shooting lens forms a fixed focus shooting optical system by the remaining lens group.

Further, in the above lens barrel, it is acceptable that: the shooting lens includes three groups, i.e., a front lens group, a rear lens group and a focus lens arranged in this order from forward of the optical axis direction, the focal length of the shooting lens can be changed, and the focus is adjusted by moving the focus lens; the lens barrel further comprises a lens advancing/retracting mechanism including the lens retracting mechanism and the lens advancing mechanism; the lens advancing/retracting mechanism retracts the rear lens group from the shooting optical axis when the lens barrel is retracted to be in the accommodated state; and the shooting lens forms a shooting optical system by the front lens group and the focus lens when the lens barrel is in the accommodated state.

Furthermore, in this case, preferably, the front lens group is a lens group having a positive refractive force, the rear lens group is a lens group having a negative refractive force, and the focus lens is a lens group having a positive refractive force.

Further preferably, the lens barrel includes a light amount control member which controls an amount of light passing through the shooting lens, wherein the light amount control member retracts from the shooting optical axis together with the lens group which retracts from the shooting optical axis when the lens barrel is retracted, and when the lens barrel advances to be in the shooting state, the light amount control member advances to the shooting optical axis together with the lens group retracted when the lens barrel is retracted. Furthermore, the lens barrel may comprise a light amount control member which controls an amount of light passing through the shooting lens, wherein the light amount control member stays on the shooting optical axis even when the lens barrel is in the accommodated state.

Also, in the above lens barrel, it is preferable that: the shooting lens includes two lens groups, i.e., a front lens group and a rear lens group arranged in this order from forward of the optical axis direction; the lens barrel further comprises a lens advancing/retracting mechanism including the lens retracting mechanism and the lens advancing mechanism; the lens advancing/retracting mechanism allows a first lens group comprising one of the two lens groups to retract from the shooting optical axis when the lens barrel is retracted to be in the accommodated state, and allows the first lens group retracted when the lens barrel is retracted to advance to the shooting optical axis when the lens barrel is advanced to be in the shooing state; and the shooting lens forms a shooting optical system by a second lens group of the two lens groups when the lens barrel is in the accommodated state.

In this case, the lens barrel preferably further includes a correction lens which advances on the shooting optical axis and corrects aberration of the second lens group when the lens barrel is in the accommodated state, and which is retracted from the shooting optical axis when the lens barrel is in the shooting state, and the shooting lens preferably forms a shooting optical system by the second lens group and the correction lens when the lens barrel is in the accommodated state.

Also, when the shooting lens includes two lens groups i.e., the front lens group and the rear lens group as described above, the lens advancing/retracting mechanism preferably retracts the front lens group from the shooting optical axis when the lens barrel is retracted to be in the accommodated state, and advances the front lens group to the shooting optical axis when the lens barrel is advanced to be the shooting state.

In the above lens barrel, it is also acceptable that: the shooting lens includes four lens groups, i.e., a first lens group, a second lens group, a third lens group, and a fourth lens group arranged in this order from forward of the optical axis direction; the lens barrel comprises a lens advancing/retracting mechanism which retracts at least one of the third lens group and the fourth lens group from the shooting optical axis when the lens barrel is retracted to be in the accommodated state, and which advances the lens group retracted when the lens barrel is in the accommodated state to the shooting optical axis when the lens barrel advances to be in the shooting state; and the shooting lens forms a shooting optical system by the remaining lens group among the four lens groups excluding the lens group retracted from the shooting optical axis when the lens barrel is in the accommodated state.

In this case, it is also acceptable that: the lens advancing/retracting mechanism retracts both the second lens group and the fourth lens group from the optical axis when the lens barrel is retracted to be in the accommodated state, and advances the second lens group and the fourth lens group retracted in the accommodated state when the lens barrel advances to be in the shooting state; and the shooting lens forms a shooting optical system by the remaining lens group among the four lens groups excluding the second lens group and the fourth lens group retracted from the shooting optical axis when the lens barrel is in the accommodated state.

In this case, the shooting lens also may form a fixed shooting optical system by the remaining lens group when the lens barrel is in the accommodated state.

Also, the first lens group, the second lens group, the third lens group, and the fourth lens group as described above may have a positive refractive force, a negative refractive force, a positive refractive force, and a positive refractive respectively.

It is also acceptable in this case that the shooting state is a state in which an image is formed by using all the plurality of lens groups comprising the shooting lens, and the accommodated state is a state in which the barrel length is shorter than the shortest barrel length in the shooting state.

To achieve the above object, the present invention also provides an image taking apparatus that takes a picture by capturing a subject light, comprising:

a shooting lens which has a plurality of lens groups including at least a variable-power lens group and a focus-adjusting lens group; and a lens barrel which accommodates the shooting lens, which can advance and retract, and which allows the shooting lens to adjust the focal length and the focus when the lens barrel is advanced, wherein the lens barrel comprises a lens advancing/retracting mechanism which retracts at least one of the lens groups from a shooting optical axis when the lens barrel is retracted, and which advances the lens group retracted when the lens barrel is retracted to the shooting optical axis when the lens barrel advances, and wherein the shooting lens forms a fixed focus shooting optical system by the remaining lens group among the plurality of lens groups excluding the lens group retracted from the shooting optical axis when the lens barrel is retracted.

Here, it is acceptable that in the image taking apparatus, the shooting lens comprises three groups, i.e., a front lens group having a positive refractive force, a rear lens group having a negative refractive force and a focus lens having a positive refractive force arranged in this order from forward of the optical axis direction, the focal length of the shooting lens can be changed, and the focus is adjusted by moving the focus lens, wherein the lens advancing/retracting mechanism retracts the rear lens group from the shooting optical axis when the lens barrel is retracted, and the shooting lens forms a fixed focus shooting optical system by the front lens group and the focus lens when the lens barrel is retracted.

Further, it is acceptable that in the image taking apparatus, the shooting lens comprises two lens groups, i.e., a front lens group and a rear lens group, wherein the lens barrel includes the lens advancing/retracting mechanism which allows a first lens group comprising one of the two lens groups to retract from the shooting optical axis when the lens barrel is retracted, and allows the first lens group retracted when the lens barrel is retracted to advance to the shooting optical axis when the lens barrel is advanced, and wherein the shooting lens forms a fixed focus shooting optical system by a second lens group of the two lens groups when the lens barrel is retracted.

It is also preferable that in the image taking apparatus, the lens barrel further comprises a correction lens which advances on the shooting optical axis and corrects aberration of the second lens group when the lens barrel is retracted, and which retracts from the shooting optical axis when the lens barrel is advanced, and wherein the shooting lens forms a fixed focus shooting optical system by the second lens group and the correction lens when the lens barrel is retracted.

Further, in the image taking apparatus, the lens barrel may retract the front lens group from the shooting optical axis when the lens barrel is retracted, and may advance the front lens group to the shooting optical axis when the lens barrel is advanced.

It is acceptable that in the image taking apparatus, the shooting lens comprises four lens groups, i.e., a first lens group, a second lens group, a third lens group, and a fourth lens group arranged in this order from forward of the optical axis direction, wherein the lens barrel comprises a lens advancing/retracting mechanism which retracts at least one of the third lens group and the fourth lens group from the shooting optical axis when the lens barrel is retracted, and which advances the lens group retracted when the lens barrel is retracted to the shooting optical axis when the lens barrel advances, and wherein the shooting lens forms a shooting optical system by the remaining lens group among the four lens groups excluding the lens group retracted from the shooting optical axis when the lens barrel is retracted.

It is also acceptable that in the image taking apparatus, the lens advancing/retracting mechanism retracts both the second lens group and the fourth lens group from the optical axis when the lens barrel is retracted, and advances the second lens group and the fourth lens group retracted from the optical axis when the lens barrel advances, and wherein the shooting lens forms a shooting optical system by the remaining lens group among the four lens groups excluding the second lens group and the fourth lens group retracted from the shooting optical axis when the lens barrel is retracted.

In the image taking apparatus, the shooting lens may form a fixed shooting optical system by the remaining lens group when the lens barrel is retracted.

In the above image taking apparatus, also, the first lens group, the second lens group, the third lens group, and the fourth lens group may have a positive refractive force, a negative refractive force, a positive refractive force, and a positive refractive respectively.

Further, the above lens barrel or the image taking apparatus may be provided with a lens barrier which covers the front surface of the shooting lens so as to be freely opened and closed.

Furthermore, in the above lens barrel or the image taking apparatus, it is preferable the lens barrier is open when a picture is taken in the accommodated state or when a picture is taken in a state where the lens barrel is retracted.

According to the present invention, when the lens barrel is retracted, at least one of the lens groups located on the shooting optical axis when the lens barrel is advanced retracts from the shooting optical axis, and the remaining lens group on the shooting optical axis forms the shooting optical system. Thus, the lens barrel becomes thinner in thickness by retracting the shooting lens, and a picture can be taken even in the retracted state.

Here, for example, the shooting lens has three lens groups, i.e., the positive front lens group, the negative rear lens group and the positive focus lens arranged in this order from forward of the optical axis direction. When the lens barrel is retracted, the central rear lens group is retracted from the shooting optical axis, and the front lens group and the focus lens remaining on the shooting optical axis form the shooting optical system.

Also, in the invention, the shooting lens may have two lens groups, i.e., the front lens group and the rear lens group. When the lens barrel is retracted, one of the front lens group and the rear lens group is retracted from the shooting optical axis, and the other one remaining on the shooting optical axis forms the shooting optical system. With this configuration also, a picture can be taken even when the shooting lens is retracted.

In this case, if the correction lens is added, it is possible to suppress the deterioration of the image quality caused by aberration generated in the shooting in the retracted state using the second lens group remaining on the shooting optical axis, as compared with a normal shooting carried out by the two groups, i.e., the front lens group and the rear lens group.

As explained above, according to the present invention, it is possible to reduce the lens barrel or image taking apparatus in thickness by retracting the shooting lens and to establish the shooting in the retracted state, and thus, the camera can immediately take an exposure when a user carries the camera.

DESCRIPTIONS OF THE PREFERRED EMBODIMENTS

Embodiments of the present invention will be described below.

Figure 1:
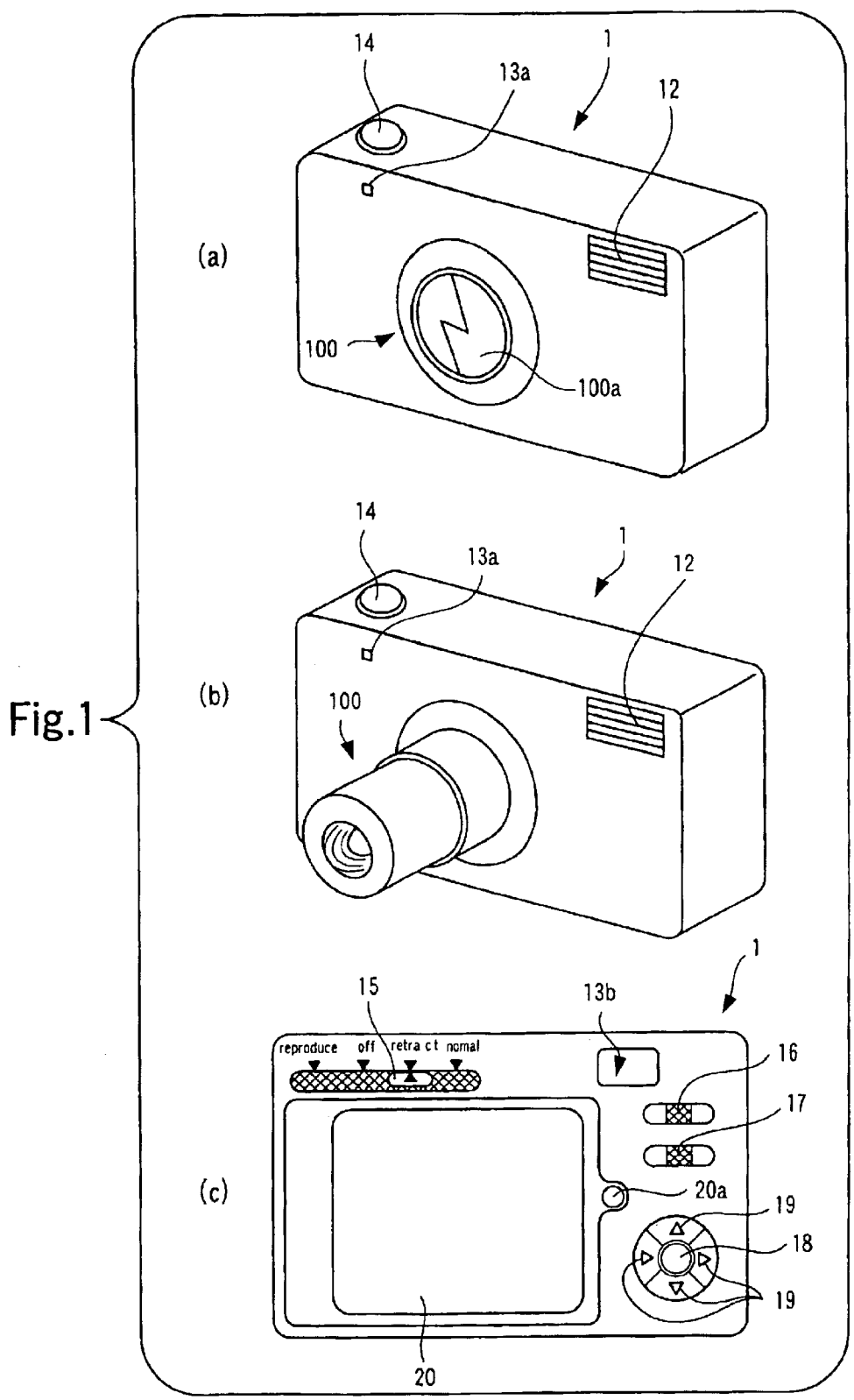
FIG. 1 shows outward appearance of a digital camera according to a first embodiment of the present invention.

FIG. 1 shows outward appearance of a digital camera according to a first embodiment of the present invention.

Part (a) of FIG. 1 shows a retracted lens barrel 100 of a digital camera 1 of this embodiment. A zoom lens is incorporated in the lens barrel 100. Part (b) of FIG. 1 shows the advanced lens barrel 100 of the digital camera 1. Part (c) of FIG. 1 shows a back surface of the digital camera 1.

A shooting lens having three groups of lenses are incorporated in the lens barrel 100 of the digital camera 1 shown in FIG. 1 as will be described later. A focal length is adjusted by moving the lens groups in an optical axis, and the focus is adjusted by moving the three groups of focus lens in the optical axis. The lens barrel 100 can change a barrel length between an accommodated state having relatively short barrel length and a shooting state having relatively long barrel length.

An auxiliary light-emitting window 12 and a finder object window 13a are disposed on an upper portion of a front surface of the digital camera 1 shown in FIG. 1. A shutter button 14 is disposed on an upper surface of the digital camera 1. The shutter button 14 has two modes, i.e., a halfway-push mode and a fully-push mode. If the shutter button 14 is pushed halfway, the focus is adjusted, and if the button is fully pushed, shooting is carried out. The lens barrel 100 is provided at its front surface with a lens barrier 10a for covering a front surface of the lens barrel when the lens barrel is retracted.

The digital camera 1 is provided at its back surface with a power switch 15, a finder window 13b, an image monitor 20, a setting-display button 16, a record-instructing button 17, an image display on/off button 20a, a cross key 19, and a zoom operation switching button 18. A user keeps pushing the zoom operation switching button 18 for a predetermined time to bring the shooting mode into a zoom operation mode. In the zoom operation mode, the lens barrel 100 moves toward the telephotographic side while the user keeps pushing an upward mark of the cross key 19, and the lens barrel 100 moves to a wide-angle side while the user keeps pushing a downward mark of the cross key 19. Then, if the user again keeps pushing the zoom operation switching button 18 for a predetermined time, the zoom operation mode is released.

The image display on/off button 20a is a button for instructing whether an image is displayed on the image monitor 20. In this digital camera 1, even if the image display on/off button 20a is turned off, an image obtained by shooting is displayed on the image monitor 20 for a predetermined time. When the image monitor 20 is off, a picture is taken while checking a field from the finder 13.

The setting-display button 16 is operated when a currently set value such as shutter speed or sensitivity is to be displayed. The record-instructing button 17 is operated when a shot image is to be stored in a memory.

The finder window 13b forms an optical finder between the finder window 13b and the front finder object window 13a.

The power switch 15 is for actuating the digital camera 1. The digital camera 1 is provided with a position "reproduce" for designating a reproducing mode in which an image stored in a memory or the like is to be displayed on the image monitor 20, a position "off" for turning power off, a position "retract" for designating shooting when the lens barrel is retracted, and a position "normal" for designating normal shooting including a movie mode. The power switch 15 can slide to set these positions. Part (c) of FIG. 1 shows the power switch 15 in the position "retract".

In this digital camera 1, a lens barrier 100a is closed by the force for sliding the power switch 15 from the position "retract" to the position "off", whereas the lens barrier 100a is opened by the force for sliding the power switch 15 from the position "off" to the position "retract". Thus, if the power switch 15 is slid from the position "off" to the position "normal," the lens barrier 100a is opened when the power switch 15 is passing the position "retract".

Figure 2:
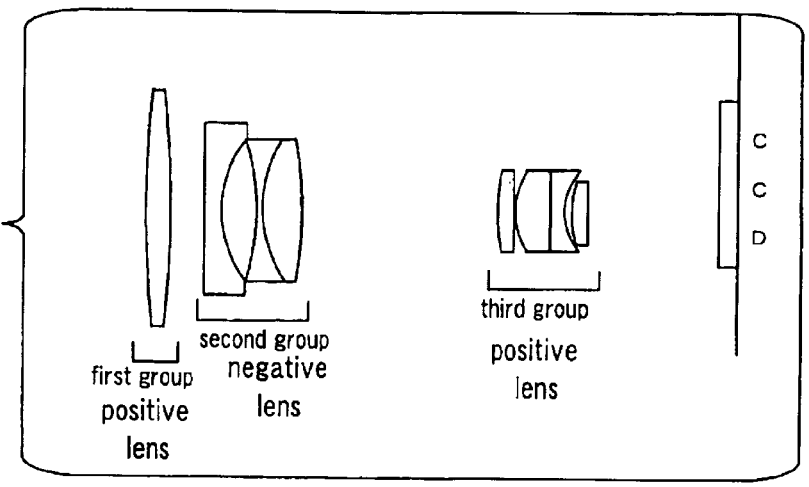
FIGS. 2(a) though 2(c) are schematic diagrams of arrangement of each lens group on a shooting optical axis when a shooting lens advances and retreats.
Figure 2:
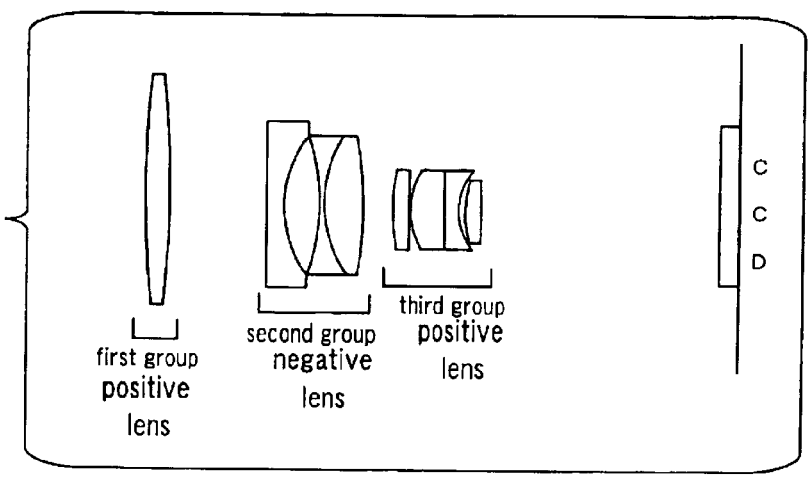
Figure 2:
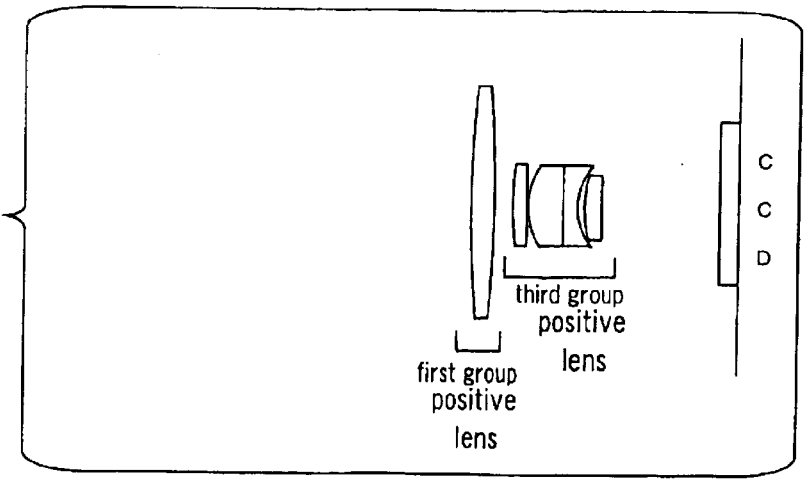

FIGS. 2(a) through 2(c) are schematic diagrams of arrangement of each lens group on the shooting optical axis when the shooting lens advances and retreats.

FIG. 2(a) shows the arrangement of first to third lens groups in the wide-angle side when the position "normal" is selected by the power switch 15. FIG. 2(b) shows the arrangement of the first to third lens groups in the telephotographic side when the position "normal" is selected by the power switch 15. FIG. 2(c) shows the arrangement of each lens group when the lens barrel is retracted in the position "retract" selected by the power switch 15. Here in FIG. 2(c), the second lens group (later-described rear lens group) retracted from the shooting optical axis is omitted, and only the first (later-described first lens group) and the third (later-described focus lens) are shown. In the digital camera 1 of this embodiment, the shooting is possible not only when the "normal" is selected by the power switch 15 but also when the "retract" is selected. This shooting (shooting when the lens barrel is retracted, hereinafter) is fixed focus shooting carried out using the first lens group and the third lens group remaining on the shooting optical axis when the lens barrel is retracted. FIGS. 2(a) through 2(c) also show a CCD on the shooting optical axis.

Figure 3:
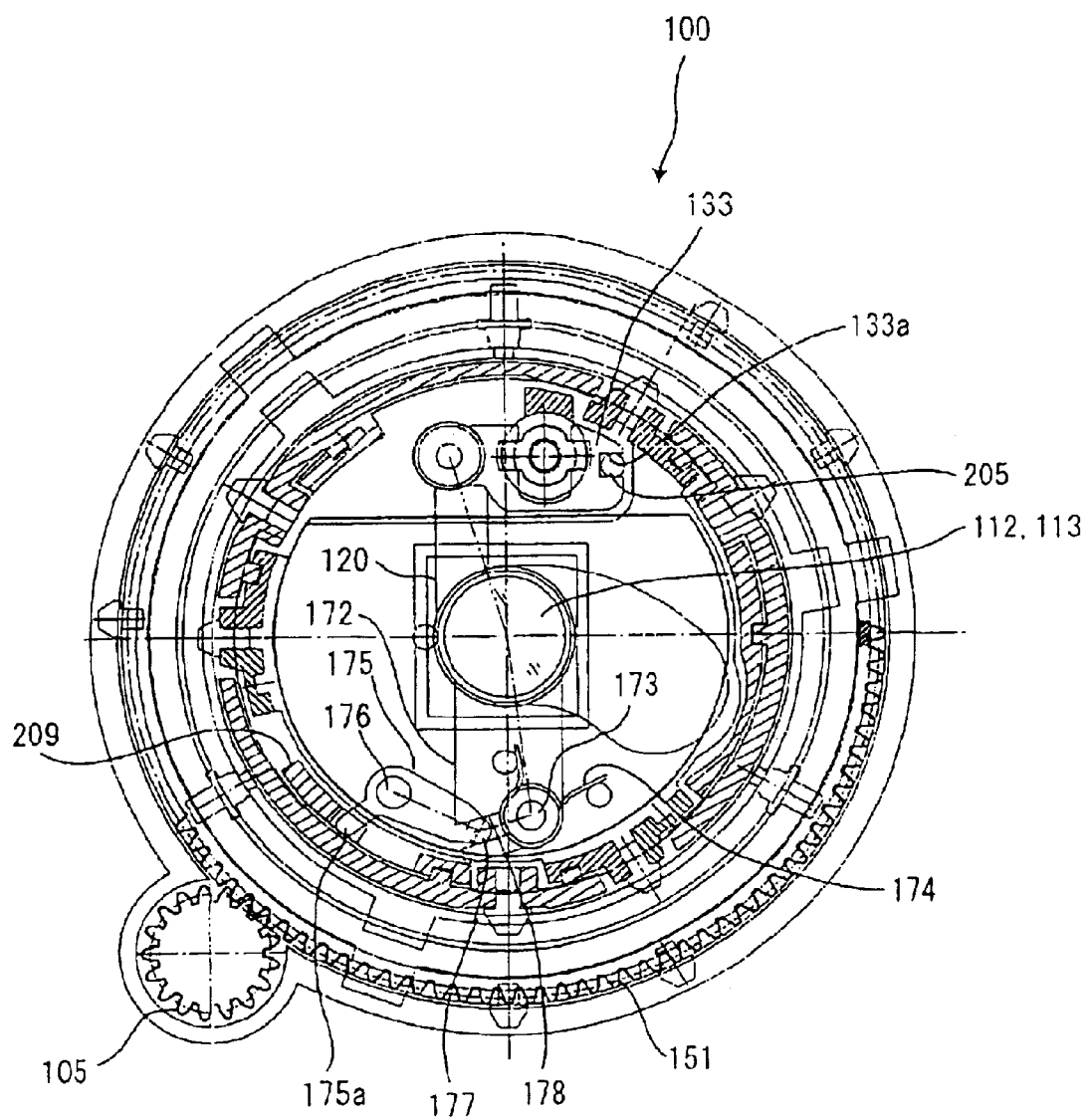
FIG. 3 is a schematic diagram of essential parts of the advanced lens barrel of the digital camera of the first embodiment of the invention as viewed from the optical axis.
Figure 4:
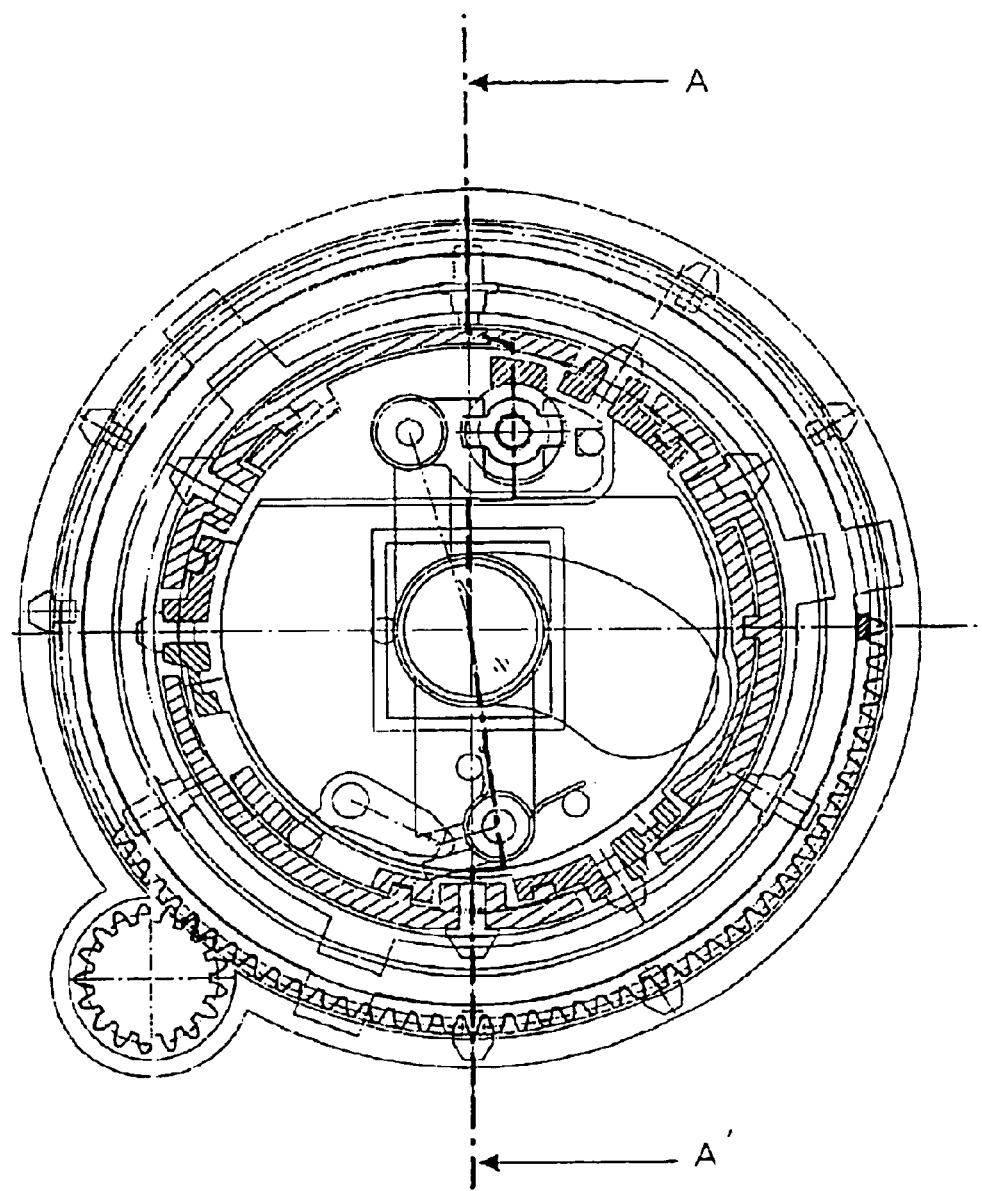
FIG. 4 is a sectional view that is the same as FIG. 3 but showing a line A–A'.
Figure 5:
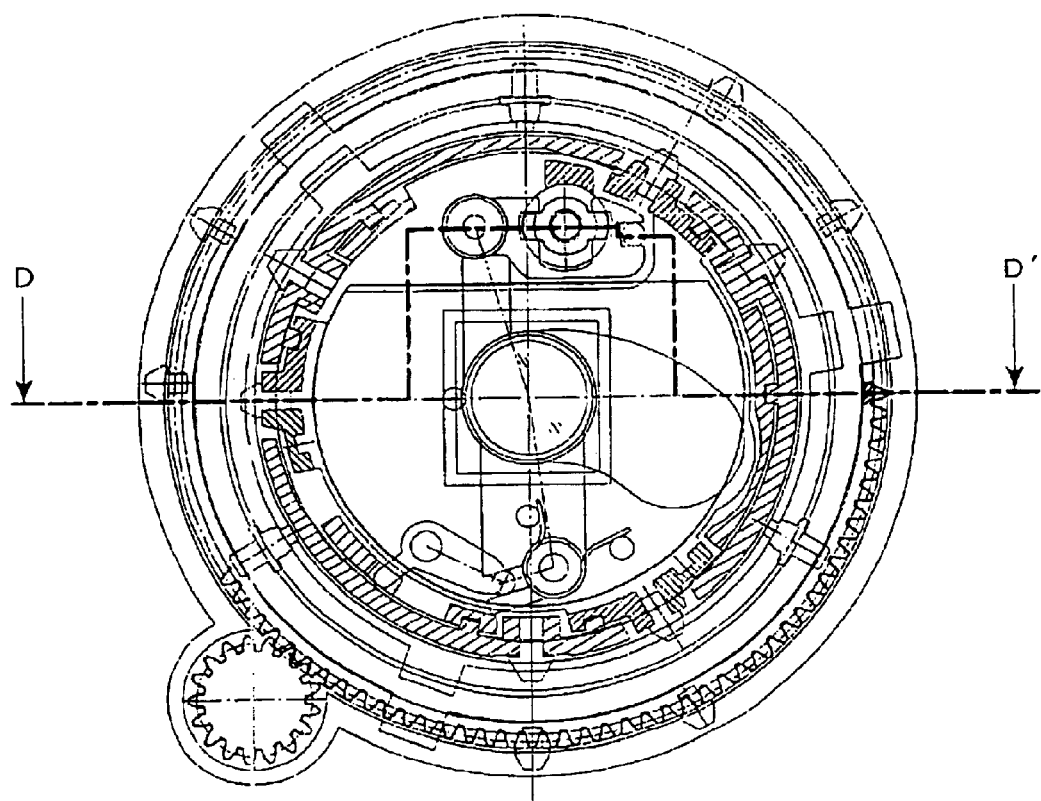
FIG. 5 is a sectional view that is the same as FIG. 3 but showing a line D–D'.
Figure 6:
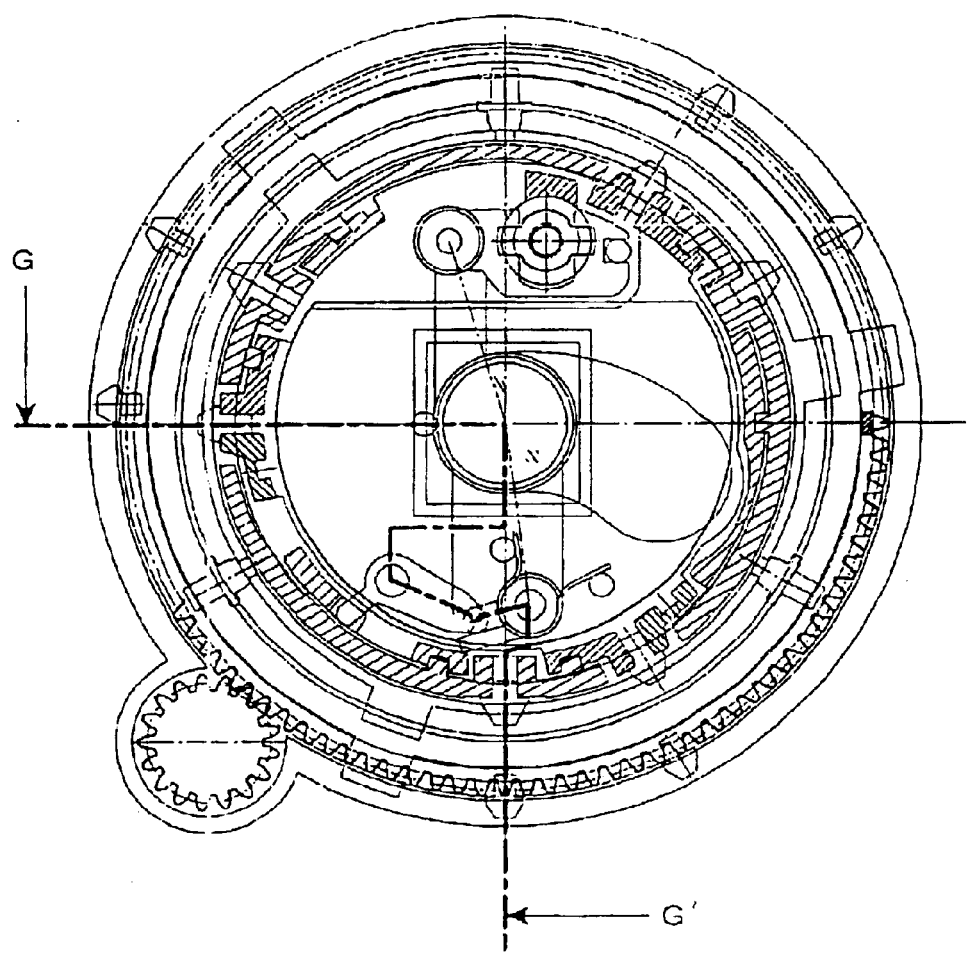
FIG. 6 is a sectional view that is the same as FIG. 3 but showing a line G–G'.
Figure 7:
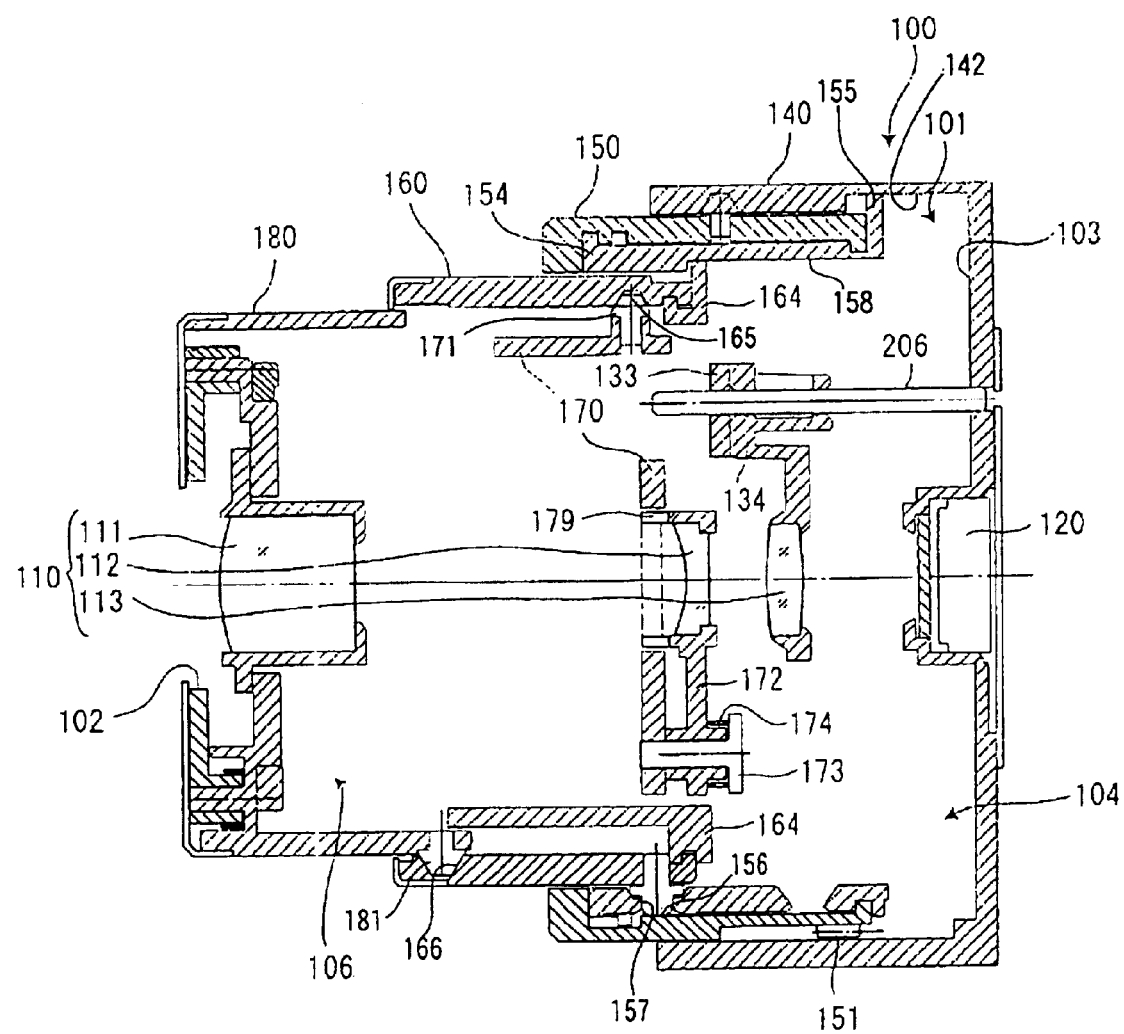
FIG. 7 is a sectional view taken along the line A–A' in FIG. 4 for showing a state of the tele-edge.
Figure 8:
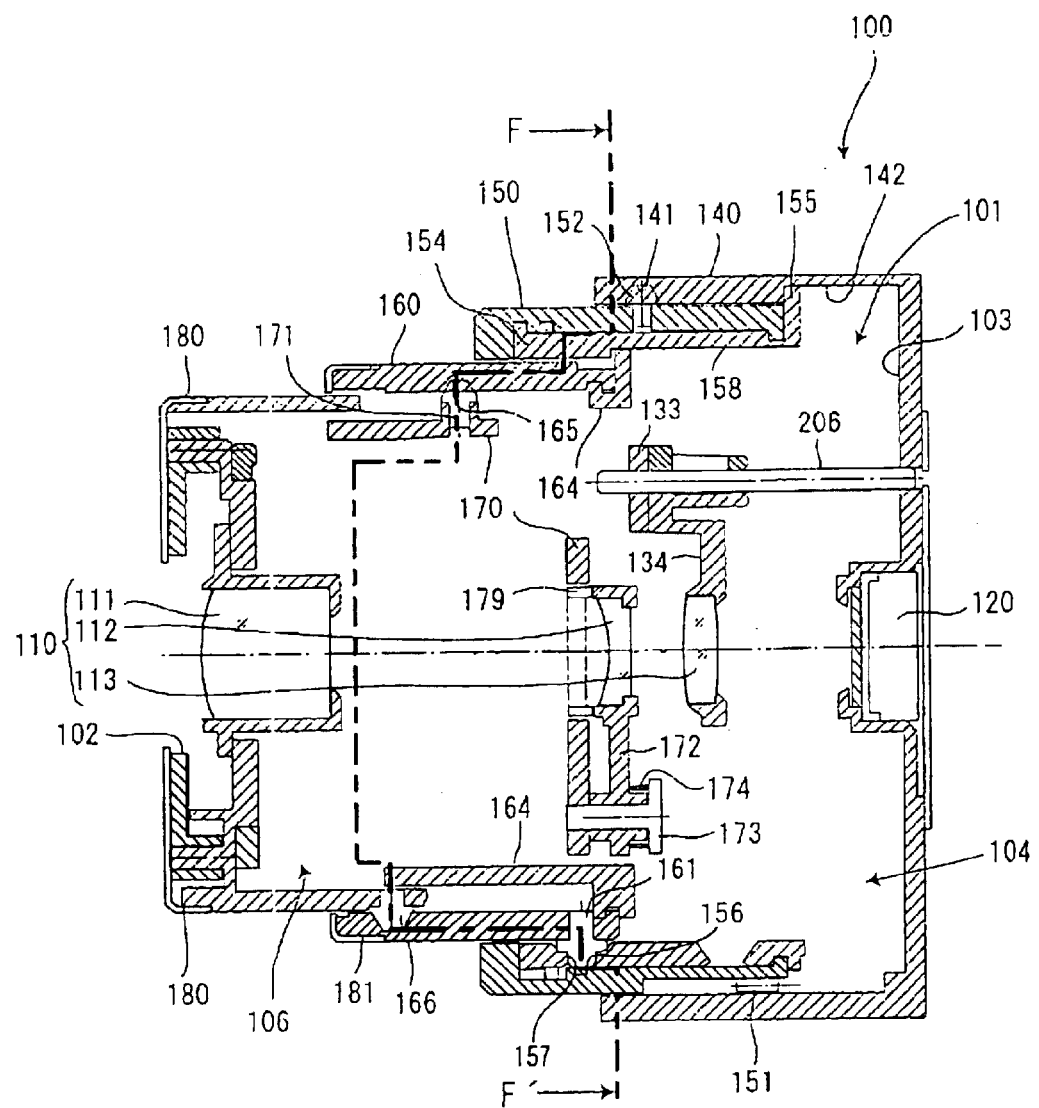
FIG. 8 is a sectional view that is the same as FIG. 7 but showing a line F–F'.
Figure 9:
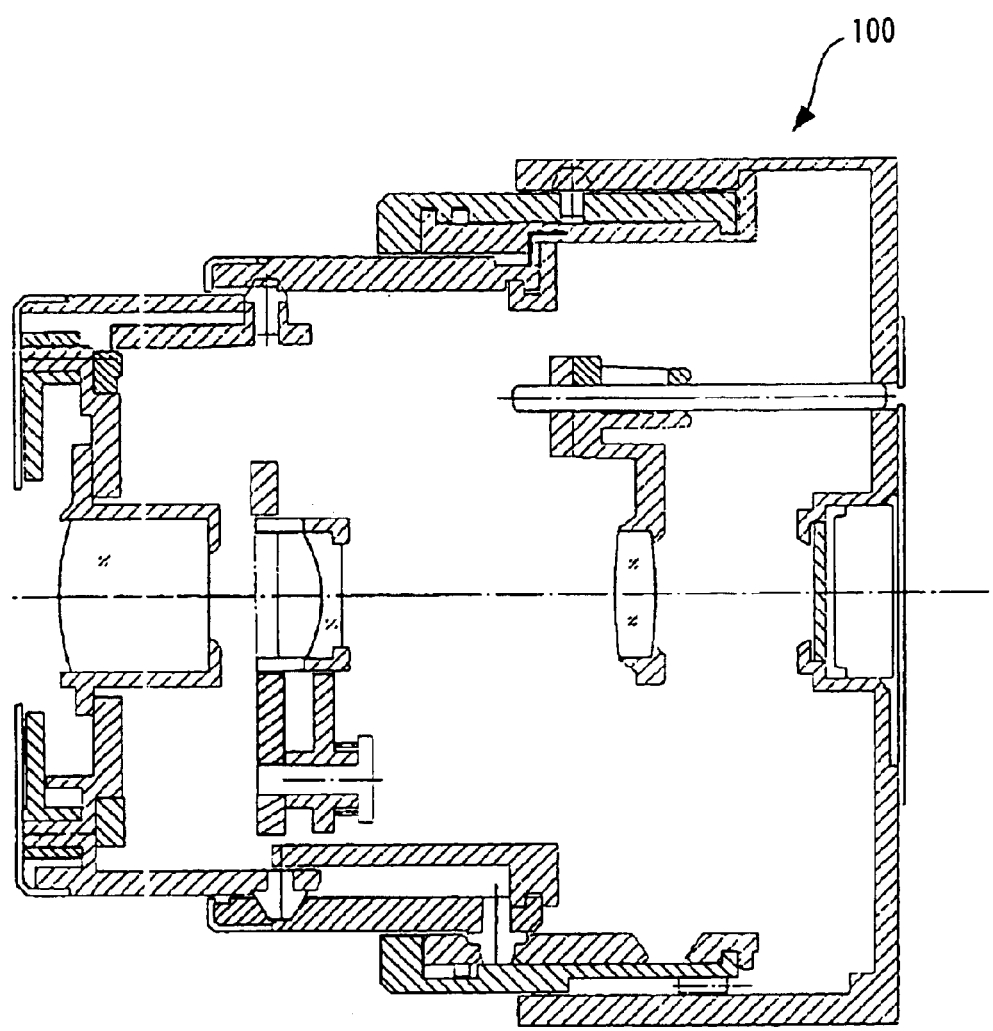
FIG. 9 is a sectional view taken along the line A–A' in FIG. 4 showing a state of the wide-edge.
Figure 10:
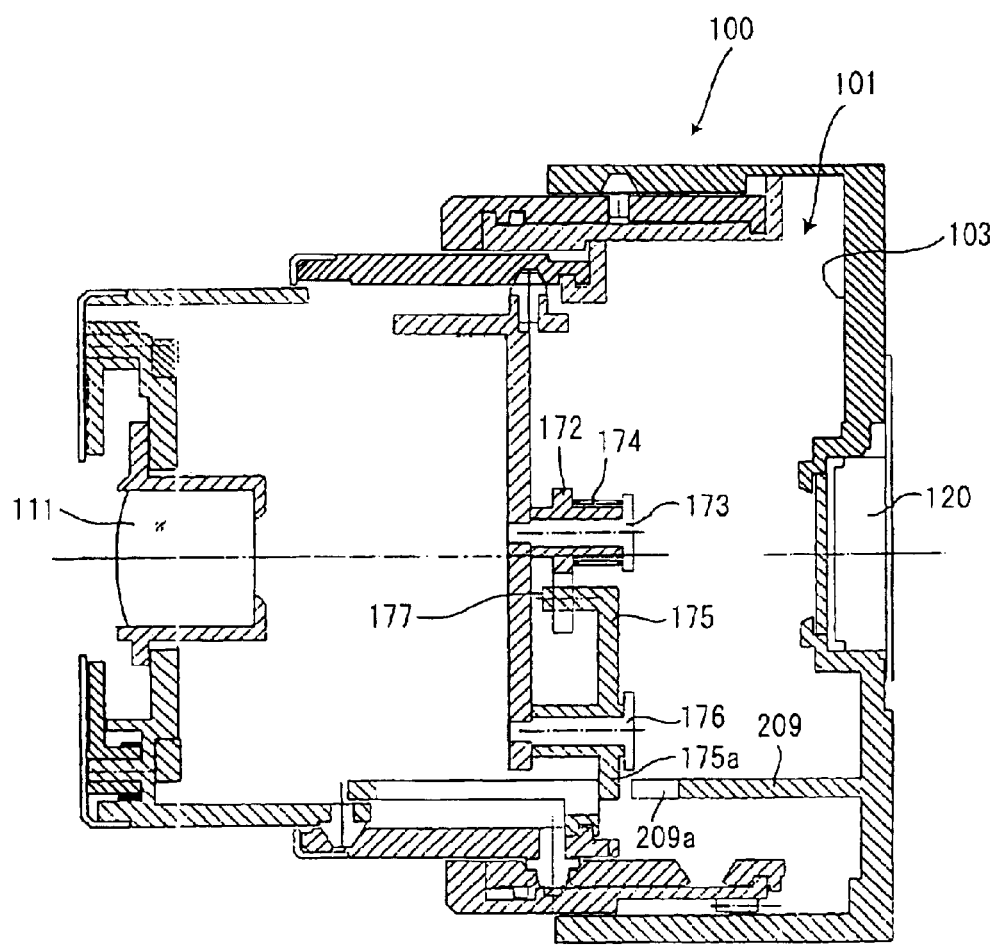
FIG. 10 is a sectional view taken along the line G–G' in FIG. 6.
Figure 11:
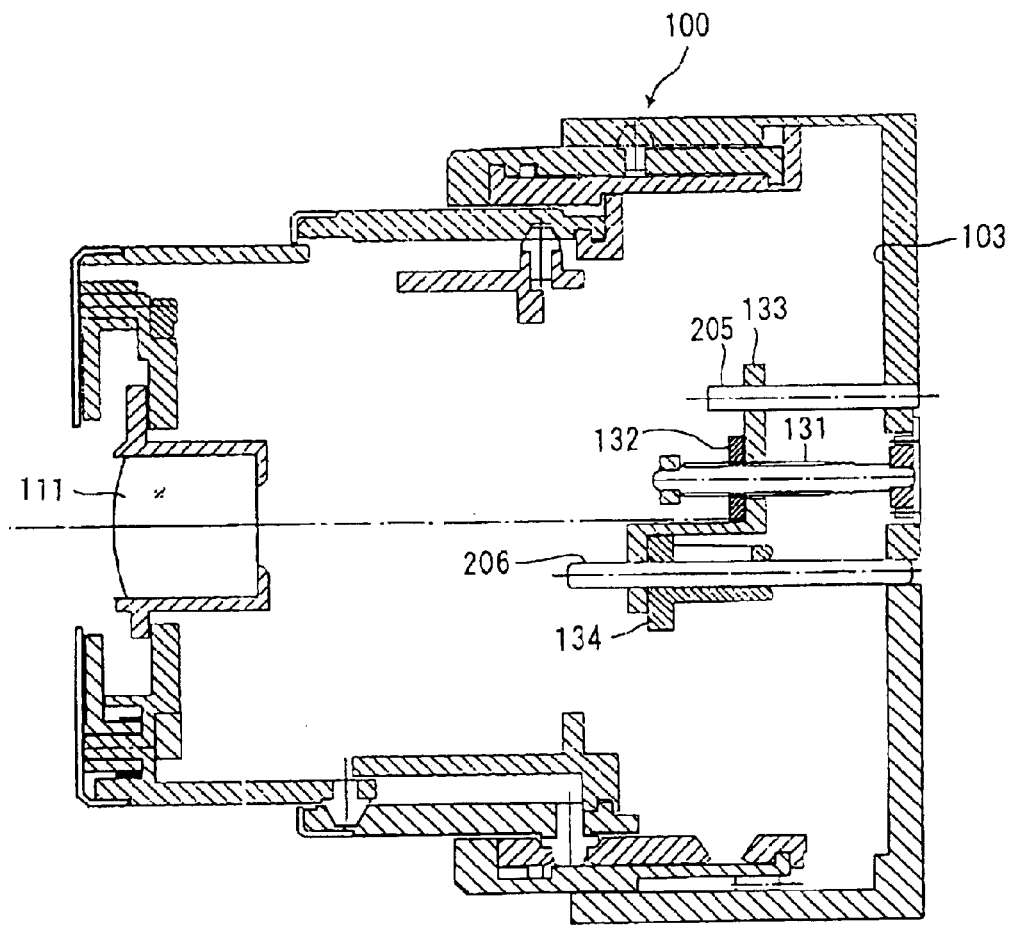
FIG. 11 is a sectional view taken along the line D–D' in FIG. 5 showing essential parts of the wide-edge state.
Figure 12:
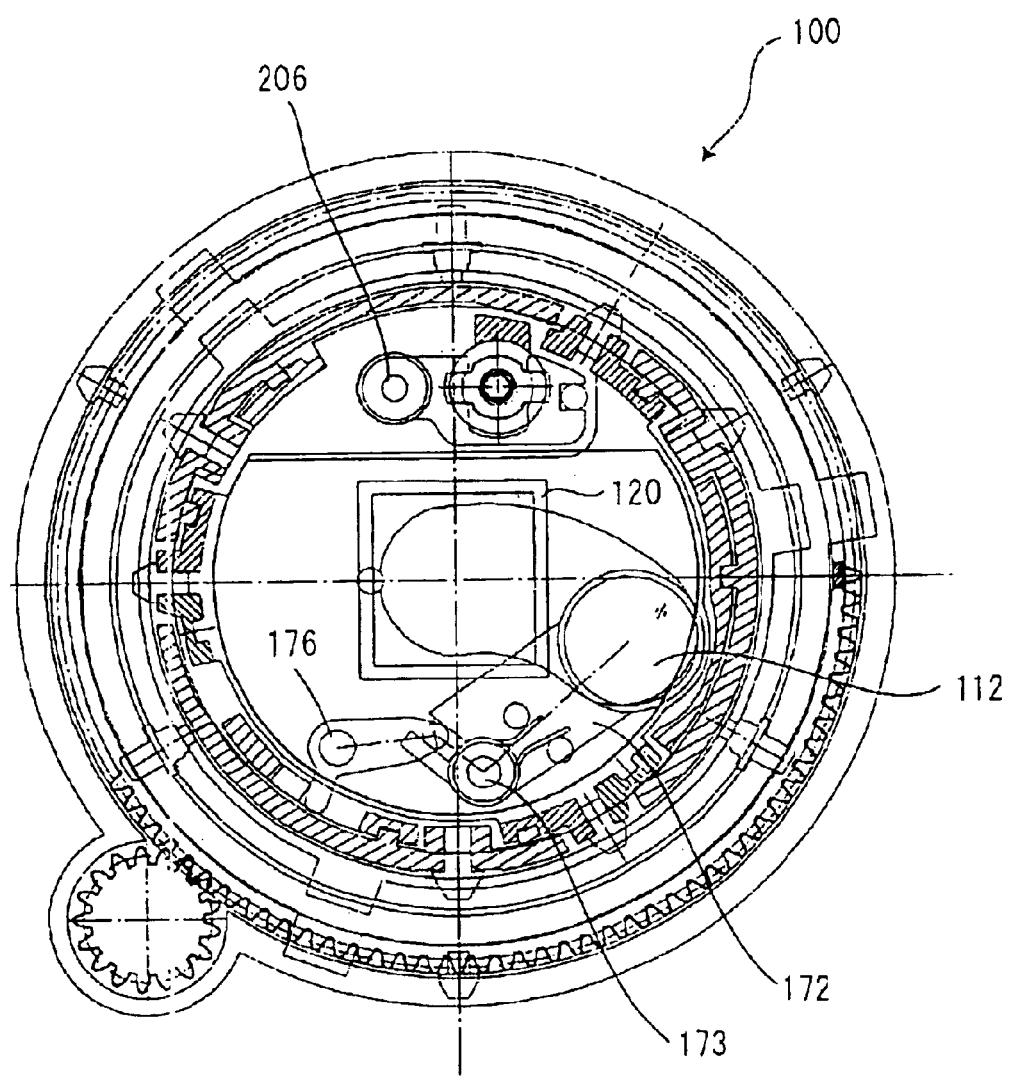
FIG. 12 is a schematic diagram showing essential parts of the retracted lens barrel of the digital camera of the first embodiment as viewed from the optical axis.
Figure 13:
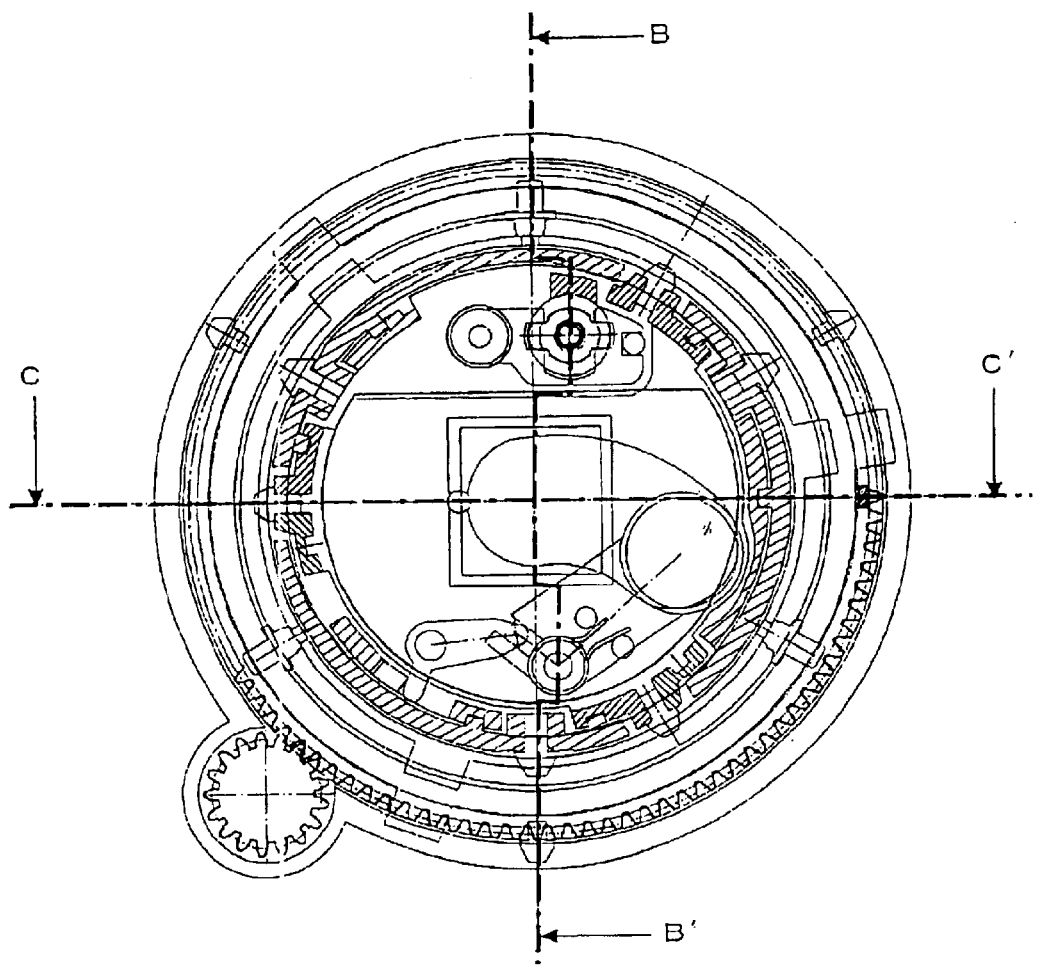
FIG. 13 is a sectional view that is the same as FIG. 12 but showing lines B–B' and C–C'.
Figure 14:
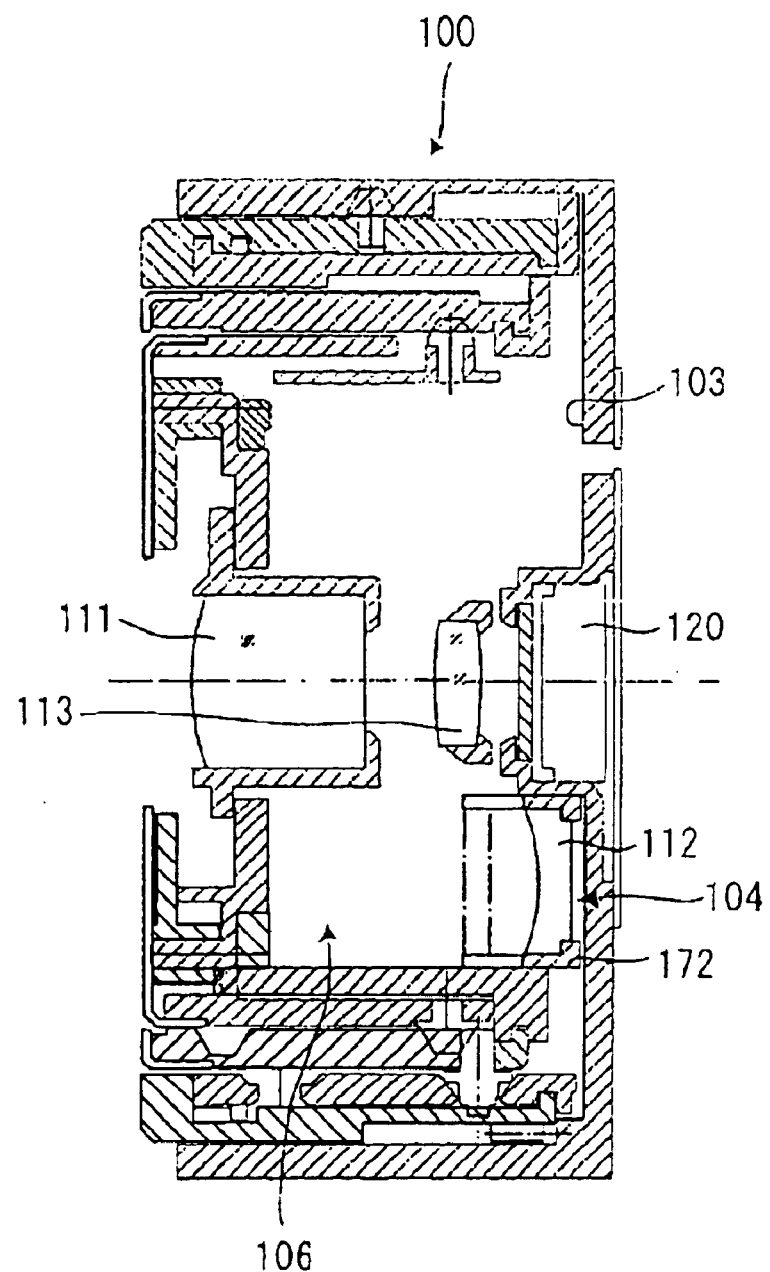
FIG. 14 is a sectional view taken along the line C–C'.
Figure 15:
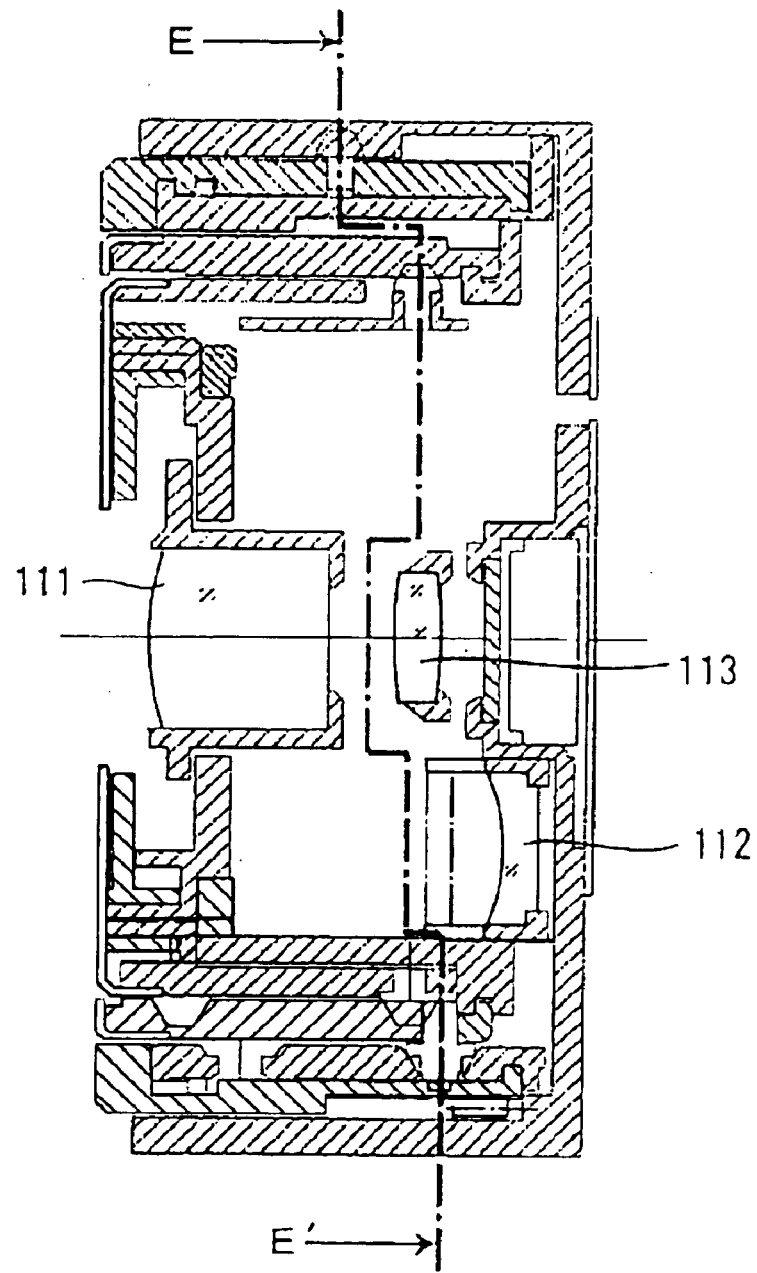
FIG. 15 is a sectional view that is the same as FIG. 14 but showing a line E–E'.
Figure 16:
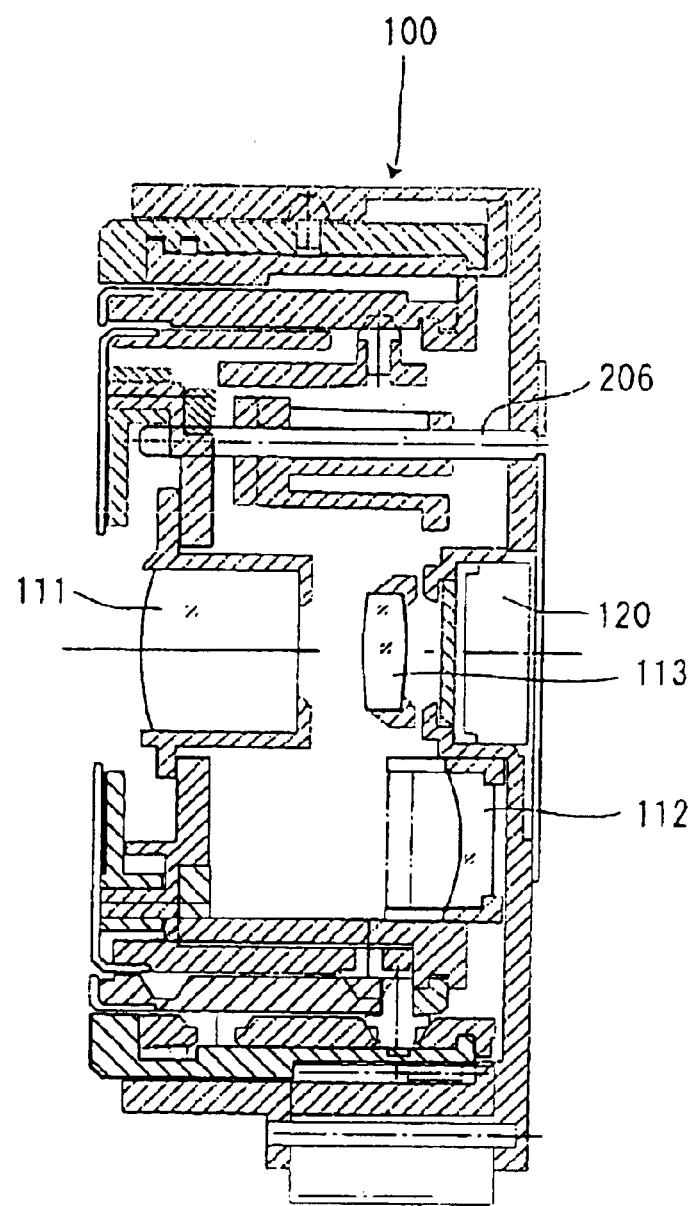
FIG. 16 is a sectional view taken along the line B–B' in FIG. 13.

FIG. 3 is a schematic diagram of essential parts of the advanced lens barrel of the digital camera of the first embodiment of the invention as viewed from the optical axis, FIG. 4 is a sectional view that is the same as FIG. 3 but showing a line A–A', FIG. 5 is a sectional view that is the same as FIG. 3 but showing a line D–D', FIG. 6 is a sectional view that is the same as FIG. 3 but showing a line G–G', FIG. 7 is a sectional view taken along the line A–A' in FIG. 4 for showing a state of the tele-edge, FIG. 8 is a sectional view that is the same as FIG. 7 but showing a line F–F', FIG. 9 is a sectional view taken along the line A–A' in FIG. 4 showing a state of the wide-edge, FIG. 10 is a sectional view taken along the line G–G' in FIG. 6, FIG. 11 is a sectional view taken along the line D–D' in FIG. 5 showing essential parts of the wide-edge state. FIG. 12 is a schematic diagram showing essential parts of the retracted lens barrel of the digital camera of the first embodiment as viewed from the optical axis, FIG. 13 is a sectional view that is the same as FIG. 12 but showing lines B–B' and C–C', FIG. 14 is a sectional view taken along the line C–C', FIG. 15 is a sectional view that is the same as FIG. 14 but showing a line E–E', and FIG. 16 is a sectional view taken along the line B–B' in FIG. 13.

Referring to mainly FIG. 7, the embodiment will be described below.

In an internal space 101 of the lens barrel 100 shown in FIGS. 3 to 16, the shooting lens 110 having the front lens group 111, the rear lens group 112 and the focus lens 113 are accommodated. These groups are arranged in this order from forward of the optical axis direction. If the rear lens group 112 of the shooting lens 110 moves between a tele-edge shown in FIG. 7 and a wide-edge shown in FIG. 9, the focal length is changed, and if the focus lens 113 moves in the optical axis direction, the focus is adjusted.

A front end of the internal space is formed with an opening 102. The shooting lens 110 is formed in the opening 102. A wall member 103 fixed to the camera body or constituting a portion of the camera body is disposed in the rear portion of the internal space. The internal space 101 is defined by the wall member 103 and later-described cylindrical bodies.

Among the cylindrical bodies, a front group frame 180 has the smallest outer diameter and is disposed forefront side on the shooting optical axis when the lens barrel advances. The front lens group 111 is held inside the front group frame 180. Since the front lens group 111 has a smaller inner diameter than that of the front group frame 180, a space is formed beside the front lens group 111 between the front lens group 111 and the front group frame 180. In the following explanation, the space between the front lens group 111 and the front group frame 180 is called front lens group side 106.

A CCD solid state imaging element (CCD, hereinafter) 120 is mounted on the wall member 103 such that the CCD 120 projects into the internal space 101. Since the CCD 120 is disposed on a position where the CCD 120 projects into the internal space 101, a dent 104 is defined by the CCD 120 and the wall member 103.

A feed screw 131 (see FIG. 11) is rotatably supported by the wall member 103. A nut member 132 shown in FIG. 11 is threadedly engaged with the feed screw 131, and a focus lens guide frame 133 which guides the focus lens 113 in the optical axis direction is fixed to the nut member 132. The focus lens guide frame 133 is fixed to the nut member 132. A guide rod 205 projecting from the wall member 103 is fitted into a fork-like groove 133a (see FIG. 3) provided in the focus lens guide frame 133. Thus, the focus lens guide frame 133 moves in the optical axis direction by rotating the feed screw 131.

A focus lens holding frame 134 which holds the focus lens 113 is fixed to the focus lens guide frame 133.

The feed screw 131 is threadedly engaged with the nut member 132 to which the focus lens guide frame 133 is fixed. The feed screw 131 is rotated by a focus motor (not shown) provided on the side of the camera body. If the feed screw 131 is rotated, the focus lens guide frame 133 fixed to the nut member 132 and the focus lens holding frame 134 fixed to the focus lens guide frame 133 move in the optical axis direction. With this, the focus lens guide frame 133 held by the focus lens holding frame 134 moves in the optical axis direction, and the position of the focus lens 113 is adjusted such that a subject image having good focus is displayed on the front surface of the CCD 120.

A fixed cylinder 140 is fixed to the wall member 103. A rotation cylinder 150 is provided inside the fixed cylinder 140. The rotation cylinder 150 is provided at its outer periphery with a gear 151 which meshes with a columnar gear 105 (see FIG. 3). The columnar gear 105 is rotated by a lens barrel driving motor (not shown). With this, the rotation cylinder 150 is turned. The fixed cylinder 140 is formed at its inner wall with a cam groove 141 (see FIG. 8). A cam pin 152 (see FIG. 8) fixed to the rotation cylinder 150 is fitted into the cam groove 141. Thus, if the rotation cylinder 150 receives the rotation force through the columnar gear 105, the rotation cylinder 150 advances or retreats in the optical axis direction while rotating.

A rotation cylinder-side straight advancing key ring 154 is provided inside the rotation cylinder 150. The rotation cylinder-side straight advancing key ring 154 can relatively rotate with respect to the rotation cylinder 150, but can not move in the optical axis direction with respect to the rotation cylinder 150. A key plate 155 is fixed to the rotation cylinder-side straight advancing key ring 154. The key plate 155 is fitted into the key groove 142 formed in an inner wall of the fixed cylinder 140 such as to advance in the optical axis direction. With this configuration, the rotation cylinder-side straight advancing key ring 154 can move in the optical axis direction but can not rotate with respect to the fixed cylinder 140. Therefore, if the rotation cylinder 150 moves in the optical axis direction while rotating, since the rotation cylinder-side straight advancing key ring 154 is prevented from rotating with respect to the fixed cylinder 140, the key ring does not rotate, but moves in the optical axis direction together with the rotation cylinder 150.

A rotatable intermediate cylinder 160 is provided inside the rotation cylinder 150. A cam groove 156 is formed in an inner wall of the rotation cylinder 150. A cam groove 157 is formed in the rotation cylinder-side straight advancing key ring 154 such that the cam groove 157 passes through the outer periphery and inner periphery of the rotation cylinder

150. A cam pin 161 provided on the intermediate cylinder 160 is fitted into the cam groove 156 of the rotation cylinder 150 such that the cam pin 161 passes through the cam groove 157 of the rotation cylinder-side straight advancing key ring 154. Thus, if the rotation cylinder 150 moves in the optical axis direction while rotating, the intermediate cylinder 160 also rotates while following shapes of the cam grooves of the rotation cylinder 150 and the rotation cylinder-side straight advancing key ring 154, and the intermediate cylinder 160 further moves in the optical axis direction with respect to the rotation cylinder 150.

An intermediate cylinder-side straight advancing key ring 164 is disposed inside the intermediate cylinder 160. The fixed cylinder-side straight advancing key ring 154 is formed with a straight advancing key groove 158. The intermediate cylinder-side straight advancing key ring 164 is fitted in the straight advancing key groove 158 of the fixed cylinder-side straight advancing key ring 154. The intermediate cylinder-side straight advancing key ring 164 can relatively rotate with respect to the intermediate cylinder 160 but is prevented from moving in the optical axis direction with respect to the intermediate cylinder 160. Thus, if the intermediate cylinder 160 moves in the optical axis direction with respect to the rotation cylinder 150 while rotating, the intermediate cylinder-side straight advancing key ring 164 does not rotate and but straightly moves in the optical axis direction as the intermediate cylinder 160 moves in the optical axis direction.

A cam groove 165 which guides a rear group guide frame 170 is formed in an inner wall of the intermediate cylinder 160. A cam pin 171 fixed to the rear group guide frame 170 is fitted into the cam groove 165 in a state in which the cam pin 171 is prevented from rotating with respect to the intermediate cylinder-side straight advancing key ring 164. Thus, if the intermediate cylinder 160 rotates, the rear group guide frame 170 straightly moves in the optical axis direction in accordance with the shape of the cam groove 165 of the inner wall of the intermediate cylinder 160.

A rear lens group holding frame 172 which holds a lens shutter unit 179 and the rear lens group 112 is supported by the rear group guide frame 170 such that the rear lens group holding frame 172 can rotate with respect to the rear group guide frame 170. When "OFF" is selected by the power switch 15, the rear lens group holding frame 172 retracts in the dent 104 beside the CCD 120 together with the rear lens group 112 and a lens shutter unit 179 as shown in FIG. 14, and when "normal" is selected by the power switch 15, the rear lens group holding frame 172 advances on the shooting optical axis together with the rear lens group 112 and the like as shown in FIG. 7. The lens shutter unit 179 located in front of the rear lens group 112 is provided with an aperture member which controls an amount of subject light passing through the shooting lens 110, and a shutter member which controls the amount of subject light passing through the shooting lens 110 by controlling the shutter speed. The aperture member and the shutter member control the amount of light using PLZT elements. The rear lens group holding frame 172 turns in a range between a using position (see FIGS. 7 and 9) where the rear lens group 112 held by the rear lens group holding frame 172 advances on the shooting optical axis of the shooting lens 110 and a retract position (see FIG. 14) where the rear lens group 112 enters into the dent 104 of the side of the CCD 120. The coil spring 174 is provided around the rotation shaft 173. The rear lens group holding frame 172 is urged by the coil spring 174 in a direction where the rear lens group 112 turns on the shooting optical axis of the shooting lens 110. The rear lens group holding frame 172 is also urged in the optical axis direction.

A mechanism in which the rear lens group holding frame 172 turns, thereby turning the rear lens group 112 and retracting into the retract position set in the dent 104 will be explained later.

The intermediate cylinder 160 is formed with another cam groove 166 which guides the front group frame 180 which holds the front lens group 111. A cam pin 181 provided on the front group frame 180 enters into the cam groove 166. The front group frame 180 is prevented by the intermediate cylinder-side straight advancing key ring 164 from rotating such that the front group frame 180 can move in the optical axis direction. Thus, if the intermediate cylinder 160 rotates, the front group frame 180 straightly moves in the optical axis direction with respect to the intermediate cylinder 160 in accordance with the shape of the cam groove 166.

With this mechanism, when "OFF" is selected by the power switch 15 at the tele-edge shown in FIG. 7, the rotating force is transmitted to the rotation cylinder 150 in the retracting direction through the columnar gear 105, the lens barrel retracts from the state of tele-edge shown in FIG. 7 to the state shown in FIGS. 14 and 16 through the state of wide-edge shown in FIG. 9. On the other hand, if "normal" is selected by the power switch 15 in the retracted state shown in FIGS. 14 and 16 and the rotation force is transmitted to the rotation cylinder 150 in the advancing direction, the lens barrel advances from the retracted state shown in FIGS. 14 and 16 to the state of wide-edge shown in FIG. 9 and further to the state of tele-edge shown in FIG. 7 through the state of wide-edge.

When "normal" is selected by the power switch 15 and a picture is to be taken, the zoom operation switch is operated to adjust the focal length between the tele-edge shown in FIG. 7 and the wide-edge shown in FIG. 9, thereby setting the shooting angle of view to a desired value. The focus of the focus lens 113 is adjusted to a position where the best contrast can be obtained by detecting the contrast based on the image signal obtained by the CCD 120. Then, if the shutter button is pushed, an image signal showing the current subject is generated by the CCD 120, appropriate image processing is carried out and then, it is stored.

A mechanism which turns the rear lens group 112 to the retract position set in the dent 104 will now be explained.

The rear lens group holding frame 172 which holds the rear lens group 112 is rotatably supported on the rear group guide frame 170 by the rotation shaft 173 as described above, and the rear lens group holding frame 172 is urged by the coil spring 174 (see FIG. 3) in a direction in which the rear lens group 112 is located on the shooting optical axis of the shooting lens 110. On the rear group guide frame 170, a lever member 175 shown in FIGS. 3 and 10 is also rotatably supported by the rotation shaft 176. As shown in FIG. 3, the rear lens group holding frame 172 is provided with a fork-like engaging groove 178. An engaging pin 177 provided on one end of the lever member 175 enters into the engaging groove 178.

As shown in FIG. 10, a projection 209 projects into the internal space 101 from the wall member 103 which defines a rear surface of the internal space 101 of the lens barrel 100. The projection 209 projects in the moving locus in the retracting direction of an end 175*a* of the lever member 175 opposite from the engaging pin 177. A tapered surface 209*a* is provided on a tip end of the projection 209. Thus, if the rotation cylinder 150 rotates in the retracting direction, the intermediate cylinder 160 and the rear group guide frame 170 which is engaged with the intermediate cylinder 160 through the cam also move in the retracting direction, the end 175a of the lever member 175 abuts against the tapered surface 209a of the projection 209 and moves along the tapered surface 209a. With this, the lever member 175 turns from a position shown in FIG. 3 to a position shown in FIG. 12. Since the engaging pin 177 of the lever member 175 enters into the fork-like engaging groove 178 of the rear lens group holding frame 172, the rear lens group holding frame 172 also turns around the rotation shaft 173, thereby retracting the rear lens group 112 from a position on the shooting optical axis shown in FIG. 3 to the retracted position out from the optical axis shown in FIG. 12. This retracted position is the dent 104 formed beside the CCD 120 as shown in FIG. 14.

If the lens barrel moves from the retracted state shown in FIGS. 14 and 16 in the advancing direction, the engagement between the lever member 175 and the projection 209 projecting from the wall member 103 shown in FIG. 10 is released. The rear group holding frame 175 is urged by the coil spring 174 and turns from the state shown in FIG. 12 to the state shown in FIG. 3. With this, the rear lens group 112 turns from the retracted state shown in FIG. 14 to the position on the shooting optical axis.

In the conventional digital camera in which the rear lens group 112 does not have a mechanism which retracts the lens groups on the shooting optical axis from the shooting optical axis and has a retracting and advancing mechanism which retracts the lens barrel while keeping the lens group on the shooting optical axis, the dent 104 beside the CCD 120 is prone to be a waste space. However, according to the digital camera 1 of the first embodiment, the lens groups are retracted into the dent 104 and thus, the digital camera can be reduced in thickness, and the shooting optical system having the fixed focus is formed by the front lens group 111 having positive refractive force and the focus lens having positive refractive force both remaining on the shooting optical axis. In the fixed focus shooting optical system, an image comes into focus at a distance of 1 m to 2 m from the camera, and when "retract" is selected by the power switch 15, a picture can be taken in the retracted state. In the explanation concerning FIG. 17, details of the shooting in the retracted state will also be explained.

Figure 17:
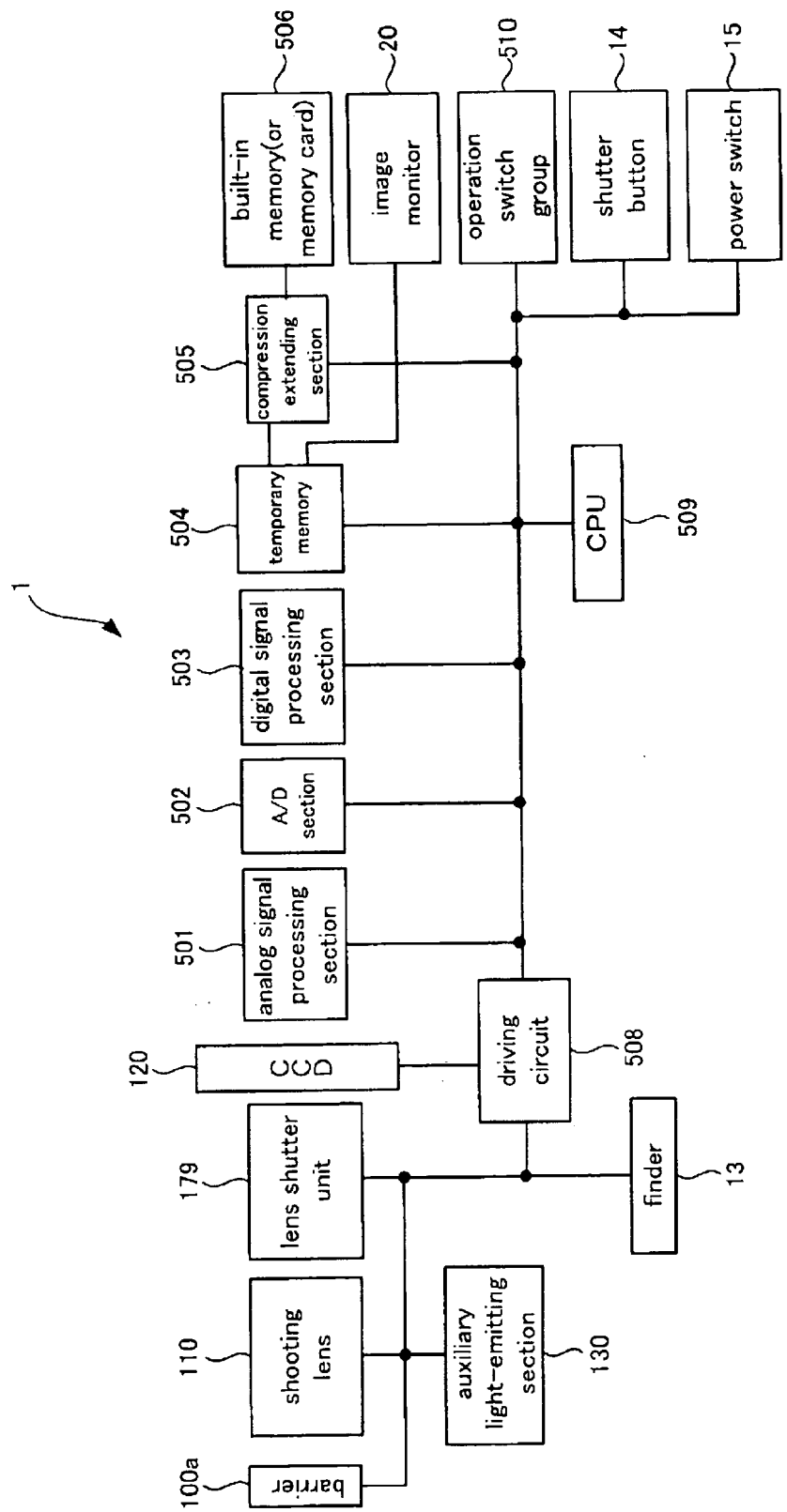
FIG. 17 is a block diagram showing a circuit configuration of the digital camera of the first embodiment.

FIG. 17 is a block diagram showing a circuit configuration of the digital camera shown in FIGS. 1 to 16.

The digital camera 1 includes the shooting lens 110, the lens barrier 100a that protects the shooting lens 110, the lens shutter unit 179 and the CCD 120. In this digital camera 1, when "normal" is selected by the power switch 15, the barrier 100a is opened and the lens barrel 100 advances until the angle of view becomes predetermined wide-angle side. On the other hand, when the power switch 15 is set to the position "retract" and the shooting in the retracted state is selected by the power switch 15, the lens barrel 100 does not advance and the barrier 100a is opened so that a picture can be taken with the fixed focus formed by the front lens group and the focus lens. When the "normal" is selected by a power switch 15, this means the shooting state. The shooting state is a state in which an image is formed using all of the lens groups constituting the shooting lens 110. Here, shooting at the time of retraction means an accommodated state. In this state, the barrel length is shortened to a value smaller than the shortest barrel length of the shooting state.

That is, when the shooting lens is moved to the retracted position through the widest-angle position (when the lens barrel is brought into the accommodated state), the second lens group retracts from the optical axis and a picture can be taken in the retracted position (in the accommodated state).

For example, the lens barrel incorporates, therein, a shooting lens which includes lens groups and which adjusts a focus, in which a focal length can be changed, a length of the lens barrel can be changed between an accommodated state having a relatively short barrel length and a shooting state having a relatively long barrel length, the lens barrel including a lens retracting mechanism which retracts at least one of the lens groups from a shooting optical axis when the lens barrel moves into the accommodated state, and a lens advancing mechanism which advances the retracted lens group to the shooting optical axis when the lens barrel moves to the shooting state, wherein when the shooting lens is in the accommodated state, remaining lens groups except the lens group which retracted from the shooting optical axis form a shooting optical system, thereby making it possible to take a picture.

A subject image formed on the CCD 120 through the shooting lens 110 and the lens shutter unit 179 is converted into an analog image signal by the CCD 120. The lens shutter unit 179 restrains smear from being generated by light when the analog signal is read from the CCD 120.

The digital camera 1 also includes an auxiliary light-emitting section 130 and the finder 13. The auxiliary light-emitting section 130 emits auxiliary light from the auxiliary light-emitting window 12 when illumination is low. The auxiliary light-emitting section 130 can also emit light if necessary even when illumination is not low.

In the digital camera 1, when "normal" is selected by the power switch 15, if the electric charge of the auxiliary light-emitting section 130 is not sufficient, the shutter button 14 can not be pushed fully and a picture can not be taken, but when "retract" is selected by the power switch 15 and shooting in the retracted state is selected, even if the electric charge is insufficient, the shutter button 14 can be pushed fully and shooting can be carried out. The finder 13 provided in the digital camera 1 is the optical finder as described above, and is a zoom finder which is controlled in association with the focal length adjustment by a driving circuit 508 when the "normal" is selected by the power switch 15. When "retract" is selected by the power switch 15 and shooting in the retracted state is selected, the finder 13 is adjusted to the fixed focus angle of view.

The digital camera 1 includes an analog signal processing section 501, an A/D section 502, a digital signal processing section 503, a temporary memory 504, a compression extending section 505, a built-in memory (or memory card) 506, the image monitor 20 (see FIG. 1), and the driving circuit 508. The CCD 120 is driven with timing generated by a timing generating circuit (not shown) in the driving circuit 508 and outputs an analog image signal. The driving circuit 508 also includes a driving circuit which drives the shooting lens 110, the lens shutter unit 179, the auxiliary light-emitting section 130 and the like. In the driving circuit 508, when "normal" is selected by the power switch 15, the focus lens (third group) is moved on the shooting optical axis such that the contrast becomes maximum, but when "retract" is selected by the power switch 15 and the shooting in the retracted state is selected, the focus lens (third group) is disposed and fixed such that an image comes into focus at a distance of 1 m to 2 m from the camera. The analog image signal which is output from the CCD 120 is subjected to the analog signal processing by the analog signal processing section 501, and A/D converted by the A/D section 502 and is subjected to the digital signal processing by the digital signal processing section 503. Data indicative of signal which was subjected to the digital signal processing is temporarily stored in the temporary memory 504. The data stored in the temporary memory 504 is compressed by the compression extending section 505, and is stored in the built-in memory (or memory card) 506. Depending upon the shooting mode, the data may directly be stored in the built-in memory 506 without compressing the data. The data stored in the temporary memory 504 is read by the image monitor 20 and the subject image is displayed on the image monitor 20.

The digital camera 1 further includes a CPU 509 which controls the entire digital camera 1, an operation switch group 510 including the zoom operation switch, and the shutter button 14. The operation switch group 510 is operated to obtain a desired shooting state including a desired angle of view, and if the shutter button 14 is pushed, a picture can be taken.

The above is the explanation of the first embodiment. Other embodiments of the present invention will now be explained. In each of embodiments explained below, the outward appearance of the digital camera of the first embodiment shown in FIG. 1 is used as it is, and only different feature of each embodiment will be explained.

Figure 18:
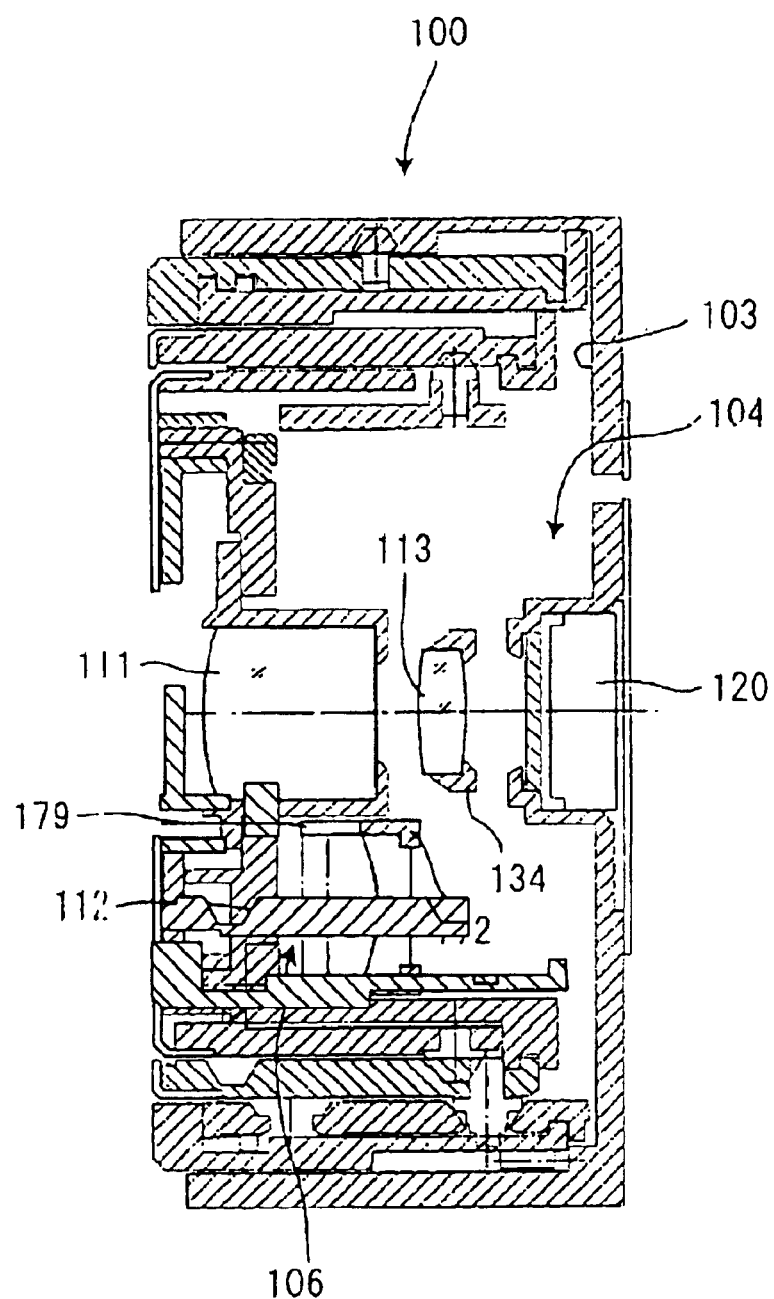
FIG. 18 is a sectional view of a digital camera according to a second embodiment of the invention.

FIG. 18 is a sectional view of a digital camera according to a second embodiment of the invention.

The sectional view of the digital camera of the second embodiment shown in FIG. 18 corresponds to FIG. 14 showing the first embodiment. The second embodiment is different from the first embodiment only in that the rear lens group 112 retracts into the dent 104 beside the CCD 120 in the first embodiment, but the rear lens group 112 is retracted to the front lens group side 106 in the second embodiment. Since other portion is the same as that of the first embodiment, explanation thereof will be omitted.

In the case of the conventional digital camera in which the rear lens group 112 does not have a mechanism which retracts the lens group on the shooting optical axis from the shooting optical axis and which has a retracting and advancing mechanism which retracts the rear lens group 112 while leaving the lens group on the shooting optical axis, the front lens group side 106 is prone to be a waste space. In the digital camera of the second embodiment, the rear lens group 112 is retracted to the front lens group side 106, and the camera can be reduced in thickness. Further, the front lens group 111 having positive refractive force and the focal length having positive refractive force remaining on the shooting optical axis constitute the fixed focus shooting optical system, thereby making it possible to take a picture at the time of retraction.

Figure 19:
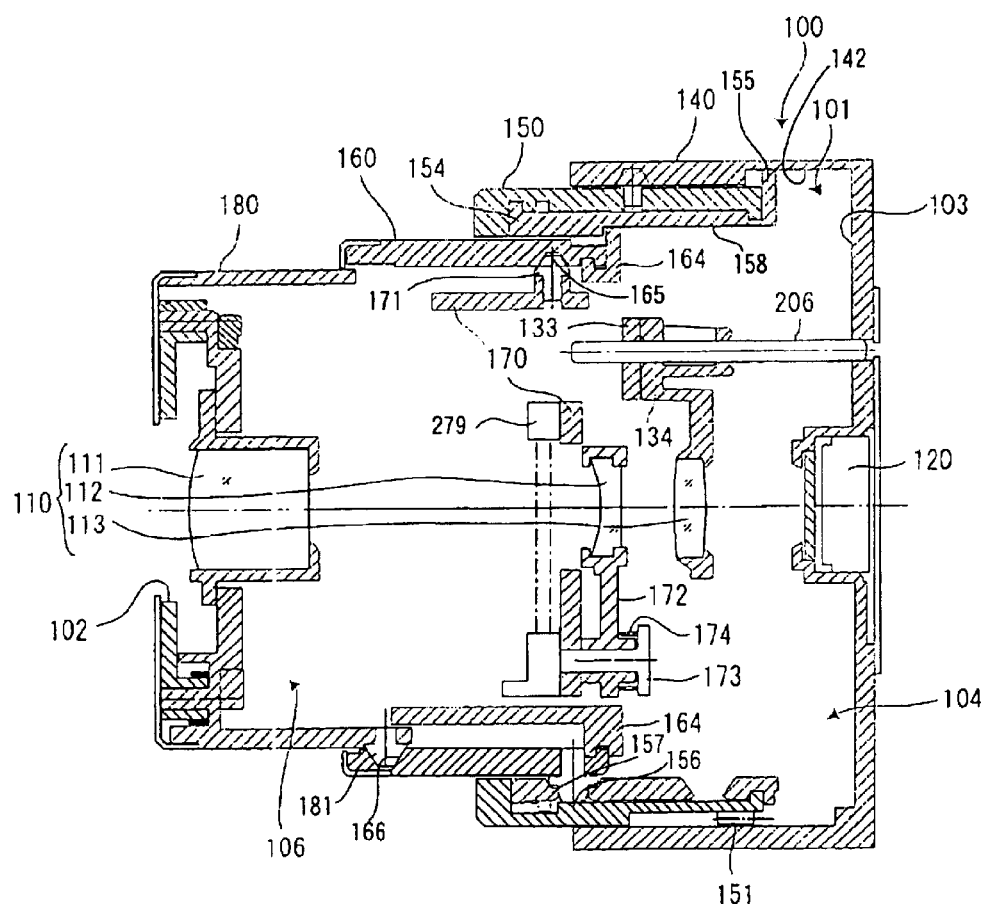
FIG. 19 is a sectional view of the advanced lens barrel of a digital camera of a third embodiment of the invention.
Figure 20:
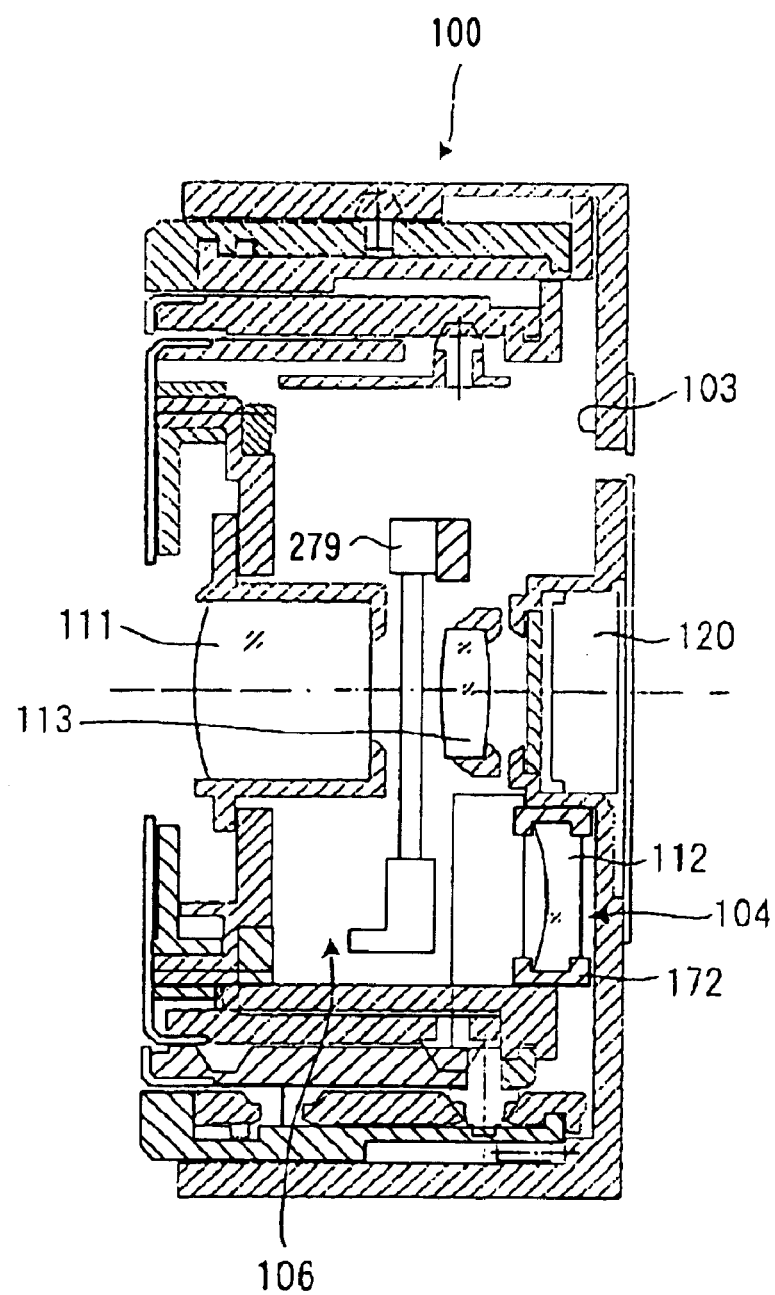
FIG. 20 is a sectional view of the retracted lens barrel of the digital camera of the third embodiment of the invention.

FIGS. 19 and 20 are sectional views of the lens barrel respectively in the advanced state and the retracted state of a digital camera of a third embodiment of the present invention. The lens barrel shown in FIGS. 19 and 20 can change its barrel length between the accommodated state having the relatively short barrel length and the shooting state having the relatively long barrel length.

Here, the second embodiment includes a mechanical shutter unit 279 including a mechanical aperture member and a shutter member instead of the lens shutter unit 179 (e.g. see FIG. 7) using the PZLT element of the first embodiment. The lens shutter unit 179 of the first embodiment is fixed, together with the rear lens group 112, to the rear lens group holding frame 172 which holds the rear lens group 112. In the second embodiment, the lens shutter unit 279 is not fixed to the rear lens group holding frame 172, but is fixed to the rear lens group guide frame 170 which rotatably supports the rear lens group holding frame 172 as shown in FIG. 19. Therefore, even if the rear lens group 112 retracts from the optical axis by retraction as shown in FIG. 20, the lens shutter unit 279 remains on the shooting optical axis. Thus, in the case of the second embodiment, it is possible to operate the aperture and shutter even during shooting in the retracted state, and to prevent smear and the like.

Although the digital camera of the second embodiment includes the CCD 120, since the lens shutter unit 279 stays on the shooting optical axis also in the retracted state and the light passing through the lens barrel can be shut off, the third embodiment can also be applied to a camera which takes a picture on a silver-salt film.

In the above explained embodiments, when the rear lens group 112 retracts from the shooting optical axis, the lens shutter unit having both the aperture member and the shutter member is also retracts, or the lens shutter unit having both the aperture member and the shutter member remains on the shooting optical axis. The present invention is not limited to this. The shutter member may be provided on the focus lens holding frame and the aperture member may retract together with the rear lens group. Or, the aperture member may be formed in the focus lens holding frame and the shutter member may be provided on the rear lens group frame. When the aperture member is allowed to remain on the shooting optical axis, spherical aberration generated when the rear group retracts may be corrected by reducing the aperture value to a value smaller than that of normal shooting during shooting in the retracted state. It is possible to reduce the influence of the curvature of field generated when the rear groups retracts by reducing the angle of view instead of the aperture member.

The PLZT element is used as the light amount control member in the first and second embodiments, but liquid crystal may be used. The light amount control member is not always limited to element using electrical optical element, and the mechanical shutter unit which mechanically controls the opening diameter and shutter speed may be used, or an iris diaphragm unit which advances and retracts an iris having a predetermined opening on the shooting optical axis may be used.

The above explained first and second embodiments are based on digital camera which shoots a freeze-frame picture among others, but the present invention can also be applied to a digital camera which shoots a moving video picture, and a digital camera which shoots both freeze-frame picture and moving video picture.

When the lens shutter unit is allowed to remain on the shooting optical axis also when the lens barrel is retracted as in the second embodiment, the present invention can also be applied to a camera of a type which taking a picture on a silver-salt film.

In each of the embodiments, the shooting lens has three groups, i.e., the front lens group, the rear lens group and the focus lens arranged in this order from forward of the optical axis direction, the focal length can be changed, and the focus is adjusted by moving the focus lens. The present invention is not limited to this. The invention can also be applied to a general camera having lens groups including the focus lens and arranged on the shooting optical axis, the focal length can be changed and the focus is adjusted by moving the focus lens. According to the present invention, as long as one of the lens groups is retracted from the shooting optical axis when the lens barrel is retracted to reduce the thickness of the camera, and the fixed focus shooting optical system is formed by the remaining lens groups on the shooting optical axis, any of the lens groups may retract from the shooting optical axis.

Figure 21:
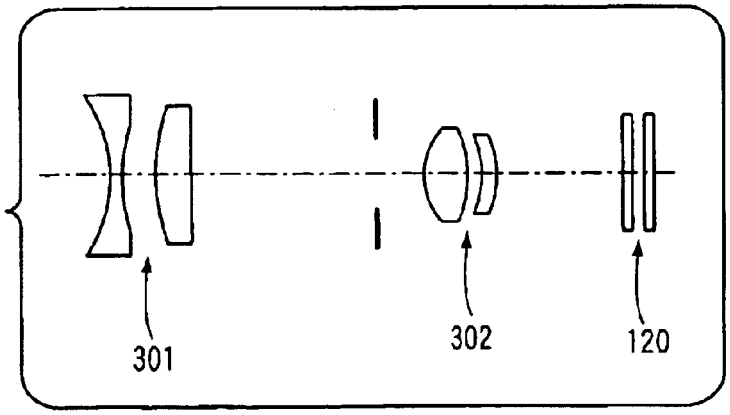
FIGS. 21(a) through 21(c) are schematic diagrams of arrangement of each lens group on a shooting optical axis when a shooting lens of a third embodiment advances and retreats.
Figure 21:
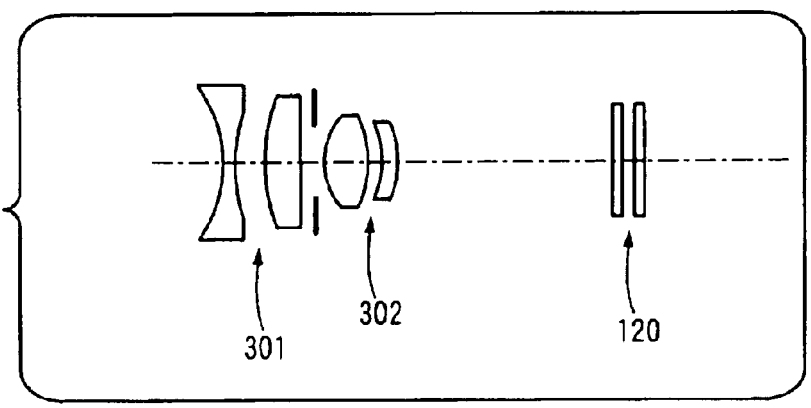
Figure 21:
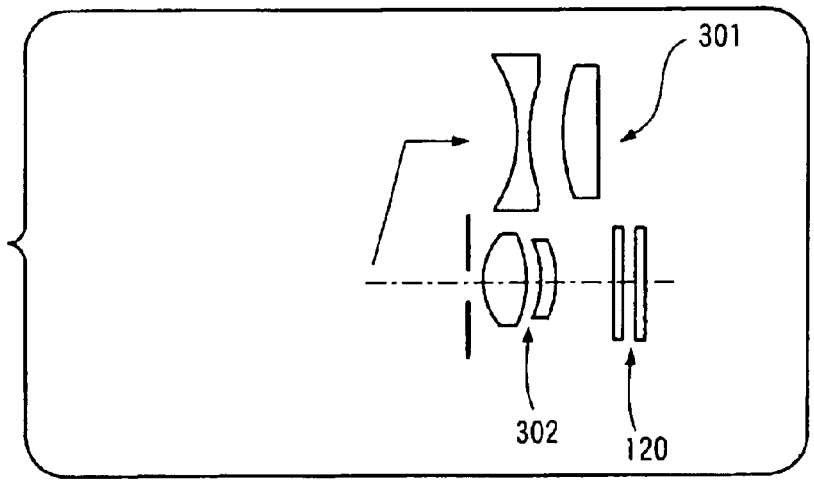

FIGS. 21(a) through 21(c) show arrangement of each lens group on a shooting optical axis when a shooting lens of a digital camera of the third embodiment according to the present invention advances and retracts. In FIGS. 21(a) through 21(c), the left side is the object side, and the CCD 120 is shown on the right side.

The shooting lens of the third embodiment shown in FIG. 21(a) through 21(c) is a zoom lens including two groups, i.e., a front lens group 301 and a rear lens group 302.

FIG. 21(a) shows the arrangement of the front lens group 301 and the rear lens group 302 at the time of wide-angle shooting, and FIG. 21(b) shows the arrangement of the front lens group 301 and the rear lens group 302 at the time of telephoto shooting. FIG. 21(c) shows the arrangement of the front lens group 301 and the rear lens group 302 when the lens barrel is retracted, but here, the front lens group 301 retracts from the shooting optical axis and only the rear lens group 302 remains on the shooting optical axis.

In the digital camera of the third embodiment, like the first embodiment, a case in which the "normal" is selected by the power switch 15 means the shooting state as explained with reference to FIG. 1. In this state, an image is formed using all of the plurality of lens groups constituting the shooting lens 110. Here, shooting at the time of retraction means an accommodated state. In this state, the barrel length is shortened to a value smaller than the shortest barrel length of the shooting state.

That is, when the shooting lens is moved to the retracted position through the widest-angle position (when the lens barrel is brought into the accommodated state), the second lens group retracts from the optical axis and a picture can be taken in the retracted position (in the accommodated state).

For example, the lens barrel incorporates, therein, a shooting lens which includes two lens groups, i.e., the front lens group and the rear lens group arranged in this order from forward in the optical axis direction, and which adjusts a focus, in which a focal length can be changed, a length of the lens barrel can be changed between an accommodated state having a relatively short barrel length and a shooting state having a relatively long barrel length, the lens barrel including a lens retracting mechanism which retracts at least one of the lens groups from a shooting optical axis when the lens barrel moves into the accommodated state, and a lens advancing mechanism which advances the retracted lens group to the shooting optical axis when the lens barrel moves to the shooting state, wherein when the shooting lens is in the accommodated state, remaining lens groups except the lens group which retracted from the shooting optical axis form a shooting optical system, thereby making it possible to take a picture.

In the digital camera of this embodiment, as shown in FIG. 21(c), when the lens barrel is retracted, even if the front lens group 301 retracts from the shooting optical axis, since the rear lens group 302 remaining on the shooting optical system forms a fixed focus shooting optical system, a picture can be taken in the retracted state of the lens barrel. Further, since the front lens group 301 retracts from the shooting optical axis, the thickness of the digital camera when the lens barrel is retracted is thinner as compared with a case in which the lens groups are not retracted when the lens barrel is retracted, and thus distances between the lens groups on the shooting optical axis are reduced. In the digital camera of this embodiment, when shooting in the retracted state, in order to avoid the influence of aberration of the image due to influence of shooting using only the rear lens group, the digital camera is set such that the shooting is carried out in a state in which the angle of view is narrowed and the aperture is narrowed.

A mechanism which retracts the front lens group 301 from the shooting optical axis can be obtained by applying, to the front lens group 301, a mechanism which retracts the rear lens group 112 (see FIG. 7 for example) in the first embodiment from the shooting optical axis, and this mechanism is not shown in the drawing.

Next, a fourth embodiment of the present invention will be explained.

Figure 22:
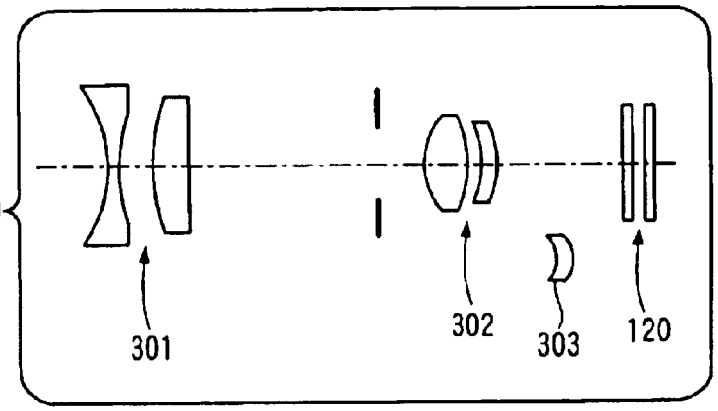
FIGS. 22(a) through 22(c) are schematic diagrams of arrangement of each lens group on a shooting optical axis when a shooting lens of a fourth embodiment advances and retracts.
Figure 22:
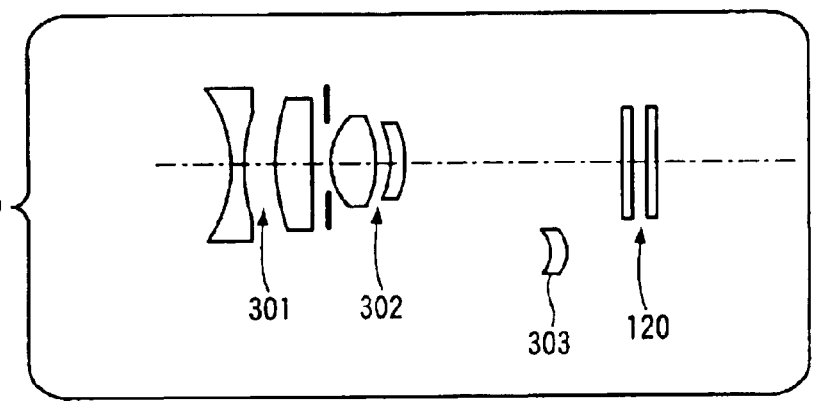
Figure 22:
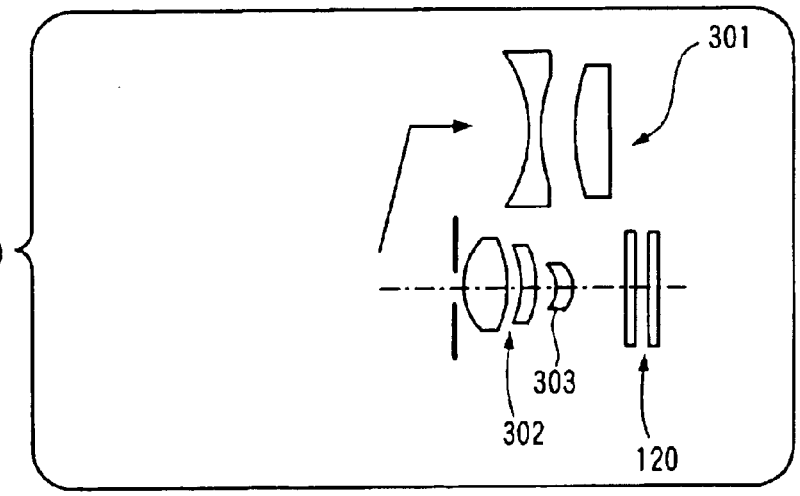

FIGS. 22(a) through 22(c) show arrangement of each lens group on the shooting optical axis when the shooting lens of a digital camera of the fourth embodiment advances and retracts. FIGS. 22(a) through 22(c) correspond to FIGS. 21(a) through 21(c) in the third embodiment.

The fourth embodiment is different from the third embodiment only in that the digital camera of the fourth embodiment includes a correction lens 303 which stays out of shooting optical axis at the time of normal shooting, and which advances onto the shooting optical axis only when the lens barrel is retracted.

FIG. 22(a) shows the front lens group 301, the rear lens group 302 and the correction lens 303 which stays out from the shooting optical axis at the time of wide-angle shooting according to the digital camera of this embodiment. FIG. 22(b) shows the front lens group 301, the rear lens group 302 and the correction lens 303 which stays out from the shooting optical axis at the time of telephoto shooting according to the digital camera of this embodiment. That is, in this embodiment, the correction lens 303 is disposed in a state in which it retracts from the shooting optical axis at the time of normal shooting.

FIG. 22(c) shows the arrangement of the front lens group and the rear lens group when the lens barrel is retracted. Here, the front lens group 301 retracts from the shooting optical axis while the correction lens 303 advances to a rear side of the rear lens group 302 which remains on the shooting optical axis.

The correction lens 303 shown in FIGS. 22(a) through 22(c) is a lens which remains on the shooting optical axis when the lens barrel is retracted and which corrects the aberration of the rear lens group 302 in this embodiment.

In the digital camera of this embodiment, as shown in FIG. 22(c), even if the front lens group 301 retracts from the shooting optical axis when the lens barrel is retracted, the rear lens group 302 and the correction lens 303 which remain on the shooting optical axis form the fixed focus shooting optical system. Thus, even when the lens barrel is retracted, a picture can be taken. In the present embodiment, since the correction lens is employed, the setting in the third embodiment in which the angle of view is narrowed and the aperture is narrowed can be changed to a setting in which the angle of view is widened and the aperture is widened. The thickness of the correction lens is sufficiently thin as compared with the front lens group retracted from the shooting optical axis. Since the front lens group 301 is retracted from the shooting optical axis when the lens barrel is retracted, the digital camera can be reduced in thickness as compared with a camera in which the distances between the lens groups on the shooting optical axis are simply reduced without retracting any of the lens groups when the lens barrel is retracted.

Any known mechanism may be employed for advancing the correction lens 303 to the shooting optical axis at the time of retraction. For example, the correction lens 303 may be advanced to the shooting optical axis at the time of retraction by the same mechanism as that used for retracting the rear lens group (see FIG. 7 for example) of the first embodiment from the shooting optical axis.

Next, a fifth embodiment will be explained.

Figure 23:
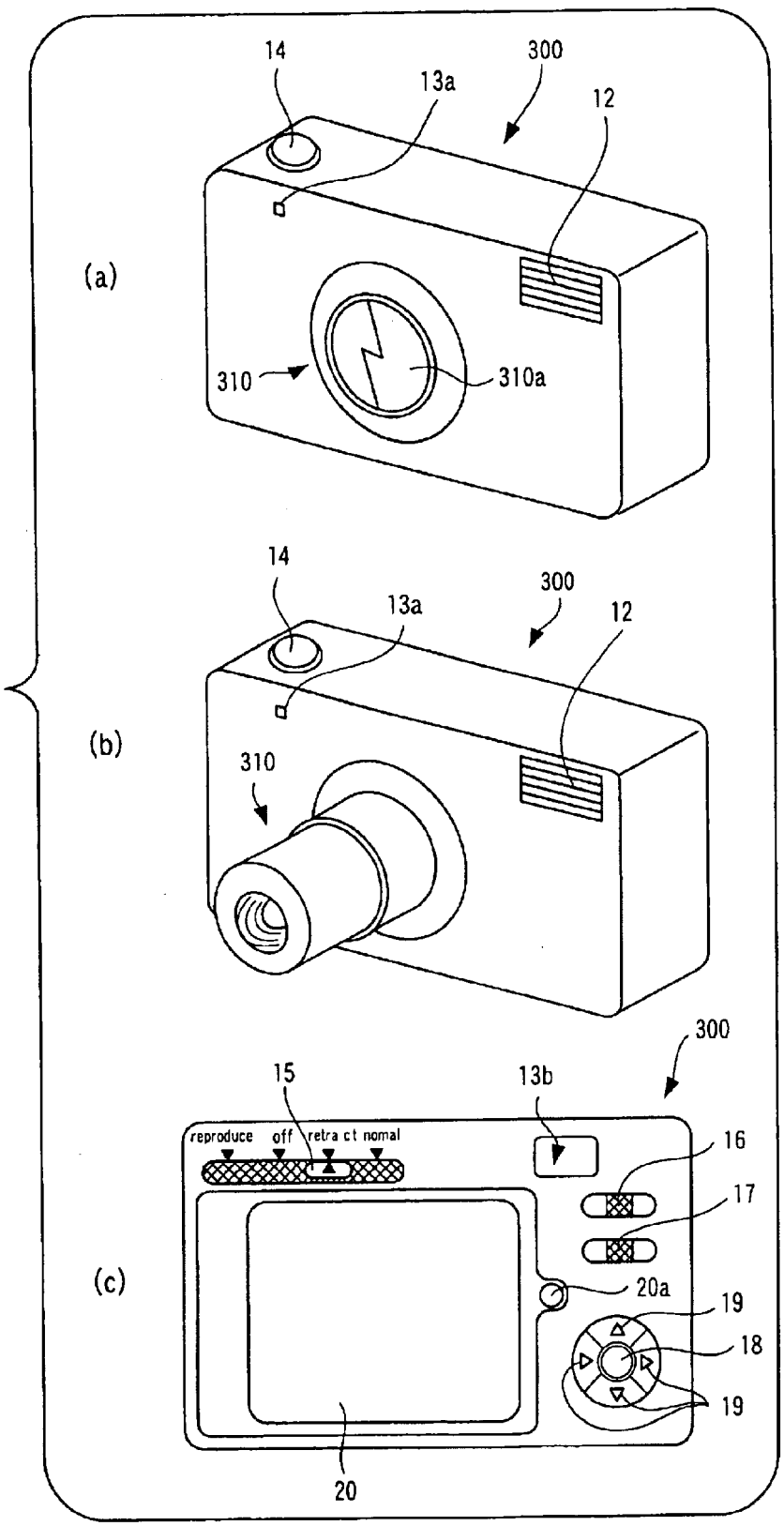
FIG. 23 is a perspective view of an outer appearance of a digital camera 300 according to a fifth embodiment of the invention.

FIG. 23 shows an outer appearance of a digital camera 300 of the fifth embodiment of the present invention.

Part (a) of FIG. 23 shows the retracted state of the lens barrel 310 of the camera of this embodiment. Part (b) of FIG. 23 shows the advancing state of the lens barrel 310 of the digital camera 300. Part (c) of FIG. 23 is a rear view of the digital camera 300.

In FIG. 23, the lens barrel 310 of the digital camera 300 incorporates, therein, a shooting lens including four lens groups as will be described later. The focal length is adjusted by moving the lens groups in the optical axis direction, and the focus is adjusted by moving the focus lens which is a fourth lens group in the optical axis direction. The length of the lens barrel can be changed between the shooting state having the relatively short barrel length and the shooting state having the relatively long barrel length.

An auxiliary light-emitting window 12 and a finder object window 13a are disposed on an upper portion of a front surface of the digital camera 300 shown in FIG. 23. A shutter button 14 is disposed on an upper surface of the digital camera 300. The shutter button 14 has two modes, i.e., a halfway-push mode and a fully-push mode. If the shutter button 14 is pushed halfway, the focus is adjusted, and if the button is fully pushed, shooting is carried out. On the front surface of the lens barrel 310, there is provided a lens barrier 310a for covering the front surface of the lens barrel 310 when the lens barrel 310 is retracted.

The digital camera 300 is provided at its back surface with a power switch 15, a finder window 13b, an image monitor 20, a setting-display button 16, a record-instructing button 17, an image display on/off button 20a, a cross key 19, and a zoom operation switching button 18. A user keeps pushing the zoom operation switching button 18 for a predetermined time to bring the shooting mode into a zoom operation mode, the lens barrel 100 moves toward the telephotographic side while the user keeps pushing an upward mark of the cross key 19. In the zoom operation mode, the lens barrel 310 moves to a wide-angle side while the user keeps pushing a downward mark of the cross key 19. Then, if the user again keeps pushing the zoom operation switching button 18 for a predetermined time, the zoom operation mode is released.

The image display on/off button 20a is a button which instructs whether an image is displayed on the image monitor 20. In this digital camera 300, even if the image display on/off button 20a is turned off, an image obtained by shooting is displayed on the image monitor 20 for a predetermined time. When the image monitor 20 is off, a picture is taken while checking a field from the finder 13.

The setting-display button 16 is operated when a currently set value such as shutter speed or sensitivity is to be displayed. The record-instructing button 17 is operated when a shot image is to be stored in a memory.

The finder window 13b forms an optical finder between the finder window 13b and the front finder object window 13a.

The power switch 15 is for actuating the digital camera 300. The digital camera 300 is provided with a position "reproduce" for designating a reproducing mode in which an image stored in a memory or the like is to be displayed on the image monitor 20, a position "off" for turning power off, a position "retract" for designating shooting when the lens barrel is retracted, and a position "normal" for designating normal shooting including a movie mode. The power switch 15 can slide to set these positions. Part (c) of FIG. 23 shows the power switch 15 in the position "retract". In this state, a picture can be taken even if the barrier is opened and the lens barrel is retracted.

In this digital camera 300, the lens barrier 310a is closed by the force for sliding the power switch 15 from the position "retract" to the position "off", whereas the lens barrier 310a is opened by the force for sliding the power switch 15 from the position "off" to the position "retract". Thus, if the power switch 15 is slid from the position "off" to the position "normal," the lens barrier 310a is opened when the power switch 15 is passing the position "retract".

Figure 24:
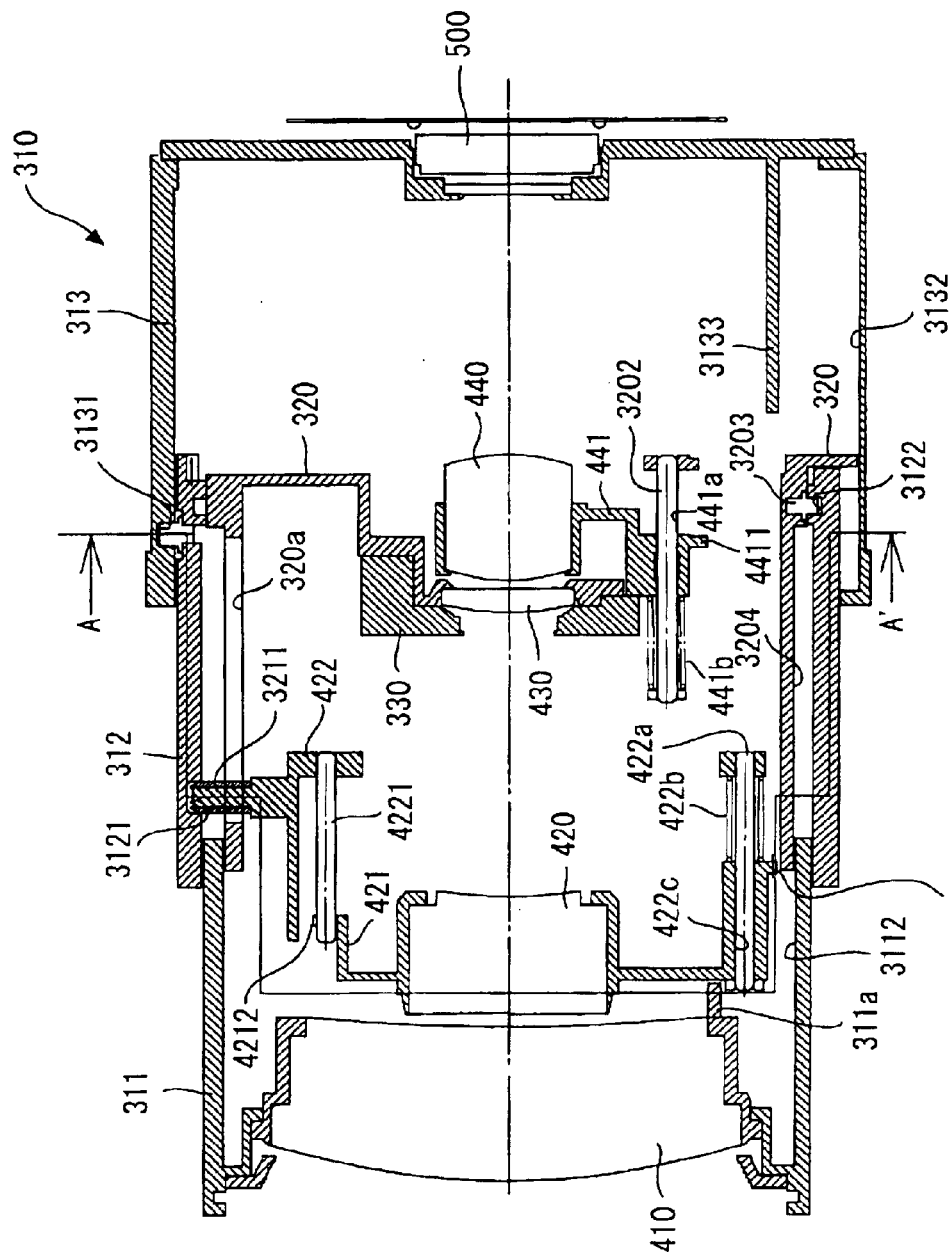
FIG. 24 is a sectional view of a lens barrel 310 incorporated in the digital camera shown in FIG. 23 in which the lens barrel is in the wide-edge.
Figure 25:
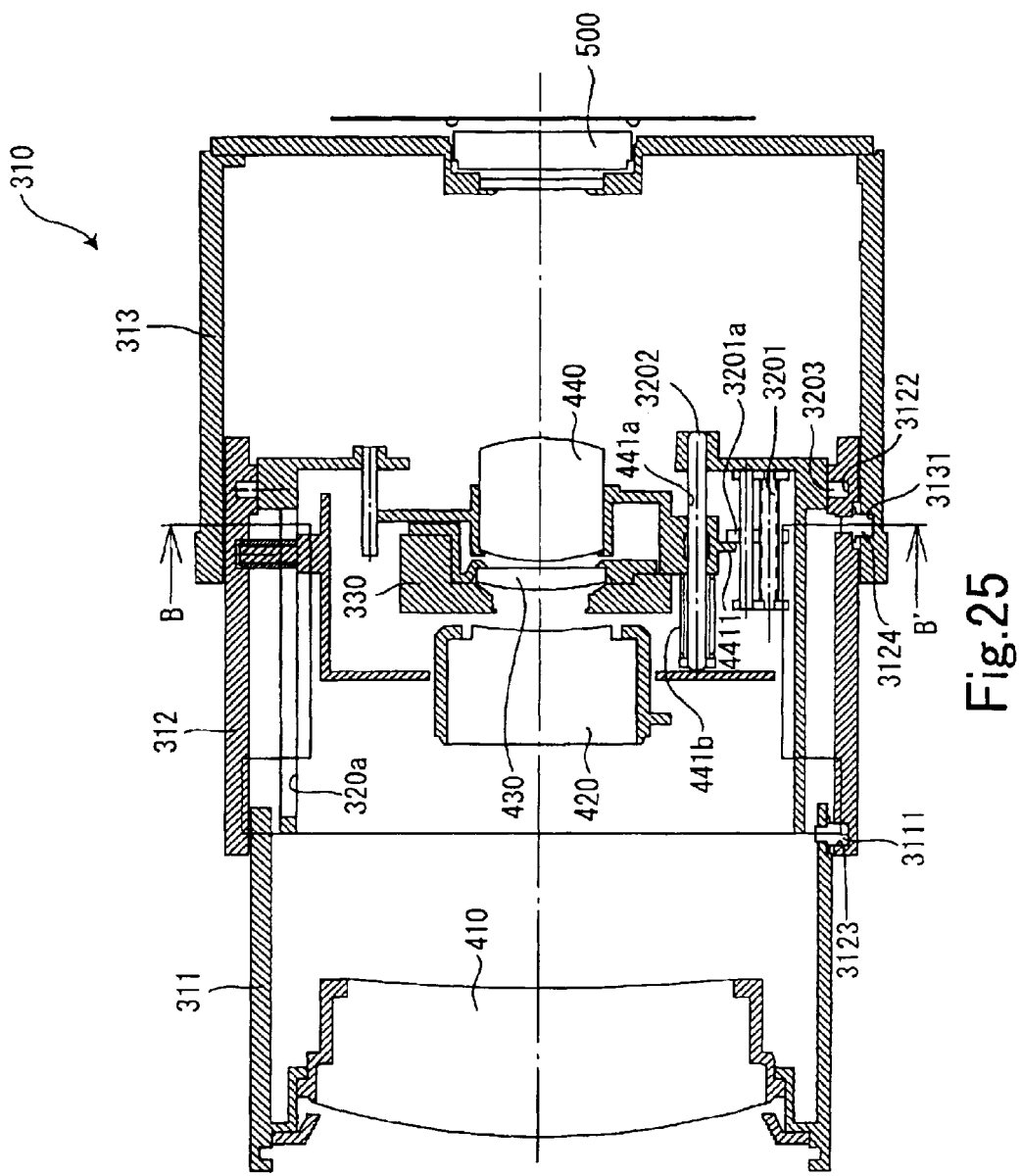
FIG. 25 is a sectional view of the lens barrel 310 incorporated in the digital camera shown in FIG. 23 in which the lens barrel is in the tele-edge.
Figure 26:
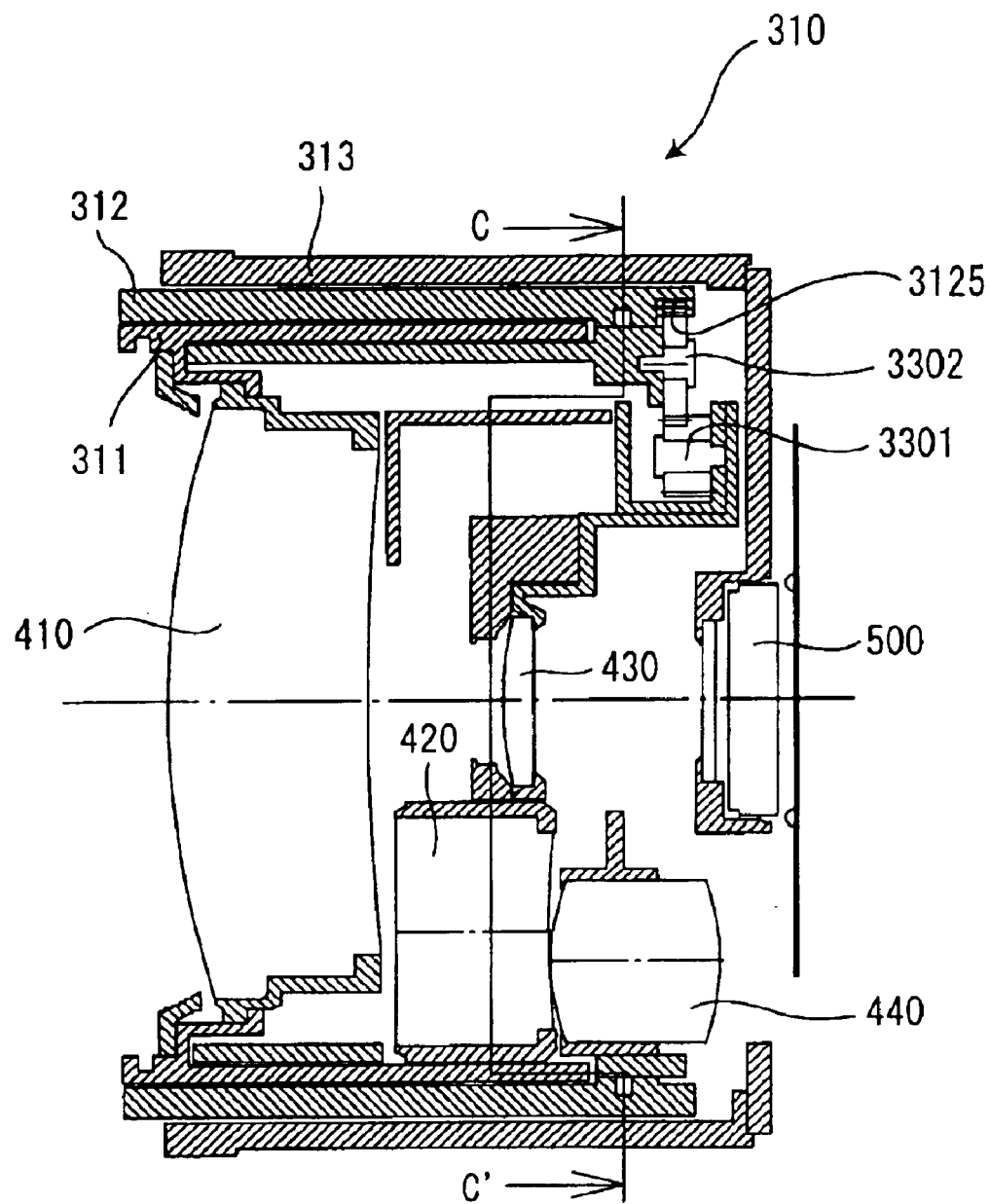
FIG. 26 is a sectional view of the lens barrel 310 incorporated in the digital camera shown in FIG. 23 in which the lens barrel is retracted.

FIGS. 24 to 26 show the arrangement of the lens groups on the shooting optical axis when the shooting lens of the digital camera of this embodiment advances and retracts.

FIG. 24 shows the arrangement of first to fourth lens groups in the wide-angle side when the position "normal" is selected by the power switch 15. FIG. 25 shows the arrangement of the first to fourth lens groups in the telephotographic side when the position "normal" is selected by the power switch 15. FIG. 26 shows the arrangement of each lens group when the lens barrel is retracted in the position "retract" selected by the power switch 15. In the digital camera 300 of this embodiment, the shooting is possible not only when the "normal" is selected by the power switch 15 but also when the "retract" is selected. This shooting (shooting when the lens barrel is retracted, hereinafter) is fixed focus shooting carried out using the first lens group and the third lens group remaining on the shooting optical axis when the lens barrel is retracted. FIGS. 24 to 26 also show a CCD on the shooting optical axis.

When the "normal" is selected by the power switch 15 and a picture is to be taken, the zoom operation switch is operated to adjust the focal length between the tele-edge shown in FIG. 25 and the wide-edge shown in FIG. 24, thereby setting the shooting angle of view to a desired value. The focus of the focus lens 440 is adjusted to a position where the best contrast can be obtained by detecting the contrast based on the image signal obtained by the CCD 500. Then, if the shutter button is pushed, an image signal showing the current subject is generated by the CCD 500, appropriate image processing is carried out and then, it is stored.

In the digital camera of the embodiment, a case in which the "normal" is selected by the power switch 15 means the shooting state. In this state, an image is formed using all of the lens groups constituting the shooting lens. Here, shooting at the time of retraction means an accommodated state. In this state, the barrel length is shortened to a value smaller than the shortest barrel length of the shooting state.

That is, when the shooting lens is moved to the retracted position through the widest-angle position (when the lens barrel is brought into the accommodated state), the second lens group retracts from the optical axis and a picture can be taken in the retracted position (in the accommodated state).

For example, the lens barrel incorporates, therein, a shooting lens which includes first, second, third and fourth lens groups arranged in this order from forward in the optical axis direction, and which adjusts a focus, in which a focal length can be changed, a length of the lens barrel can be changed between an accommodated state having a relatively short barrel length and a shooting state having a relatively long barrel length, the lens barrel including a lens retracting mechanism which retracts at least one of the lens groups from a shooting optical axis when the lens barrel moves into the accommodated state, and a lens advancing mechanism which advances the retracted lens group to the shooting optical axis when the lens barrel moves to the shooting state, wherein when the shooting lens is in the accommodated state, remaining lens groups except the lens group which retracted from the shooting optical axis form a shooting optical system, thereby making it possible to take a picture.

Figure 27:
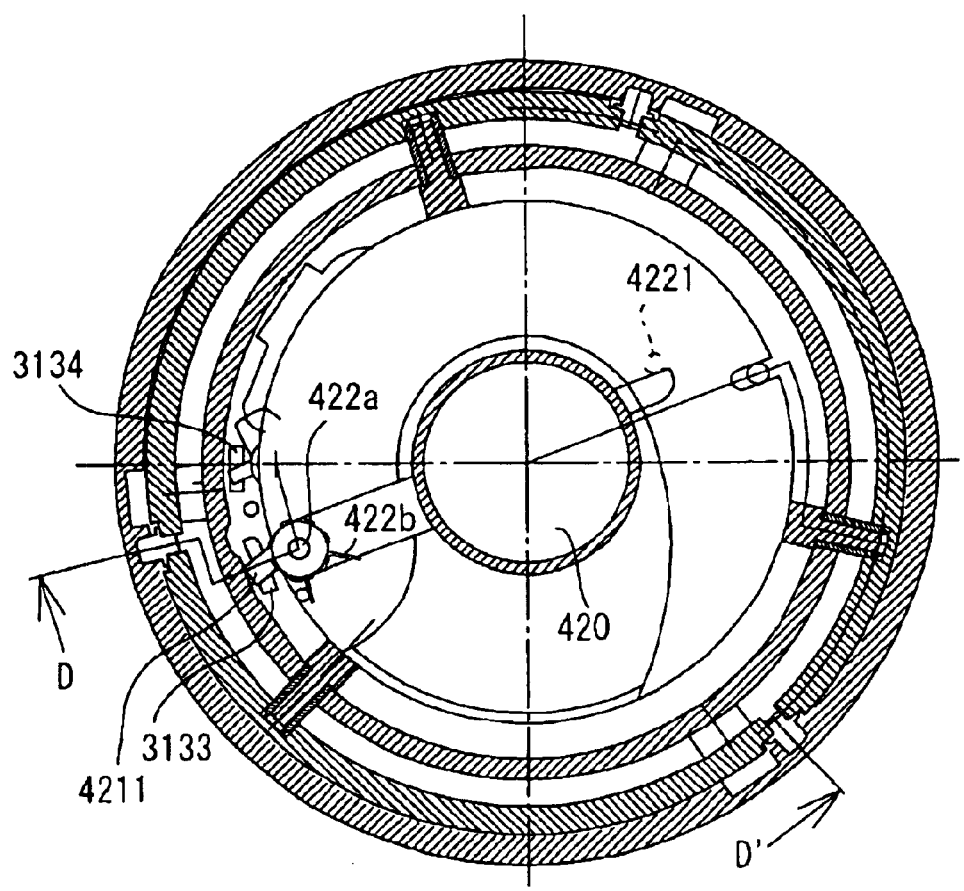
FIG. 27 is a sectional view of the lens barrel taken along a line A–A' in FIG. 24 as viewed from the optical axis.
Figure 28:
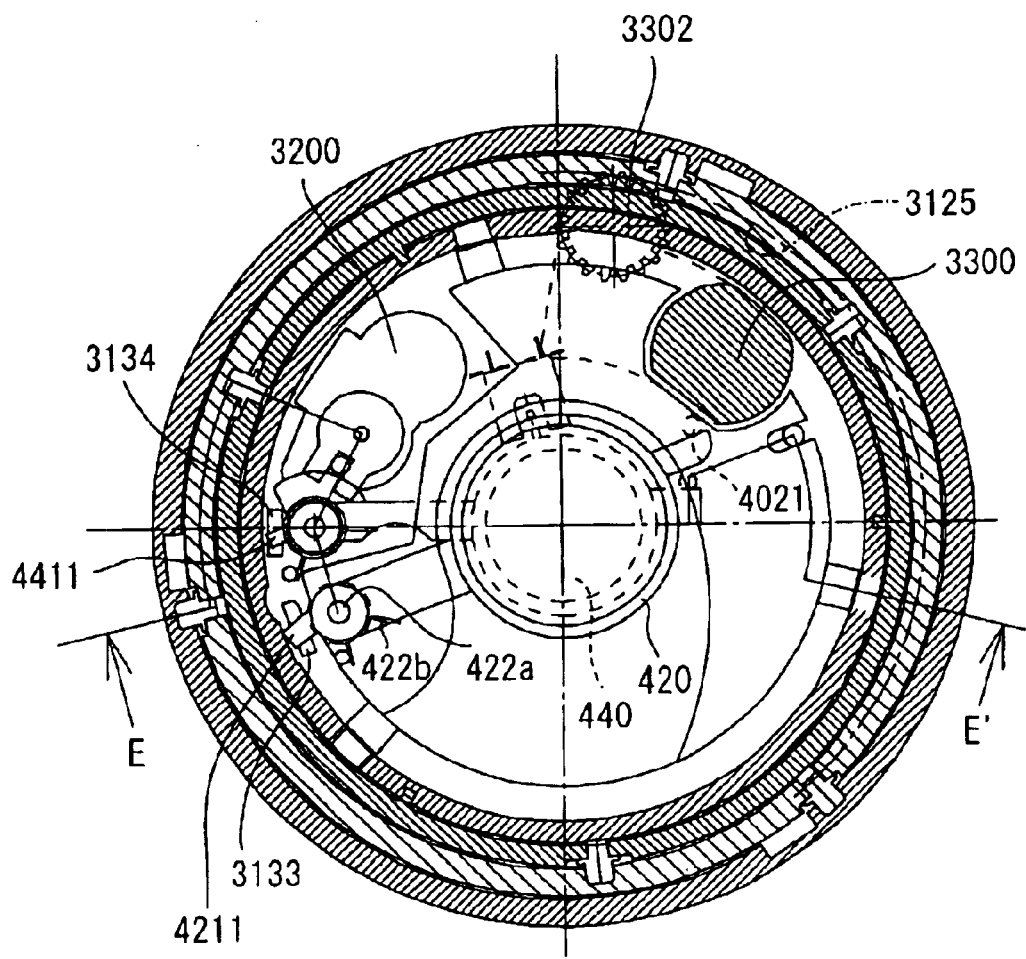
FIG. 28 is a sectional view of the lens barrel taken along a line B–B' in FIG. 25 as viewed from the optical axis.
Figure 29:
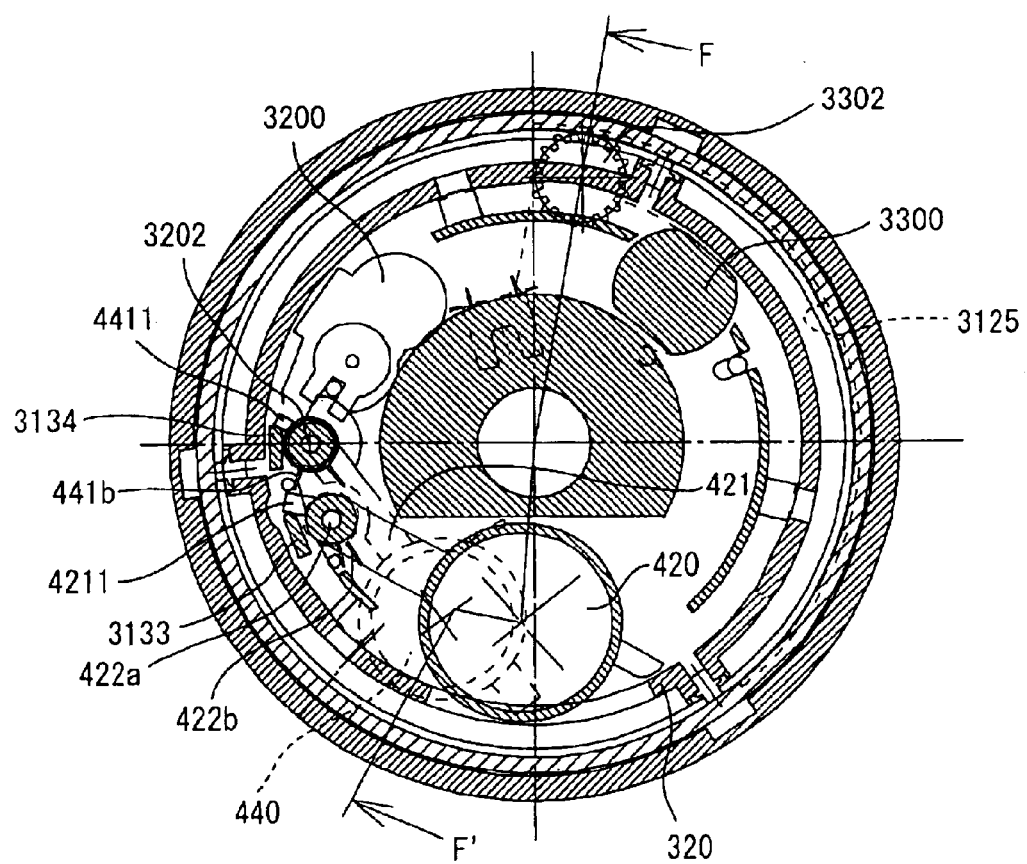
FIG. 29 is a sectional view of the lens barrel taken along a line C–C' in FIG. 26 as viewed from the optical axis.

Referring to FIGS. 27 to 29 in addition to FIGS. 24 to 26, a structure of the lens barrel 310 will be explained.

Figure 30:
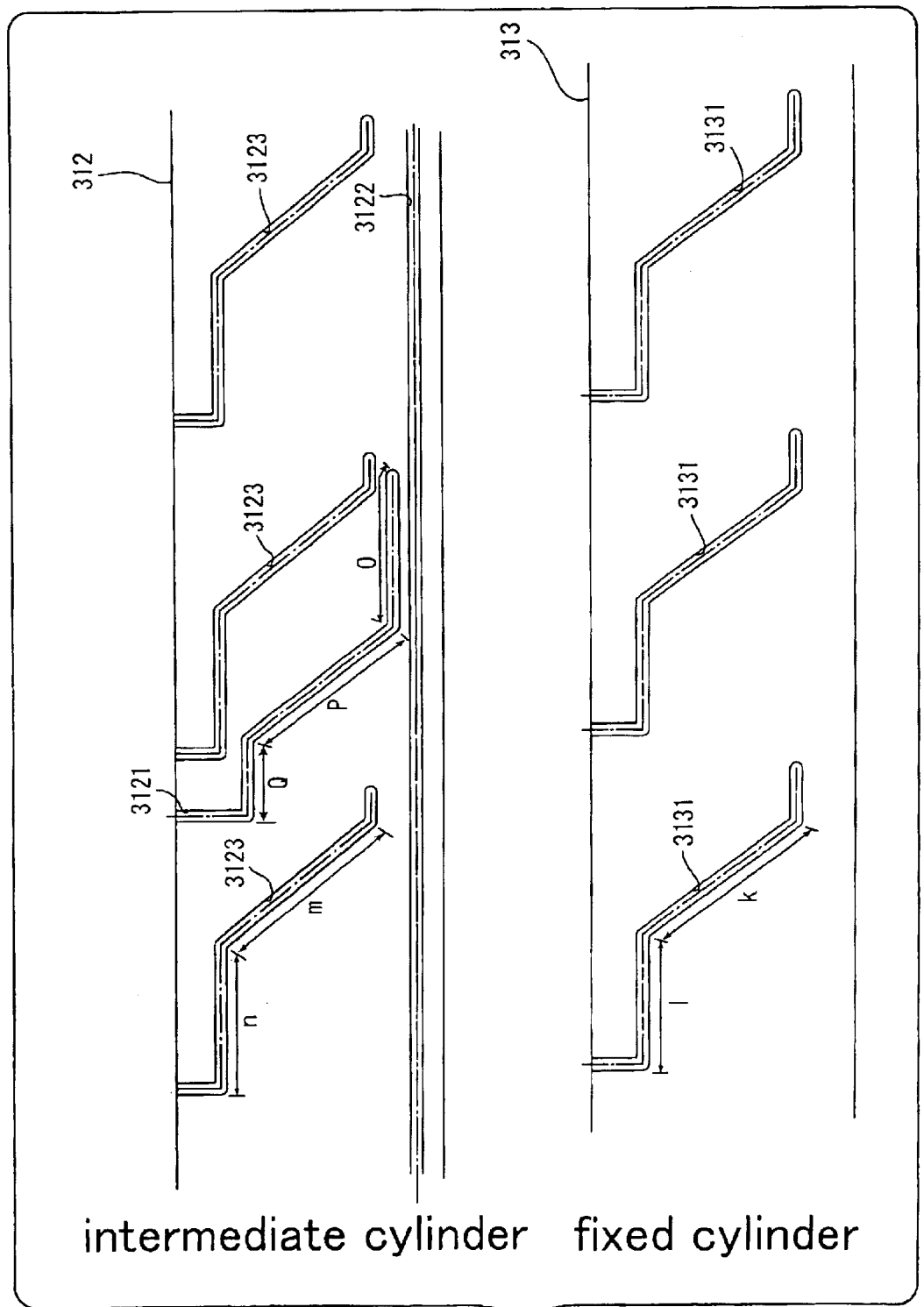
FIG. 30 is a development for explaining a cam groove provided in an inner periphery of an intermediate cylinder.

As described above, FIGS. 24, 25 and 26 are sectional views of the lens barrel 310 incorporated in the digital camera shown in FIG. 23 taken along the optical axis, and respectively show a wide-edge, a tele-edge and the retracted state. FIG. 27 is a sectional view of the lens barrel in the state shown in FIG. 24 taken along a line A–A' in FIG. 24. FIG. 28 is a sectional view of the lens barrel in the state shown in FIG. 25 taken along a line B–B' in FIG. 25. FIG. 29 is a sectional view of the lens barrel in the state shown in FIG. 26 taken along a line C–C' in FIG. 26. FIG. 24 is a sectional view taken along a line D–D' in FIG. 27, FIG. 25 is a sectional view taken along a line E–E' in FIG. 28, and FIG. 26 is a sectional view taken along a line F–F' in FIG. 29. FIG. 30 is a development for explaining an inner periphery and a cam groove provided in the inner periphery of an outermost cylinder and an intermediate cylinder of the three cylinders which constitute the lens barrel shown in FIGS. 24 to 29. In the following explanation, the outermost cylinder of the three cylinders is defined as a fixed cylinder 313, an intermediate cylinder of the three cylinders is defined as an intermediate cylinder 312, and an innermost cylinder is defined as a front cylinder 311.

The lens barrel 310 incorporates therein with a zoom lens including four lens groups, i.e., a front lens group 410, a second lens group 420, a third lens group 430 and a fourth lens group 440. The last one of the zoom lens including the four lens groups, i.e., the fourth lens group 440 is used as a focus lens. In this example, a shooting lens is accommodated in the lens barrel, the shooting lens includes first, second, third and fourth groups arranged in this order from forward in the optical axis direction, the focal length of the shooting lens can be changed, and the focus is adjusted by the fourth lens group. The first, second, third and fourth lens groups respectively have positive refractive force, negative refractive force, positive refractive force and positive refractive force.

As shown in FIGS. 24, 25 and 26, the first lens group 410 is held by a front cylinder 311. The front cylinder 311 includes a cam pin 3111 (see FIG. 25). The cam pin 3111 is engaged with a cam groove 3123 (see FIGS. 25 and 30) provided in an inner periphery of the intermediate cylinder 312. The intermediate cylinder 312 is also provided with a cam pin 3124 (see FIG. 25). The cam pin 3124 engages with the cam groove 3131 (see FIG. 30) formed in an inner periphery of the fixed cylinder 313. A straight advancing key 320 is provided with a straight advancing groove 3204 to which a projection 3112 of the front cylinder 311 is fitted. The fitted portion (see FIG. 24) between the projection 3112 and the straight advancing groove 3204 prevents the front cylinder 311 from rotating. Therefore, the front cylinder 310 and the straight advancing key 320 can relatively move in the optical axis, and do not rotate around the optical axis.

Here, the intermediate cylinder 312 is rotated by a zoom motor 3300 (see FIGS. 28 and 29). If the intermediate cylinder 312 is driven by the zoom motor 3300 and the intermediate cylinder 312 rotates, the intermediate cylinder 312 rotates along a shape (see FIG. 30) of the cam groove 3131 in an inner peripheral surface of the fixed cylinder 313 and moves in the optical axis, and the front cylinder 311 moves in the optical axis direction along the shape of the cam groove 3123 by the cam engagement with respect to the intermediate cylinder 312 which rotates and moves. FIGS. 28 and 29 each show the connected state between the zoom motor 3300 and the intermediate cylinder 312, and show a structure in which rotation force is applied from the zoom motor 3300 to a gear 3125 provided on the inner periphery of the intermediate cylinder 312 through a connecting gear 3302 (see FIG. 28), thereby rotating the intermediate cylinder 312.

The straight advancing key 320 engages with a straight advancing groove 3132 of the fixed cylinder 313 such that the key can advance and retract. If a cam pin 3203 provided on the straight advancing key 320 is engaged with a cam groove 3122 (see FIG. 30) formed in the intermediate cylinder 312, the intermediate cylinder 312 rotatably engages with the straight advancing key 320. Thus, if the intermediate cylinder 312 advances or retracts as the intermediate cylinder 312 rotates by cam engagement with respect to the fixed cylinder 313, the straight advancing key 320 also advances or retracts together with the intermediate cylinder 312.

In this manner, the intermediate cylinder 312 can relatively rotate around the optical axis, and can move in the optical axis direction integrally with the straight advancing key 320.

Among the lens group holding frames which hold the lens groups, a relation between a second lens group holding frame 421 which holds the second lens group 420, a fourth lens group holding frame 441 which holds the fourth lens group 440 and the intermediate cylinder 312, a relation between the straight advancing key 320 and the third lens group 430, and a relation between the intermediate cylinder 312 and the fixed cylinder 313 will be explained in detail with reference to FIGS. 24 to 30. In this embodiment, in order to further shorten the lens barrel, the second lens group and the front lens group are retracted to the retracted position. This retracting mechanism will be explained in the explanation of the relation between the lens groups.

First, the second lens group holding frame 421 which holds the second lens group 420 is movably supported by the second lens group support frame 422 which extends from the straight advancing key 320. The second lens group support frame 422 is provided at its outer periphery with a cam pin 3211. The cam pin 3211 engages with a cam groove 3121 (see FIGS. 24 and 30) provided in the inner periphery of the intermediate cylinder 312 through a key groove 320*a* of the straight advancing key 320. As shown in FIGS. 24 and 30, the straight advancing key 320 supports the second lens group holding frame 421 through the second lens group support frame 422, and also directly supports the third lens group 430. The straight advancing key 320 also supports the fourth lens group 440 through a moving mechanism including a columnar screw 3201 (see FIG. 25).

As described above, the second lens group support frame 422 which is supported by the straight advancing key 320 is provided with a cam pin 3211. The cam pin 3211 passes through the key groove 320*a* of the straight advancing key 320 and engages with the cam groove 3121 of the intermediate cylinder 312. If the cam pin 3211 moves along the shape of the cam groove 3121, the second lens group 420 is guided by the key groove 320*a* and moved from the tele-edge to the wide-edge or from the wide-edge to the tele-edge.

A cam pin 3124 is embedded in an outer periphery of the intermediate cylinder 312. The cam pin 3124 engages with a cam groove 3131 provided in the inner periphery of the fixed cylinder 313. The cam groove 3131 extends such that the cam groove 3131 rotates by a predetermined angle (region shown with a symbol k in FIG. 30) while the cam groove 3131 advances to the tele-edge shown in FIG. 25 from the retracted state shown in FIG. 26. Therefore, the intermediate cylinder 312 receives the driving force from the zoom motor 3300 (see FIGS. 28 and 29) and advances in the optical axis direction while rotating by a predetermined angle from the retracted state (FIG. 26) to the tele-edge (FIG. 25) in accordance with the cam groove 3131, and as the intermediate cylinder 312 advances, the front cylinder 311 advances without rotating along the shape (region shown with a symbol m in FIG. 30) of the cam groove 3123. When the intermediate cylinder 312 is in the state in which it is advanced, if the zoom switch is operated to the wide side, the intermediate cylinder 312 rotates at that position (region shown with a symbol l in FIG. 30), and the second lens group 420 moves to the wide-edge along the shape (region shown with a symbol p in FIG. 30) of the cam groove 3121 by this rotation. In this manner, the zooming in accordance with operation of the zoom switch is carried out.

Here, the second lens group holding frame 421 which holds the second lens group 420 is supported by the second lens group support frame 422, and the second lens group support frame 422 is supported by the straight advancing key 320. The second lens group support frame 422 is provided with a rotation shaft 422a which rotates the second lens group holding frame 421 such that the second lens group holding frame 421 can retract from the optical axis. The second lens group holding frame 421 is formed with a through hole 422c into which the rotation shaft 422a is fitted. The rotation shaft 422a is inserted through the through hole 422c of the second lens group holding frame 421, and a spring 422b is wound around a base end of the rotation shaft 422a so that the second lens group holding frame 421 is urged forward of the optical axis. The spring 422b has a function of a twisted spring, and urges the second lens group holding frame 421 in a direction turning the same around the rotation shaft 422a. When the lens barrel retracts, the second lens group holding frame 421 is pushed by a pushing section 311a provided on the front cylinder 311 and thus, the second lens group 420 is moved toward the base end and is accommodated in the lens barrel compactly (see FIG. 26). When the lens barrel advances, the pushing section 311a (see FIG. 24) of the front cylinder which holds the first lens group 410 is separated from the second lens group holding frame 421. Thus, the second lens group 420 is urged forward of the optical axis by the spring 422b. At that time, the projection 4212 of the second lens group holding frame 421 abuts against the stopper rod 4221 and the second lens group is held at the abutment position such that the second lens group 420 is urged also in the turning direction by the spring 422b and the center of the second lens group 420 coincides with the optical axis precisely.

The lens holding frame 421 is provided with an extending section 4211 via the rotation shaft 422a. When the second lens group 420 retracts together with the straight advancing key 320, the extending section 4211 engages with a switching projection 3133. The switching projection 3133 has an inclined surface formed along a direction in which the straight advancing key 320 retracts.

Therefore, if the extending section 4211 moves along the inclined surface of the switching projection 3133 when the lens barrel retracts, the lens group holding frame 421 rotates to a position (see FIG. 29) where the lens group holding frame 421 abuts against the straight advancing key 320 around the rotation shaft 422a.

In this embodiment, the retracting mechanism of the second lens group 420 includes a series of members including the second lens group holding frame 421, the extending section 4211 of the hold frame 421, the end 4212 of the holding frame 421 opposite from the extending section, the stopper rod 4221 provided on the second lens group support frame 422 supported by the straight advancing key 320, and the switching projection 3133 provided on the body side.

The third lens group 430 is directly supported by the straight advancing key 320. The fourth lens group 440 is also supported by the straight advancing key 320 through a moving mechanism including a focus motor and a columnar screw meshing with a gear head of the focus motor. The fourth lens group 440 is held by the lens group holding frame 441. The lens group holding frame 441 is provided with the through hole 441a. A guide rod 3202 provided on the straight advancing key 320 is inserted into the through hole 441a. A nut 3201a which is threadedly engages with a columnar screw 3201 is threadedly inserted into the columnar screw 3201. The nut 3201a engages with a projection 4411 provided on the lens group holding frame 441. A spring 441b is wound around a guide rod 3202 which precisely guides the lens group holding frame 441 in the optical axis direction. The lens group holding frame 441 is urged toward the nut 3201a by the spring 441b.

In this example, the fourth lens group holding frame 441 is also provided with a retracting mechanism which is similar to the second lens group holding frame 421. If the extending section 4411 of the fourth lens group holding frame 441 engages with a retracting guide 3134 when the lens barrel retracts, the fourth lens group 440 retracts from the optical axis like the second lens group 420 (see FIG. 26). With this configuration, the first lens group 410 and the third lens group 430 are pushed and arranged side-by-side as close as possible, the second lens group 420 and the fourth lens group 440 can be pushed two dimensionally into upper portions or lower portions of the first lens group 410 and the third lens group 430, and the lens barrel can further be shortened. When the lens barrel is retracted as shown in FIG. 26, the first lens group 410 and the third lens group 430 form the fixed focus shooting optical system and thus, a picture can immediately be taken even when the shooting lens is retracted.

As described above, the focus motor 3200 which moves the fourth lens group 440 in the optical axis direction is also supported by the straight advancing key 320. The rotation force of the focus motor 3200 supported by the straight advancing key 320 is transmitted to the columnar screw 3201 shown in FIG. 25 through a gear train and the columnar screw 3201 rotates. As the columnar screw 3201 rotates, the nut 3201a which is rotatably threadedly inserted into the columnar screw 3201 moves by a distance corresponding to the rotation of the columnar screw 3201, the lens group holding frame 441 which is engaged with the nut 3201a and the focus is adjusted.

Here, a driving command is sent from a control device (not shown) to the focus motor 3200 supported by the straight advancing key 320 based on the image data generated by an image pickup element 500, the focus is adjusted and a picture is taken.

After the focus is adjusted in this manner, if the shutter button 304 is pushed, a shutter unit 330 supported by the straight advancing key 320 is driven, an electronic shutter is driven and the shooting is carried out. The subject light passing through the first lens group 410, the second lens group 420, the third lens group 430 and the fourth lens group (focus lens) 440 forms a subject image on the light-receiving surface of the image pickup element 500. An image signal indicative of the subject image formed on the light-receiving surface is generated in the image pickup element 500. Wiring cables that transmit commands to the focus motor and the shutter unit are not illustrated in FIGS. 24 to 29.

The fourth lens group 440 is supported by the straight advancing key 320 through the second lens group 420, the third lens group 430 and the columnar screw 3201, and the focus motor 3200 which rotates the columnar screw 3201 is also supported by the straight advancing key 320. With this configuration, the front lens group 440 is moved to a position near the focus together with the straight advancing key 320, and when the focus is to be adjusted, the columnar screw 3201 is rotated to finely adjust the position of the front lens group 440.

With this configuration, it is unnecessary to provide a columnar screw or a guide rod largely extending from the light-receiving surface of the image pickup element in the optical axis direction, and it is unnecessary to move the front lens group along the guide rod through a long distance by rotating the columnar screw. Therefore, a vacant space having no obstruction is generated between the image pickup element 500 and the fourth lens group 440, and when the lens barrel retracts, the second lens group 420 and the fourth lens group 440 which retracted from the optical axis can be crammed into the vacant space two dimensionally (see FIG. 26), and the length of the lens barrel can further be shortened. The front cylinder 311 is provided with the pushing section 311a, and when the lens barrel is retracted, the second lens group holding frame 421 is pushed toward the second lens group support frame 422 to compress the spring 422b. With this configuration, the first lens group 410 and the second lens group 420 can approach each other as close as possible in the retracted state, and when the lens barrel advances, the second lens group 420 is urged forward in the optical axis direction by the spring 422b, and the lens barrel can largely advance forward in the optical axis direction.

When the lens barrel is retracted as shown in FIG. 26, the front lens group and the third lens group form the fixed focus shooting optical system. Thus, when the retracted state is selected by the power switch 15 shown in FIG. 23, a picture can be taken in the retracted state.

With this, even if the digital camera 300 shown in FIG. 23 has a thin body, the lens barrel 310 is accommodated in the camera body when the lens barrel 310 is to be retracted. When the lens barrel 310 holding the zoom lens including four lens groups advances from the camera body, shooting under high magnification can be carried out using the digital camera 300. Since the shooting optical system is formed when the lens barrel is retracted, even when it becomes necessary to take a picture in the retracted state, a picture can immediately be taken even when the shooting lens is retracted.

Lastly, an interior structure of the digital camera shown in FIG. 23 will briefly be explained.

Figure 31:
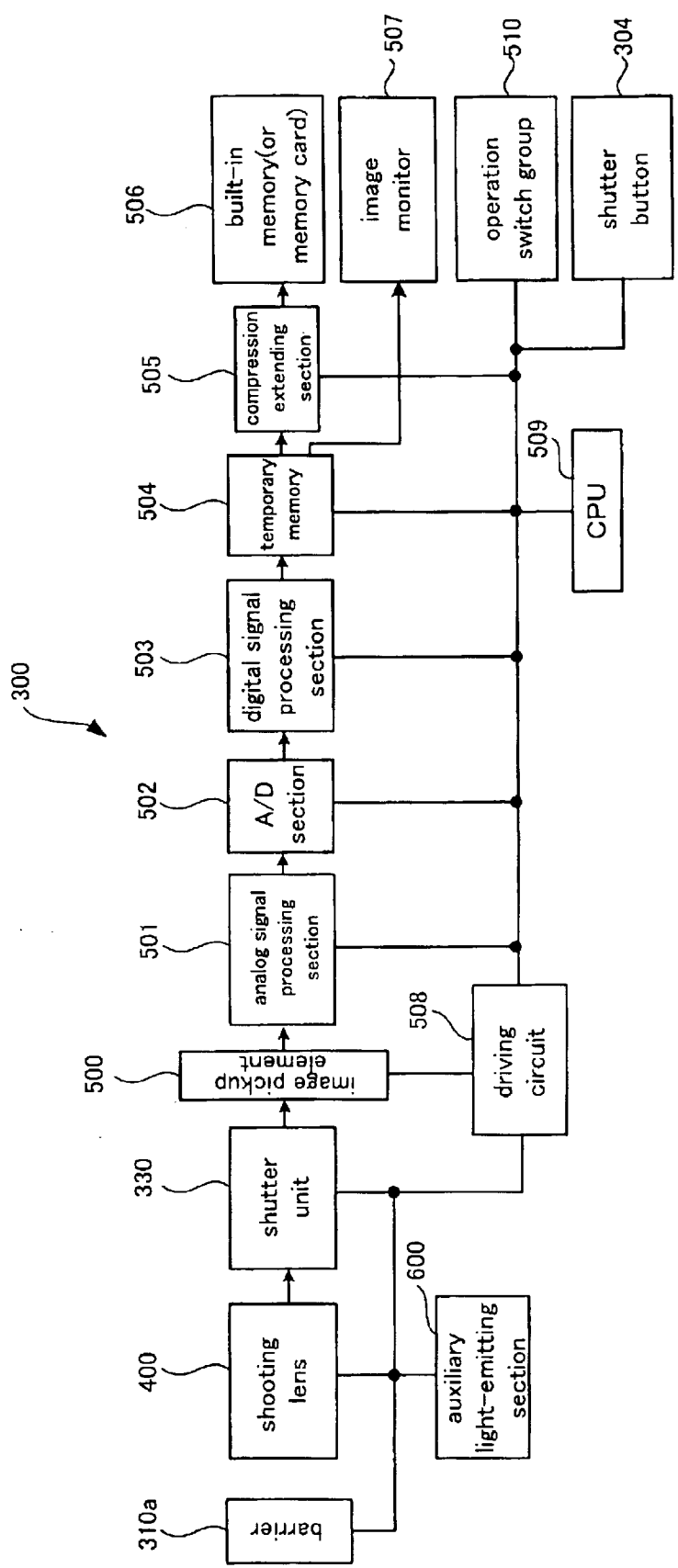
FIG. 31 is a block diagram showing a circuit structure of the digital camera in FIG. 23.

FIG. 31 is a block diagram showing a circuit structure of the digital camera 300 of the present embodiment.

The digital camera 300 includes the shooting lens 400 including the first lens group 410, the second lens group 420, the third lens group 430 and the fourth lens group 440. The digital camera 300 also includes the shutter unit 330, the barrier 310a for protecting the shooting lens 400, and the image pickup element 500. A subject image formed on the image pickup element 500 through the shooting lens 400 and the shutter unit 330 is converted into an analog image signal. Here, the shutter unit 330 includes an aperture which controls the amount of light coming to the image pickup element, and a shutter which suppresses the generation of smear caused by light when the analog signal is read out from the image pickup element 500.

The camera includes an auxiliary light-emitting section 600. When the brightness is low, the auxiliary light-emitting section 600 emits auxiliary light forward from the digital camera. Even the brightness is not low, the auxiliary light-emitting section 600 can emit light if necessary.

The digital camera 300 includes an analog signal processing section 501, an A/D section 502, a digital signal processing section 503, a temporary memory 504, a compression extending section 505, a built-in memory (or memory card) 506, an image monitor 507, and a driving circuit 508. The CCD 500 is driven with timing generated by a timing generating circuit (not shown) in the driving circuit 508 and outputs an analog image signal. The driving circuit 508 also includes a driving circuit which drives the shooting lens 400, the lens shutter unit, the auxiliary light-emitting section 600 and the like. The analog image signal which is output from the image pickup element 500 is subjected to the analog signal processing by the analog signal processing section 501, and A/D converted by the A/D section 502 and is subjected to the digital signal processing by the digital signal processing section 503. After the digital signal processing is carried out, image data indicative of signal which was subjected to the digital signal processing is temporarily stored in the temporary memory 504. The image data stored in the temporary memory 504 is compressed by the compression extending section 505, and is stored in the built-in memory (or memory card) 506. Depending upon the shooting mode, the data may directly be stored in the built-in memory (or memory card) 506 without compressing the data. The image data stored in the temporary memory 504 is read by the image monitor 507 and the subject image is displayed on the image monitor 507.

The digital camera 300 further includes a CPU 509 which controls the entire digital camera 300, an operation switch group 510 including the zoom operation switch, and the shutter button 304. The operation switch group 510 is operated to obtain a desired shooting state including a desired angle of view, and if the shutter button 304 is pushed, a picture can be taken, i.e., the image data is produced.

Although the fourth lens group 440 and the second lens group 420 are retracted in this embodiment, only the fourth lens group 440 may be retracted.

Now the sixth embodiment of the present invention will be described. In the following description, the appearance of the digital camera of the present invention is the same as that of the fifth embodiment shown in FIG. 23, and only the distinctive feature of the present embodiment will be described.

FIGS. 32 to 37 show a structure of the lens barrel having the retracting mechanism which retracts only the fourth lens group 440. The lens barrel 310 shown in FIGS. 32 to 37 is incorporated in the camera shown in FIG. 23. The structure of the lens barrel 310 shown in FIGS. 32 to 37 is the same as that shown in FIGS. 24 to 29 except that the second lens group holding frame 421a is slightly changed.

Figure 32:
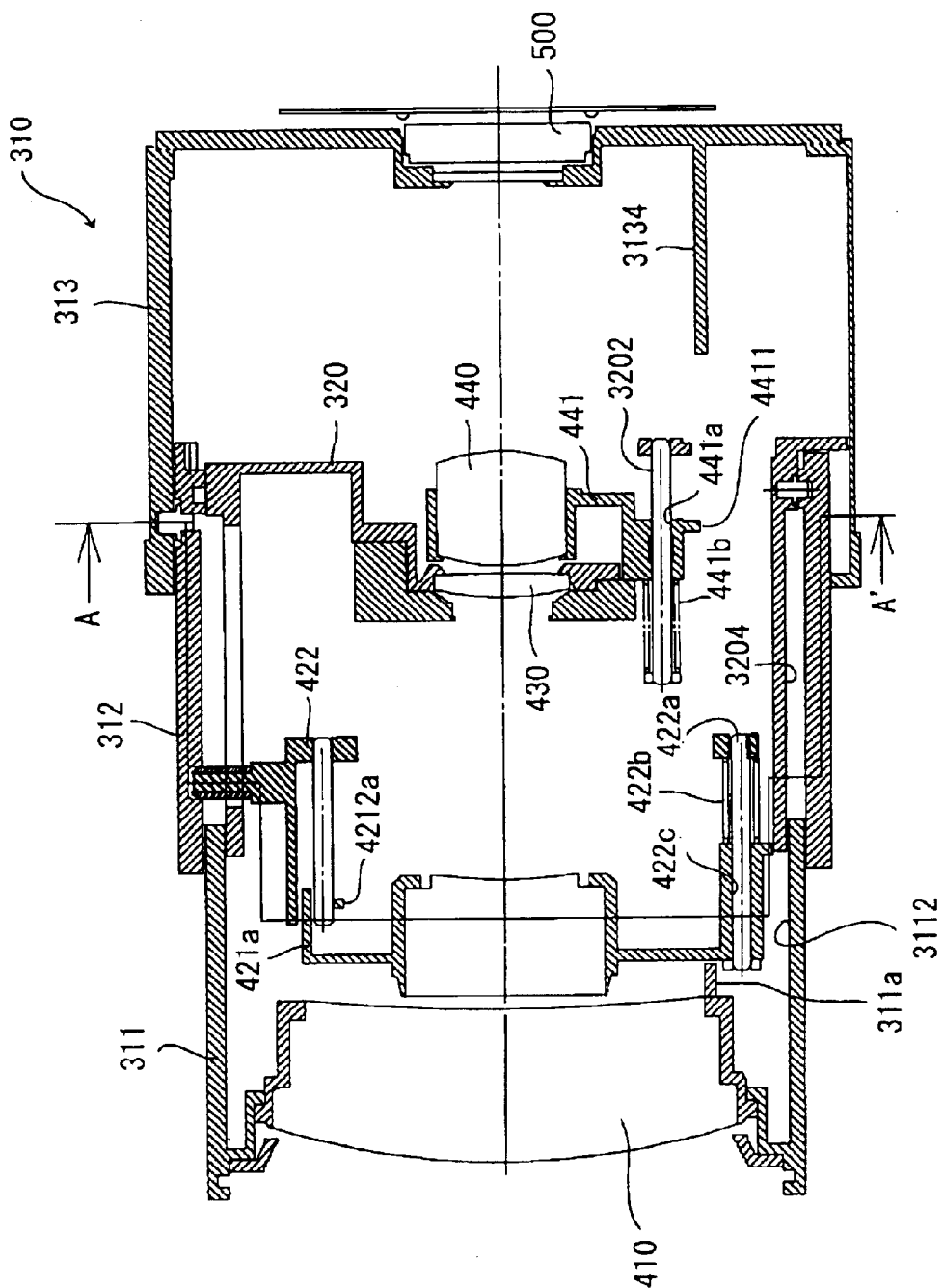
FIG. 32 is a sectional view of a lens barrel 310 taken along the optical axis from which a retracting mechanism of a second lens group is omitted and shows the lens barrel in the wide-edge.
Figure 33:
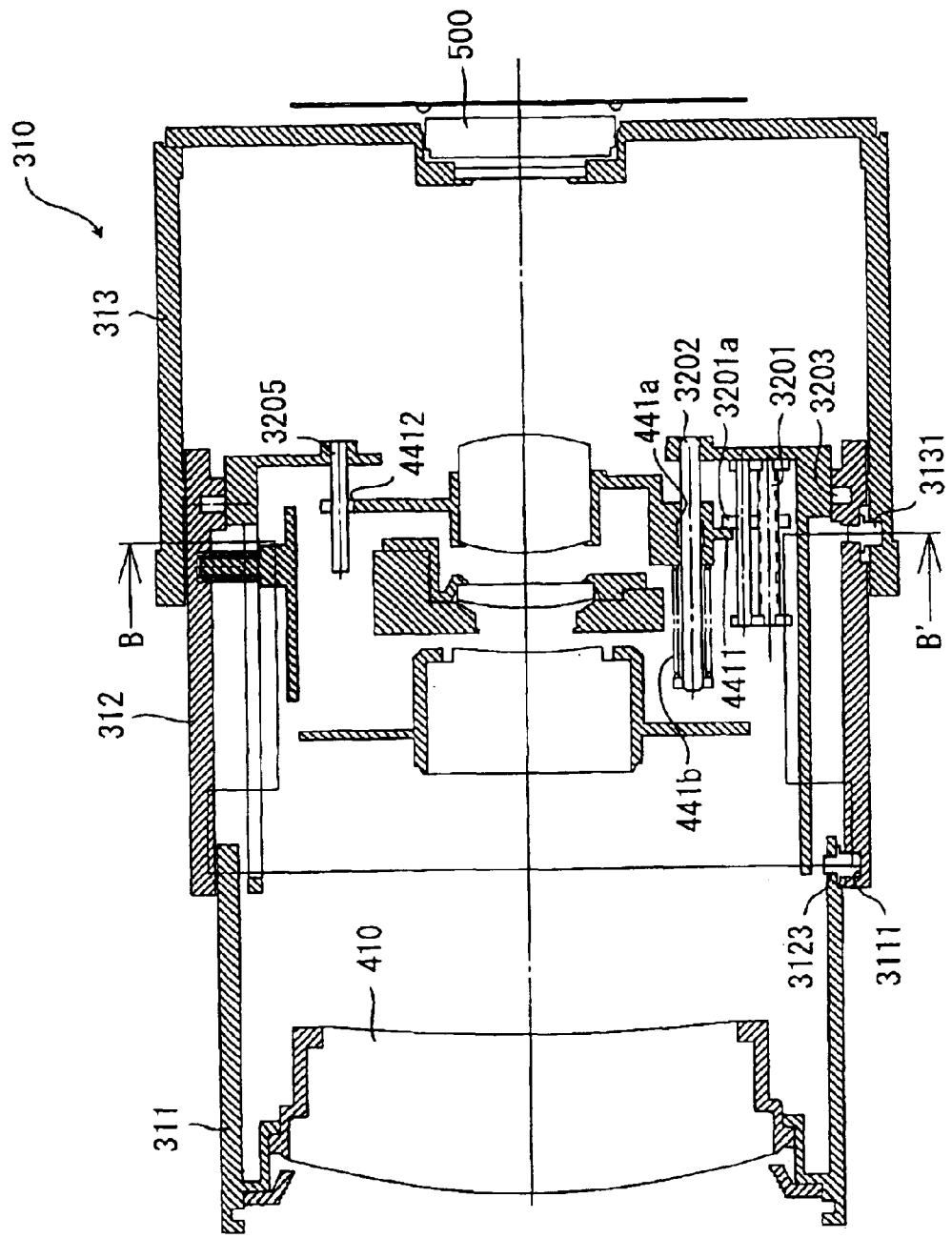
FIG. 33 is a sectional view of a lens barrel 310 taken along the optical axis from which a retracting mechanism of a second lens group is omitted and shows the lens barrel in the tele-edge.
Figure 34:
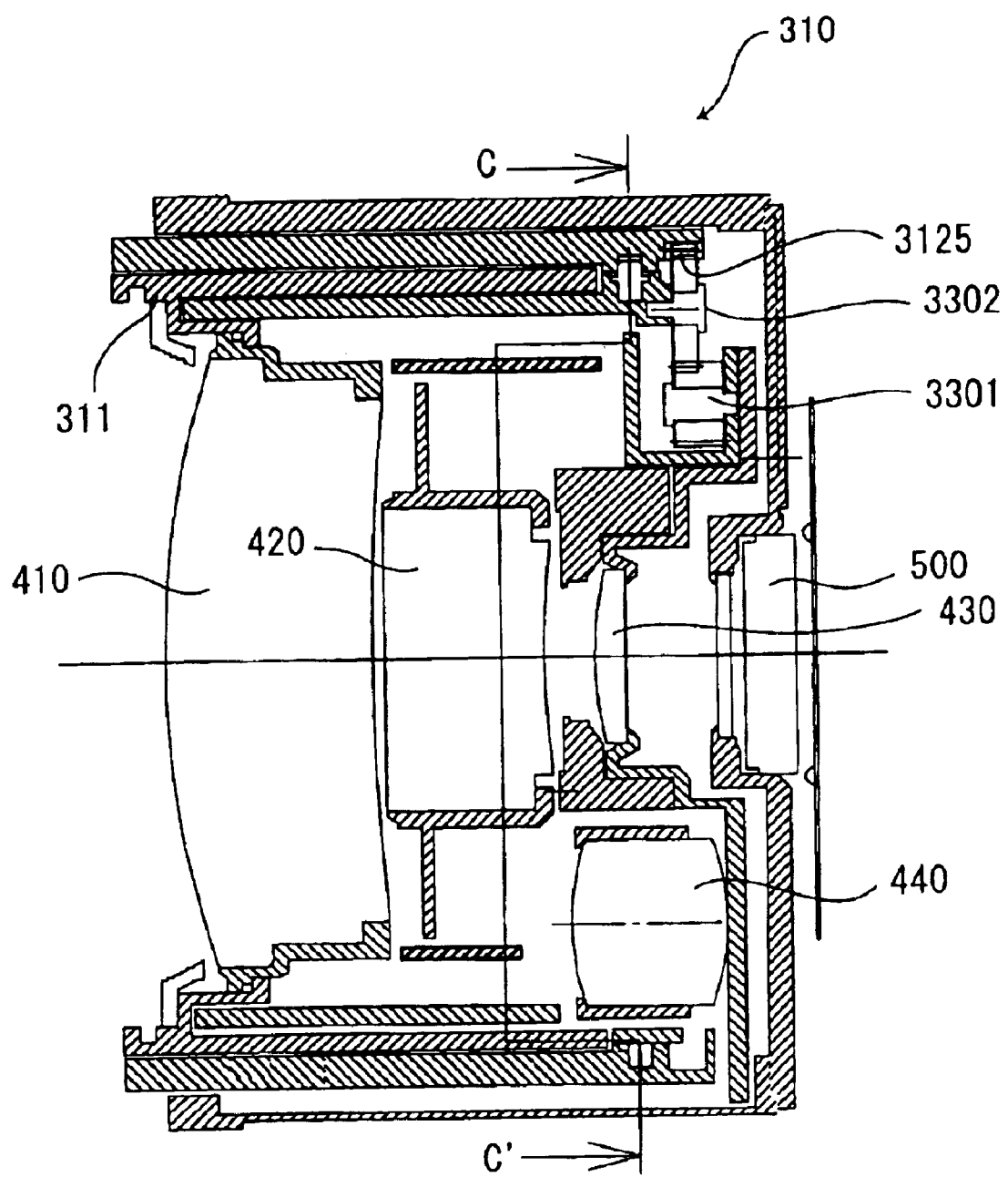
FIG. 34 is a sectional view of a lens barrel 310 taken along the optical axis from which a retracting mechanism of a second lens group is omitted and shows the retracted lens barrel.
Figure 35:
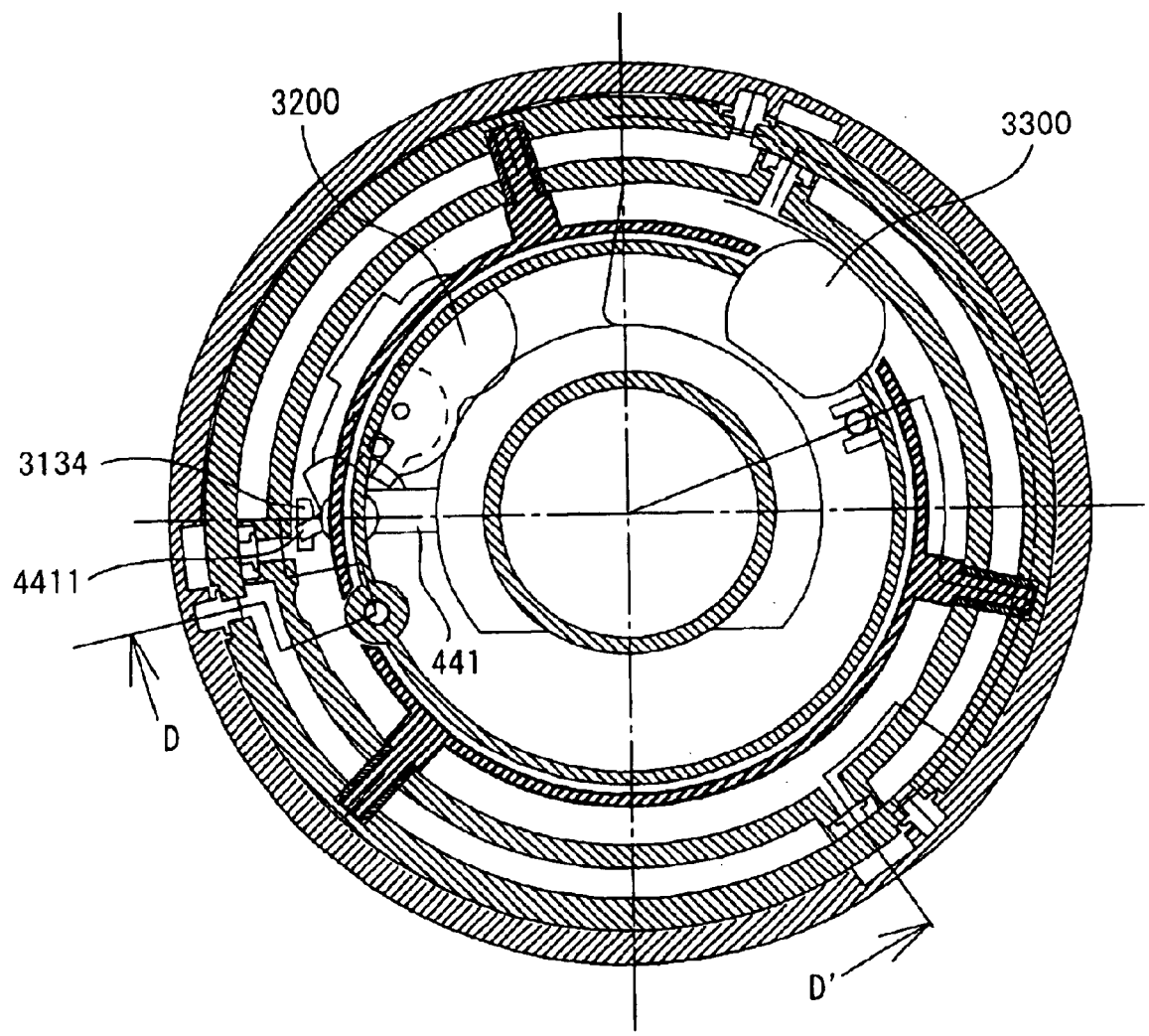
FIG. 35 is a sectional view of the lens barrel taken along a line A–A' in FIG. 32 as viewed from the optical axis.
Figure 36:
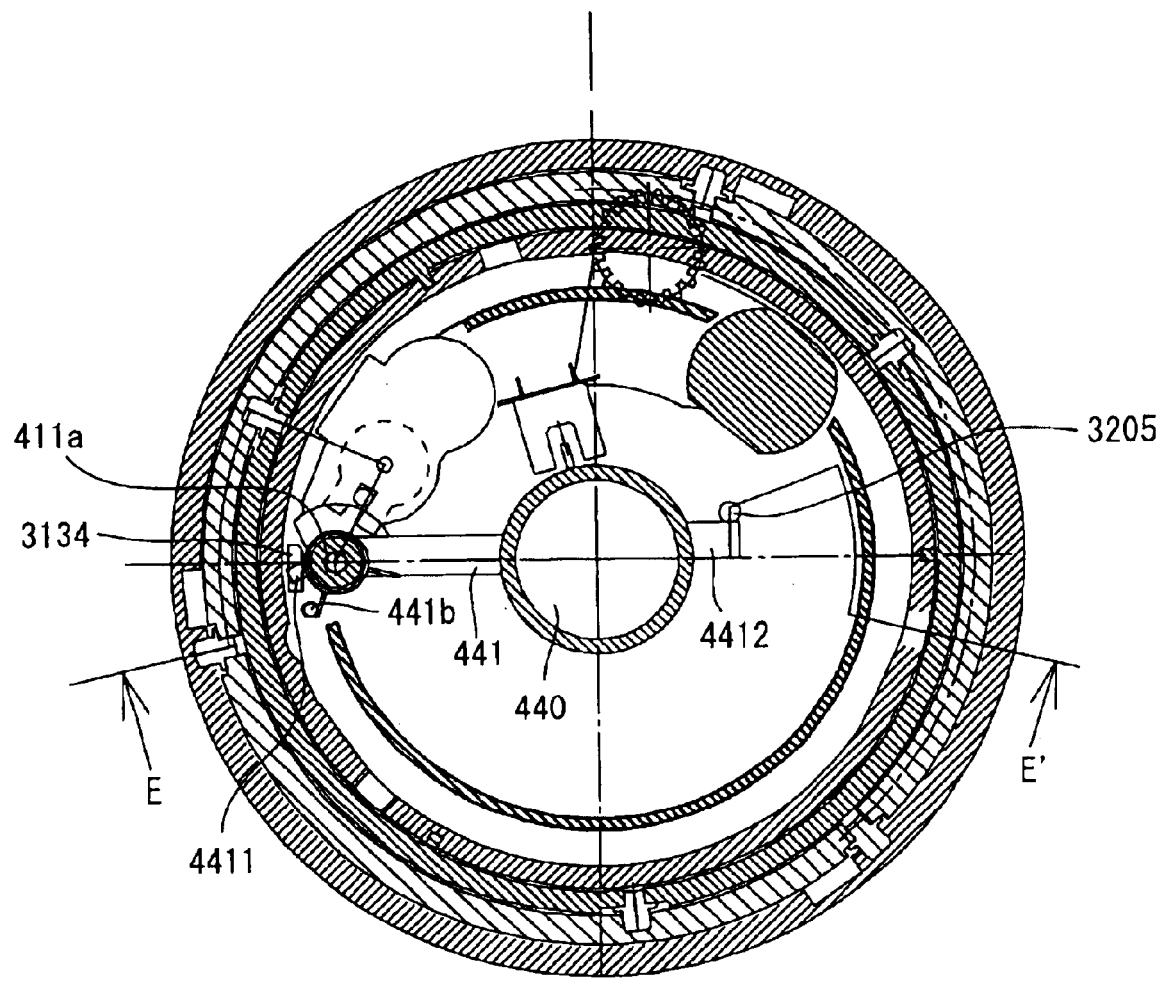
FIG. 36 is a sectional view of the lens barrel taken along a line B–B' in FIG. 33 as viewed from the optical axis.
Figure 37:
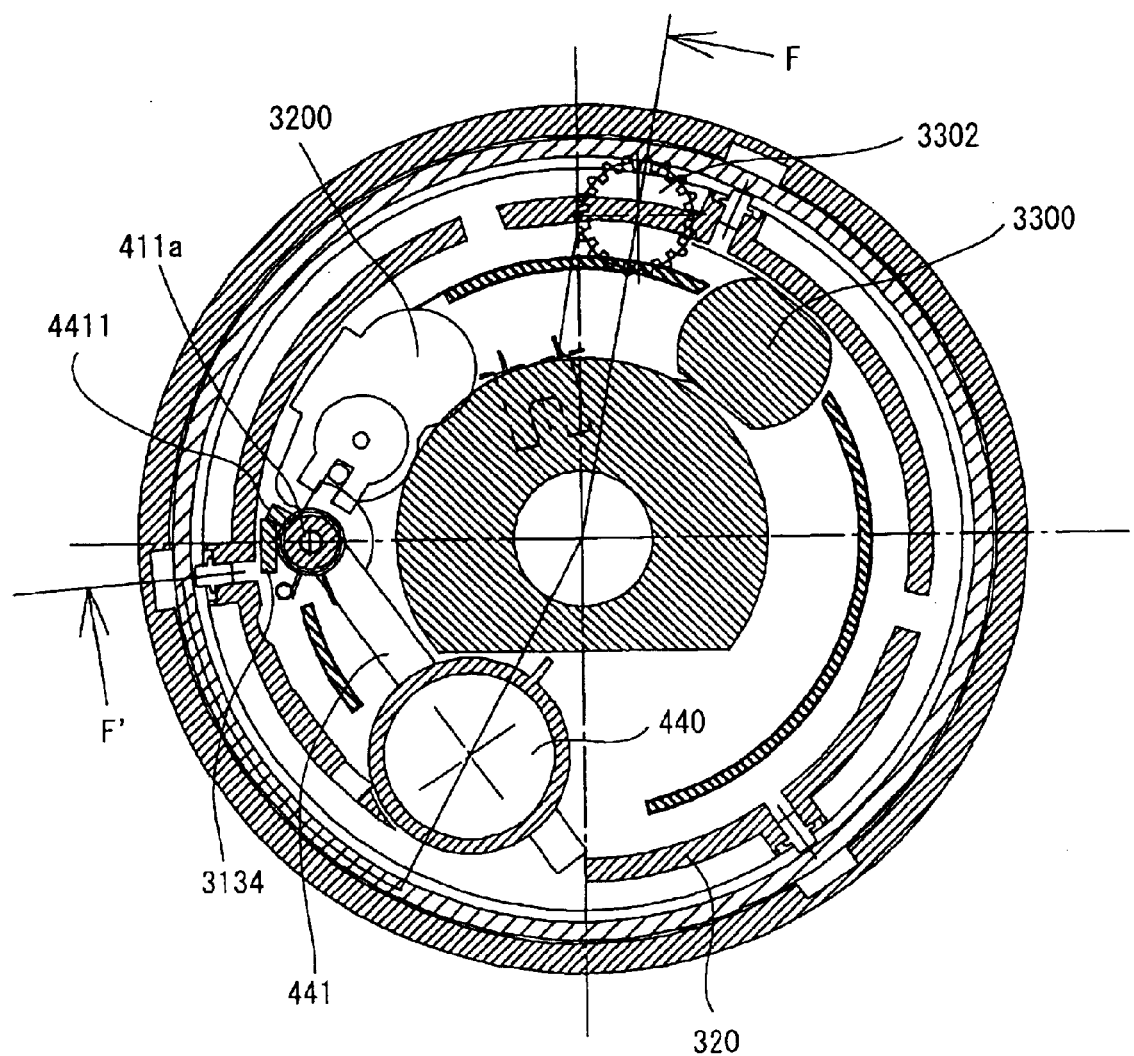
FIG. 37 is a sectional view of the lens barrel taken along a line C–C' in FIG. 34 as viewed from the optical axis.

FIGS. 32, 33 and 34 are sectional views of the lens barrel 310 incorporated in the digital camera shown in FIG. 23 taken along the optical axis. FIGS. 32, 33 and 34 respectively show the wide-edge, the tele-edge and the retracted state. FIG. 35 is a sectional view of the lens barrel shown in FIG. 32 taken along a line A–A' in FIG. 32. FIG. 36 is a sectional view of the lens barrel shown in FIG. 33 taken along a line B–B' in FIG. 33. FIG. 37 is a sectional view of the lens barrel shown in FIG. 34 taken along a line C–C' in FIG. 34. FIG. 32 is a sectional view taken along a line D–D' in FIG. 35, FIG. 33 is a sectional view taken along a line E–E' in FIG. 36, and FIG. 34 is a sectional view taken along a line F–F' in FIG. 37.

Since the fourth lens group 440 functions as the focus lens, it is especially important to align the optical axis. Although omitted from the explanation of the fifth embodiment, the lens group holding frame 441 which holds the fourth lens group 440 also has a function to allow the fourth lens group 440 to advance to the shooting optical axis like the second lens group holding frame 421*a*. This function is the same as that of the second lens group holding frame 421*a*. An end 4412 of the fourth lens group holding frame 441 abuts against the stopper rod 3205 provided on the straight advancing key 320 and a central portion of the focus lens coincides with the optical axis precisely (see FIG. 33). Like the fifth embodiment, the retracting mechanism in the sixth embodiment includes the twisted spring 441*b*, the switching projection 3134, the extending section 4411 of the fourth lens group holding frame 441, the end 4412 of the fourth lens group holding frame 441, and the stopper rod 3205 supported by the straight advancing key 320. When the fourth lens group 440 is retracted together with the straight advancing key 320, the extending section 4411 engages with the switching projection 3134, and as the extending section 4211 moves along the inclined surface of the switching projection 3134, the lens group holding frame 421*a* rotates to a position (see FIG. 34) where the second lens group holding frame 421*a* abuts against the straight advancing key 320 around the rotation shaft 422*a*. With this, the first lens group 410, the second lens group 420 and the third lens group 430 are pushed as far as possible and crammed side-by-side, and the fourth lens group 440 can be crammed three dimensionally into the upper portions or lower portions of the first lens group 410, the second lens group 420 and the third lens group 430, and the lens barrel can further be shortened. The remaining lens groups which were not retracted form the shooting optical system, and it is possible to realize a lens barrel capable of shooting even in the retracted state.

Figure 38:
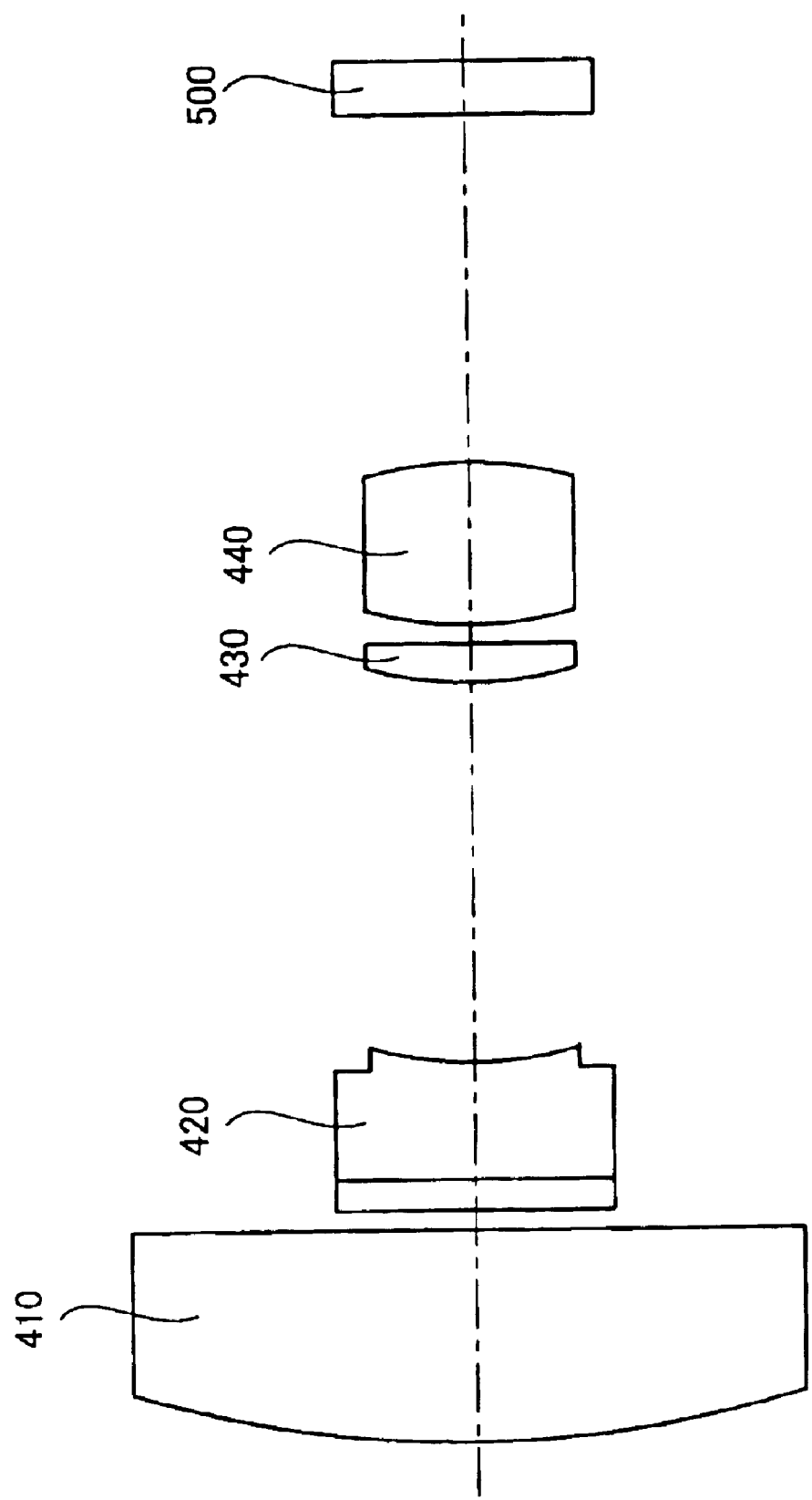
FIG. 38 shows only the front lens group explained in FIGS. 24 to 37.
Figure 39:
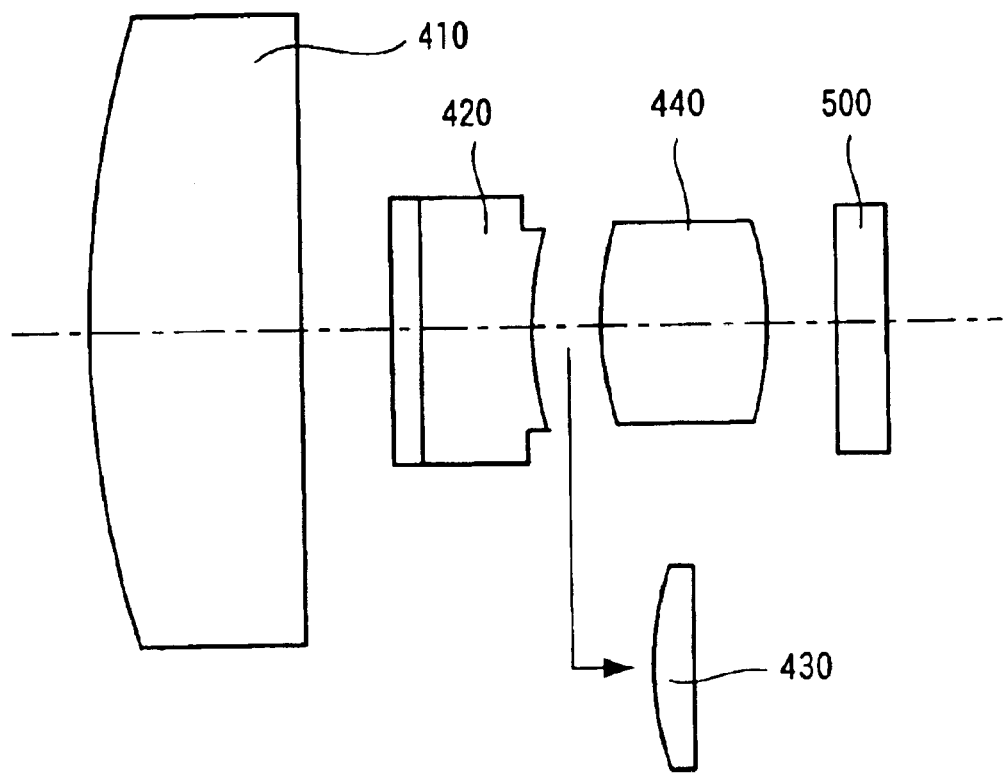
FIG. 39 shows layout of the lenses when the third lens group of the lens groups is retracted when the lens barrel is retracted.

The retracting mechanism of the lens barrel may retract the third lens group. FIG. 38 shows only the structure of the front lens group explained in FIGS. 24 to 37. FIG. 39 shows the layout of the lenses when the third lens group of the lens groups is retracted when the lens barrel is retracted.

As shown in FIG. 39, even if the third lens group having the positive refractive force like the front lens group is retracted, the same effect can be obtained.

As explained above, there is provided the retracting mechanism which retracts at least one of the third lens group 430 and the fourth lens group 440 from the shooting optical axis. With this, the length of the lens barrel is shortened, and since the shortened lens barrel is incorporated in the camera, the camera can be reduced in thickness.

The remaining lens groups which were not retracted when the lens barrel is retracted form the shooting optical system. Thus, a picture can immediately be taken even when the lens barrel is retracted.

Although the embodiments are based on the digital camera, the present invention is not limited to the digital camera, and the may be a so-called silver-salt camera which takes a picture on a roll-like film or instant photograph film. The present invention can be applied not only to a camera, but also to any devices having camera function.

The lens barrel of the embodiments can also be applied to a lens unit such as a detachable lens. For example, in a single-lens reflex camera, lenses having different magnification can be exchanged and used. In some replaceable lenses used in the single-lens reflex camera, there exists a lens whose lens barrel can be changed in barrel length. The lens barrel of the invention can also be employed for this purpose. If at least one of the lens groups disposed in the lens barrel can be retracted from the shooting optical axis as in the embodiment, the replaceable lens can be reduced in thickness, and the shooting can be carried out in a state in which one or some of the lens groups are retracted. Thus, shooting can immediately be carried out at the perfect moment for a good picture.

The lens unit may integrally be provided with a CCD and a lens including the solid image pickup element.

In the above-described embodiments, although a lens barrier is opened/closed by the force for sliding the power switch 15, which is only an example, the present invention is not limited to such an example. A lens barrier may be opened/closed, upon detecting a position of the power switch 15, according to the detected position of the power switch 15. Or, a lens barrier may be opened by sliding the power switch 15 from the position "off" to the position "normal" when the lens barrel is advanced, whereas it may be closed by sliding the power switch 15 from the position "normal" to the position "off" when the lens barrel is retracted. In this case, it may be configured that pressing the shutter button when the power switch 15 is at the position "retract" opens the lens barrier.

What is claimed is:

1. A lens barrel which accommodates a shooting lens having a plurality of lens groups including at least a variable-power lens group and a focus-adjusting lens group, which can change a barrel length between an accommodated state having a relatively short barrel length and a shooting state having a relatively long barrel length, the lens barrel comprising:

a lens retracting mechanism which retracts at least one of the lens groups from a shooting optical axis when the lens barrel is retracted to be in the accommodated state, and a lens advancing mechanism which advances the lens group retracted when the lens barrel is retracted to the shooting optical axis when the lens barrel advances to be in the shooting state, wherein the shooting lens forms a shooting optical system by the remaining lens group among the plurality of lens groups excluding the lens group retracted from the shooting optical axis when the lens barrel is in the accommodated state.

2. The lens barrel according to claim 1, wherein the shooting lens forms a fixed focus shooting optical system by the remaining lens group.

3. The lens barrel according to claim 1, wherein the shooting lens comprises three groups, i.e., a front lens group, a rear lens group and a focus lens arranged in this order from forward of the optical axis direction, the focal length of the shooting lens can be changed, and the focus is adjusted by moving the focus lens, wherein the lens barrel further comprises a lens advancing/retracting mechanism including the lens retracting mechanism and the lens advancing mechanism, wherein the lens advancing/retracting mechanism retracts the rear lens group from the shooting optical axis when the lens barrel is retracted to be in the accommodated state, and wherein the shooting lens forms a shooting optical system by the front lens group and the focus lens when the lens barrel is in the accommodated state.

4. The lens barrel according to claim 3, wherein the front lens group is a lens group having a positive refractive force, the rear lens group is a lens group having a negative refractive force, and the focus lens is a lens group having a positive refractive force.

5. The lens barrel according to claim 1, further comprising a light amount control member which controls an amount of light passing through the shooting lens, wherein the light amount control member retracts from the shooting optical axis together with the lens group which retracts from the shooting optical axis when the lens barrel is retracted, and when the lens barrel advances to be in the shooting state, the light amount control member advances to the shooting optical axis together with the lens group retracted when the lens barrel is retracted.

6. The lens barrel according to claim 1, further comprising a light amount control member which controls an amount of light passing through the shooting lens, wherein the light amount control member stays on the shooting optical axis even when the lens barrel is in the accommodated state.

7. The lens barrel according to claim 1, wherein the shooting lens comprises two lens groups, i.e., a front lens group and a rear lens group arranged in this order from forward of the optical axis direction, wherein the lens barrel further comprises a lens advancing/retracting mechanism including the lens retracting mechanism and the lens advancing mechanism, wherein the lens advancing/retracting mechanism allows a first lens group comprising one of the two lens groups to retract from the shooting optical axis when the lens barrel is retracted to be in the accommodated state, and allows the first lens group retracted when the lens barrel is retracted to advance to the shooting optical axis when the lens barrel is advanced to be in the shooing state, and wherein the shooting lens forms a shooting optical system by a second lens group of the two lens groups when the lens barrel is in the accommodated state.

8. The lens barrel according to claim 7, further comprising a correction lens which advances on the shooting optical axis and corrects aberration of the second lens group when the lens barrel is in the accommodated state, and which is retracted from the shooting optical axis when the lens barrel is in the shooting state, wherein the shooting lens forms a shooting optical system by the second lens group and the correction lens when the lens barrel is in the accommodated state.

9. The lens barrel according to claim 7, wherein the lens advancing/retracting mechanism retracts the front lens group from the shooting optical axis when the lens barrel is retracted to be in the accommodated state, and advances the front lens group to the shooting optical axis when the lens barrel is advanced to be the shooting state.

10. The lens barrel according to claim 1, wherein the shooting lens comprises four lens groups, i.e., a first lens group, a second lens group, a third lens group, and a fourth lens group arranged in this order from forward of the optical axis direction, wherein the lens barrel comprises a lens advancing/retracting mechanism which retracts at least one of the third lens group and the fourth lens group from the shooting optical axis when the lens barrel is retracted to be in the accommodated state, and which advances the lens group retracted when the lens barrel is in the accommodated state to the shooting optical axis when the lens barrel advances to be in the shooting state, and wherein the shooting lens forms a shooting optical system by the remaining lens group among the four lens groups excluding the lens group retracted from the shooting optical axis when the lens barrel is in the accommodated state.

11. The lens barrel according to claim 10, wherein the lens advancing/retracting mechanism retracts both the second lens group and the fourth lens group from the optical axis when the lens barrel is retracted to be in the accommodated state, and advances the second lens group and the fourth lens group retracted in the accommodated state when the lens barrel advances to be in the shooting state, and wherein the shooting lens forms a shooting optical system by the remaining lens group among the four lens groups excluding the second lens group and the fourth lens group retracted from the shooting optical axis when the lens barrel is in the accommodated state.

12. The lens barrel according to claim 10, wherein the shooting lens forms a fixed shooting optical system by the remaining lens group when the lens barrel is in the accommodated state.

13. The lens barrel according to claim 10, wherein the first lens group, the second lens group, the third lens group, and the fourth lens group have a positive refractive force, a negative refractive force, a positive refractive force, and a positive refractive respectively.

14. The lens barrel according to claim 1, wherein the shooting state is a state in which an image is formed by using all the plurality of lens groups comprising the shooting lens, and the accommodated state is a state in which the barrel length is shorter than the shortest barrel length in the shooting state.

15. An image taking apparatus which takes a picture by capturing a subject light, comprising:

a shooting lens which has a plurality of lens groups including at least a variable-power lens group and a focus-adjusting lens group; and a lens barrel which accommodates the shooting lens, which can advance and retract, and which allows the shooting lens to adjust the focal length and the focus when the lens barrel is advanced, wherein the lens barrel comprises a lens advancing/retracting mechanism which retracts at least one of the lens groups from a shooting optical axis when the lens barrel is retracted, and which advances the lens group retracted when the lens barrel is retracted to the shooting optical axis when the lens barrel advances, and wherein the shooting lens forms a fixed focus shooting optical system by the remaining lens group among the plurality of lens groups excluding the lens group retracted from the shooting optical axis when the lens barrel is retracted.

16. The image taking apparatus according to claim 15, wherein the shooting lens comprises three groups, i.e., a front lens group having a positive refractive force, a rear lens group having a negative refractive force and a focus lens group having a positive refractive force arranged in this order from forward of the optical axis direction, the focal length of the shooting lens can be changed, and the focus is adjusted by moving the focus lens, wherein the lens advancing/retracting mechanism retracts the rear lens group from the shooting optical axis when the lens barrel is retracted, and the shooting lens forms a fixed focus shooting optical system by the front lens group and the focus lens when the lens barrel is retracted.

17. The image taking apparatus according to claim 15, wherein the shooting lens comprises two lens groups, i.e., a front lens group and a rear lens group, wherein the lens barrel includes the lens advancing/retracting mechanism which allows a first lens group comprising one of the two lens groups to retract from the shooting optical axis when the lens barrel is retracted, and allows the first lens group retracted when the lens barrel is retracted to advance to the shooting optical axis when the lens barrel is advanced, and wherein the shooting lens forms a fixed focus shooting optical system by a second lens group of the two lens groups when the lens barrel is retracted.

18. The image taking apparatus according to claim 17, wherein the lens barrel further comprises a correction lens which advances on the shooting optical axis and corrects aberration of the second lens group when the lens barrel is retracted, and which retracts from the shooting optical axis when the lens barrel is advanced, and wherein the shooting lens forms a fixed focus shooting optical system by the second lens group and the correction lens when the lens barrel is retracted.

19. The image taking apparatus according to claim 17, wherein the lens barrel retracts the front lens group from the shooting optical axis when the lens barrel is retracted, and advances the front lens group to the shooting optical axis when the lens barrel is advanced.

20. The image taking apparatus according to claim 15, wherein the shooting lens comprises four lens groups, i.e., a first lens group, a second lens group, a third lens group, and a fourth lens group arranged in this order from forward of the optical axis direction, wherein the lens barrel comprises a lens advancing/retracting mechanism which retracts at least one of the third lens group and the fourth lens group from the shooting optical axis when the lens barrel is retracted, and which advances the lens group retracted when the lens barrel is retracted to the shooting optical axis when the lens barrel advances, and wherein the shooting lens forms a shooting optical system by the remaining lens group among the four lens groups excluding the lens group retracted from the shooting optical axis when the lens barrel is retracted.

21. The image taking apparatus according to claim 20, wherein the lens advancing/retracting mechanism retracts both the second lens group and the fourth lens group from the optical axis when the lens barrel is retracted, and advances the second lens group and the fourth lens group retracted from the optical axis when the lens barrel advances, and wherein the shooting lens forms a shooting optical system by the remaining lens group among the four lens groups excluding the second lens group and the fourth lens group retracted from the shooting optical axis when the lens barrel is retracted.

22. The image taking apparatus according to claim 20, wherein the shooting lens forms a fixed shooting optical system by the remaining lens group when the lens barrel is retracted.

23. The image taking apparatus according to claim 20, wherein the first lens group, the second lens group, the third lens group, and the fourth lens group have a positive refractive force, a negative refractive force, a positive refractive force, and a positive refractive respectively.

24. The lens barrel according to claim 1, further comprising a lens barrier which covers a front surface of the shooting lens so as to be freely opened and closed.

25. The image taking apparatus according to claim 15, further comprising a lens barrier which covers a front surface of the shooting lens so as to be freely opened and closed.

26. The lens barrel according to claim 24, wherein the lens barrier is open when a picture is taken in the accommodated state.

27. The image taking apparatus according to claim 25, wherein the lens barrier is open when a picture is taken in a state where the lens barrel is retracted.

* * * * *